US012803996B2

(12) United States Patent
Geraldo et al.

(10) Patent No.: US 12,803,996 B2
(45) Date of Patent: Nov. 17, 2026

(54) SYSTEMS AND METHODS FOR AUTOMATED THREAT DETECTION USING RETROSPECTIVE AND PROSPECTIVE ASSESSMENT OF INDICATORS OF COMPROMISE

(71) Applicant: Expel, Inc., Herndon, VA (US)

(72) Inventors: Bryan Geraldo, Portland, OR (US); Nathan Sorrel, Littleton, CO (US); Malachi Woodlee, Burtonsville, MD (US); Issa Hafiri, Toronto (CA)

(73) Assignee: Expel, Inc., Herndon, VA (US)

( * ) Notice: Subject to any disclaimer, the term of this patent is extended or adjusted under 35 U.S.C. 154(b) by 0 days.

(21) Appl. No.: 19/652,750

(22) Filed: Apr. 20, 2026

(65) Prior Publication Data

US 2026/0254823 A1 Aug. 27, 2026

Related U.S. Application Data

(63) Continuation-in-part of application No. 19/228,374, filed on Jun. 4, 2025, which is a continuation of application No. 18/820,043, filed on Aug. 29, 2024, now Pat. No. 12,348,539.

(60) Provisional application No. 63/800,859, filed on May 6, 2025, provisional application No. 63/546,886, filed on Nov. 1, 2023, provisional application No. 63/535,554, filed on Aug. 30, 2023.

(51) Int. Cl.
*H04L 9/40* (2022.01)

(52) U.S. Cl.
CPC ...... *H04L 63/1416* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 9,148,441 | B1 * | 9/2015 | Tamersoy | G06F 21/566 |
| 9,430,646 | B1 * | 8/2016 | Mushtaq | H04L 67/02 |
| 9,912,695 | B1 * | 3/2018 | Chao | H04L 63/1425 |
| 10,019,338 | B1 * | 7/2018 | Goradia | G06F 11/28 |
| 10,326,796 | B1 * | 6/2019 | Varadarajan | H04L 63/1425 |
| 10,848,512 | B2 * | 11/2020 | Murphy | G06F 18/20 |
| 10,862,926 | B2 * | 12/2020 | Linn | H04L 63/20 |
| 10,911,468 | B2 * | 2/2021 | Muddu | G06N 20/20 |
| 11,055,405 | B1 * | 7/2021 | Jin | G06F 21/552 |
| 11,336,669 | B2 * | 5/2022 | Bazalgette | G06F 16/2455 |
| 11,374,952 | B1 * | 6/2022 | Coskun | G06N 3/045 |
| 11,636,206 | B2 * | 4/2023 | Kenyon | G06F 21/554 726/23 |
| 11,956,255 | B1 * | 4/2024 | Holub | G06N 20/00 |
| 11,979,425 | B2 * | 5/2024 | Thakur | G06F 21/577 |
| 12,041,068 | B2 * | 7/2024 | Bernholz | H04L 63/101 |

(Continued)

*Primary Examiner* — Teshome Hailu
*Assistant Examiner* — Mahabub S Ahmed
(74) *Attorney, Agent, or Firm* — Padowithz Alce; Chandler Scheitlin; Alce PLLC

(57) ABSTRACT

A system, method, and computer-program product for detecting cybersecurity threats using indicators of compromise. The system, method, and computer-program product generate threat hunt queries based on a temporal look-back parameter to retrieve historical security event data, construct detection instructions from the historical data, and reuse the threat hunt queries to retrieve, in real-time, new security event data for real-time threat detection.

20 Claims, 21 Drawing Sheets

(56) References Cited

U.S. PATENT DOCUMENTS

| | | | | |
|---|---|---|---|---|
| 12,132,746 | B2 * | 10/2024 | Thomas | H04L 63/1408 |
| 12,238,140 | B2 * | 2/2025 | Bazalgette | G06F 21/57 |
| 12,519,813 | B1 * | 1/2026 | Pratt | G06F 21/552 |
| 12,627,687 | B1 * | 5/2026 | Adamson | G06F 9/5072 |
| 2006/0129382 | A1 * | 6/2006 | Anand | G06F 21/552 704/9 |
| 2012/0110174 | A1 * | 5/2012 | Wootton | H04L 63/1416 709/224 |
| 2013/0305369 | A1 * | 11/2013 | Karta | H04L 63/1416 726/23 |
| 2014/0041028 | A1 * | 2/2014 | Ramsey | G06F 21/316 726/22 |
| 2014/0201836 | A1 * | 7/2014 | Amsler | H04L 63/20 726/23 |
| 2014/0280889 | A1 * | 9/2014 | Nispel | H04L 43/026 709/224 |
| 2015/0039513 | A1 * | 2/2015 | Adjaoute | G06Q 30/0609 705/44 |
| 2015/0047032 | A1 * | 2/2015 | Hannis | H04L 63/1491 726/23 |
| 2015/0074806 | A1 * | 3/2015 | Roundy | H04L 63/1425 726/23 |
| 2015/0207809 | A1 * | 7/2015 | Macaulay | H04L 63/1433 726/22 |
| 2016/0014149 | A1 * | 1/2016 | Bradley | H04L 63/1408 726/14 |
| 2016/0283715 | A1 * | 9/2016 | Duke | G06F 21/566 |
| 2017/0103674 | A1 * | 4/2017 | Sadeh-Koniecpol | G06F 21/566 |
| 2018/0124082 | A1 * | 5/2018 | Siadati | H04L 63/1425 |
| 2018/0255076 | A1 * | 9/2018 | Paine | H04L 63/1416 |
| 2018/0255079 | A1 * | 9/2018 | Paine | H04L 63/1433 |
| 2018/0288066 | A1 * | 10/2018 | Brockhuus | H04L 67/306 |
| 2019/0116192 | A1 * | 4/2019 | Singh | H04L 63/1441 |
| 2020/0213338 | A1 * | 7/2020 | Lotem | G06N 20/00 |
| 2020/0302058 | A1 * | 9/2020 | Kenyon | G06F 21/554 |
| 2020/0304528 | A1 * | 9/2020 | Ackerman | G06F 11/079 |
| 2021/0073819 | A1 * | 3/2021 | Hernandez | G06Q 20/4016 |
| 2021/0160281 | A1 * | 5/2021 | Hallaji | H04L 63/1491 |
| 2021/0266294 | A1 * | 8/2021 | Chechik | H04L 63/105 |
| 2021/0271741 | A1 * | 9/2021 | Habal | G06F 21/577 |
| 2021/0377294 | A1 * | 12/2021 | Gupta | H04L 43/16 |
| 2021/0390510 | A1 * | 12/2021 | Wuslich | G06Q 10/107 |
| 2022/0035929 | A1 * | 2/2022 | Hicks | G06F 11/3684 |
| 2022/0046047 | A1 * | 2/2022 | Lewis | G06F 18/214 |
| 2022/0070182 | A1 * | 3/2022 | Bowditch | H04L 63/1425 |
| 2022/0224724 | A1 * | 7/2022 | Bazalgette | H04L 63/1441 |
| 2022/0263860 | A1 * | 8/2022 | Crabtree | G06F 11/3006 |
| 2022/0385683 | A1 * | 12/2022 | Jones | H04L 63/1425 |
| 2023/0068293 | A1 * | 3/2023 | Nezhdanov | H04L 63/1416 |
| 2023/0153425 | A1 * | 5/2023 | Yuceer | H04L 63/1425 726/23 |
| 2023/0164158 | A1 * | 5/2023 | Fellows | G06F 21/552 726/23 |
| 2023/0199006 | A1 * | 6/2023 | Gurnov | H04L 63/1425 726/23 |
| 2023/0308465 | A1 * | 9/2023 | Alroobaea | H04L 63/1425 |
| 2023/0362187 | A1 * | 11/2023 | Walch | H04L 63/1425 |
| 2024/0129323 | A1 * | 4/2024 | Garyani | G06F 21/554 |
| 2024/0214419 | A1 * | 6/2024 | Neuhof | G06F 21/55 |
| 2024/0289367 | A1 * | 8/2024 | Murphy | G06N 3/0475 |
| 2024/0291853 | A1 * | 8/2024 | Murphy | G06N 3/0475 |
| 2025/0039222 | A1 * | 1/2025 | Waldman | G06F 21/55 |
| 2025/0384127 | A1 * | 12/2025 | Hooten | G06F 21/554 |

* cited by examiner

FIG. 5
#https://expel-io.atlassian.net/wiki/spaces/DNR/pages/3013345605/Threat+Bulletin+-+CVE-2021-40444
meta_url: https://msrc.microsoft.com/update-guide/vulnerability/CVE-2021-40444
meta_name: CVE-2021-40444
meta_description:>
Microsoft is investigating reports of a remote code execution vulnerability in MSHTML that affects Microsoft Windows.
Microsoft is aware of targeted attacks that attempt to exploit this vulnerability by using specially-crafted Microsoft Office documents.
We are searching for the filenames, file hashes, referenced domains and/or IP addresses that the security industry have released for active threats they have uncovered.
meta_mitre: |
* Initial Access (https://attack.mitre.org/tactics/TA0001/)
* Phishing - (https://attack.mitre.org/techniques/T1566/)
* Spearphishing Link - (https://attack.mitre.org/techniques/T1566/002/)
file_names:
- control.exe
file_hashes:
- File Hash 1
- File Hash 2
- File Hash 3
- File Hash 4
- File Hash 5
- File Hash 6
- File Hash 7
- File Hash 8
- File Hash 9
- File Hash 10
- File Hash 11
- File Hash 12
- File Hash 13
- File Hash 14
net_domains:
- Domain 1
- Domain 2
- Domain 3
- Domain 4
net_ips:
- IP 1
- IP 2

500

600

1000

1100A

1200A

1200B

1200C

SYSTEMS AND METHODS FOR AUTOMATED THREAT DETECTION USING RETROSPECTIVE AND PROSPECTIVE ASSESSMENT OF INDICATORS OF COMPROMISE

CROSS-REFERENCE TO RELATED APPLICATIONS

This application claims the benefit of U.S. Provisional Application No. 63/800,859, filed 6 May 2025 and is a continuation-in-part of U.S. patent application Ser. No. 19/228,374, filed 4 Jun. 2025, which is a continuation of U.S. Pat. No. 12,348,539, filed 29 Aug. 2024, which claims the benefit of U.S. Provisional Application No. 63/546,886, filed 1 Nov. 2023 and U.S. Provisional Application No. 63/535,554, filed 30 Aug. 2023, which are incorporated in their entireties by this reference.

TECHNICAL FIELD

This invention relates generally to the cybersecurity field, and more specifically to new and useful systems and methods for detecting and mitigating cyber threats using retrospective and prospective assessment of indicators of compromise (IOCs).

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slowdown the detection of security threats and efficiently responding to detected security threats.

Thus, there is a need in the cybersecurity field to create improved systems and methods for intelligently scaling threat detection capabilities of a security operations service while improving its technical capabilities to efficiently respond to an increasingly large volume of security threats to computing and organizational computing assets.

The embodiments of the present application described herein provide technical solutions that address, at least the need described above.

BRIEF SUMMARY OF THE EMBODIMENTS

In one embodiment, a computer-implemented method includes: at a cybersecurity event detection and response service that is implemented by a network of distributed computers: detecting, in real-time or near real-time, at least one indicator of compromise (IOC) included in a security artifact; in response to detecting the at least one IOC, automatically generating, in real-time or near real-time, a threat hunt object that specifies (i) the at least one IOC, (ii) a temporal look-back parameter, and (iii) a plurality of distinct security devices eligible for IOC-based querying; translating, using a large language model, the threat hunt object into a plurality of distinct threat hunt queries in response to providing the threat hunt object to the large language model, wherein: each threat hunt query of the plurality of distinct threat hunt queries is written in a distinct query language required by a distinct security device of the plurality of distinct security devices, and each threat hunt query of the plurality of distinct threat hunt queries includes the at least one IOC and specifies a retrospective query window based on the temporal look-back parameter; in response to translating the threat hunt object into the plurality of distinct threat hunt queries: simultaneously executing, using one or more pollers, the plurality of distinct threat hunt queries across the plurality of distinct security devices; obtaining historical security event data from each security device of the plurality of distinct security devices in response to executing the plurality of distinct threat hunt queries; and automatically constructing one or more IOC-based threat detection instructions using (a) the historical security event data obtained from each of the plurality of distinct security devices and (b) the at least one IOC; assessing, in real-time or near real-time, new security events normalized by the cybersecurity event detection and response service against the one or more IOC-based threat detection instructions; and automatically generating, in real-time or near real-time, at least one IOC-based security alert based on detecting that a respective new security event of the new security events satisfies one of the one or more IOC-based threat detection instructions.

In one embodiment, the computer-implemented method further includes before assessing the new security events normalized by the cybersecurity event detection and response service: initializing a counter for the at least one IOC; while assessing the new security events normalized by the cybersecurity event detection and response service: tracking, using the counter, a total number of times that the at least one IOC is detected in the new security events; and after assessing the new security events normalized by the cybersecurity event detection and response service, performing at least one detection handling action based on the total number of times that the at least one IOC was detected in the new security events, wherein: the at least one detection handling action includes terminating the one or more IOC-based threat detection instructions when the total number of times that the at least one IOC was detected in the new security events fails to satisfy a predetermined minimum IOC count threshold, and the at least one detection handling action includes bypassing the termination of the one or more IOC-based threat detection instructions when the total number of times that the at least one IOC was detected in the new security events satisfies the predetermined minimum IOC count threshold.

In one embodiment, the computer-implemented method further includes before assessing the new security events normalized by the cybersecurity event detection and response service: initializing a counter for the at least one IOC, wherein the counter tracks a total number of times that the at least one IOC is detected in log data of all subscribers to the cybersecurity event detection and response service within a target time span; at expiration of the target time span: automatically assessing the total number of times that the at least one IOC was detected in the log data; automatically extending, for a subsequent target time span, a duration that the one or more IOC-based threat detection instructions are active in the cybersecurity event detection and response service based on the assessment of the total number of times that the at least one IOC was detected in the log data; and resetting the counter to an initial value to track a subsequent total number of times that the at least one IOC is detected in all computing environments of the all subscribers to the cybersecurity event detection and response service during the subsequent target time span; and at expiration of the subsequent target time span: automatically assessing the subsequent total number of times that the at least one IOC was detected during the subsequent target time span; and automatically ceasing use of the one or more IOC-based threat detection instructions based on the assessment of the subsequent total number of times that the at least one IOC was detected during the subsequent target time span.

In one embodiment, the computer-implemented method further includes in response to constructing the one or more IOC-based threat detection instructions: assessing, in real-time or near real-time, the historical security event data obtained from each of the plurality of distinct security devices against the one or more IOC-based threat detection instructions; generating, in real-time or near real-time, a plurality of distinct retrospective IOC-based security alerts based on detecting that at least a subset of the historical security event data obtained from the plurality of distinct security devices satisfies the one or more IOC-based threat detection instructions; and in response to generating the plurality of distinct retrospective IOC-based security alerts, automatically executing, in real-time or near real-time, one or more automated threat mitigation actions to mitigate or resolve a security threat associated with the plurality of distinct retrospective IOC-based security alerts.

In one embodiment, the historical security event data obtained from each security device of the plurality of distinct security devices includes: a plurality of distinct sets of historical security events that correspond to a plurality of distinct subscribers to the cybersecurity event detection and response service, wherein each set of historical security events of the plurality of distinct sets of historical security events: corresponds to a distinct subscriber of the plurality of distinct subscribers, and includes all historical security events of the distinct subscriber that (1) occurred within the retrospective query window and (2) includes the at least one IOC, and the computer-implemented method further includes: in response to constructing the one or more IOC-based threat detection instructions: assessing, in real-time or near real-time, the plurality of distinct sets of historical security events that correspond to the plurality of distinct subscribers against the one or more IOC-based threat detection instructions; and generating, in real-time or near real-time, a plurality of distinct retrospective IOC-based security alerts for each distinct subscriber of the plurality of distinct subscribers based on the assessment of the plurality of distinct sets of historical security events against the one or more IOC-based threat detection instructions.

In one embodiment, the computer-implemented method further includes receiving, over a computer network, a third-party threat intelligence data feed that includes threat intelligence data comprising a plurality of distinct candidate IOCs, wherein: the third-party threat intelligence data feed corresponds to the security artifact, and detecting the at least one IOC includes: assessing the plurality of distinct candidate IOCs to identify at least one candidate IOC of the plurality of distinct candidate IOCs that was not previously recognized by the cybersecurity event detection and response service as a known IOC, and designating the at least one candidate IOC as the at least one IOC.

In one embodiment, the plurality of distinct threat hunt queries, when executed across the plurality of distinct security devices, automatically performs a sweep of all computing environments of all subscribers to the cybersecurity event detection and response service to identify a plurality of historical security events that (1) occurred in the computing environments of the subscribers, (2) occurred within the retrospective query window, and (3) are associated with the at least one IOC, wherein each historical security event of the plurality of historical security events includes the at least one IOC, and the computer-implemented method further includes: in response to identifying the plurality of historical security events, generating a plurality of distinct retrospective IOC-based security alerts based in part on the plurality of historical security events identified from executing the plurality of distinct threat hunt queries; and displaying the plurality of distinct retrospective IOC-based security alerts on a graphical user interface.

In one embodiment, the security artifact corresponds to a security incident detected in a compromised computing environment of a target subscriber to the cybersecurity event detection and response service, the plurality of distinct threat hunt queries, when executed across the plurality of distinct security devices, automatically performs a retrospective cross-environment scanning operation across computing environments of a plurality of additional subscribers to identify a plurality of historical security events associated with the at least one IOC, wherein each historical security event of the plurality of historical security events: occurred at one of the computing environments of the plurality of additional subscribers, occurred within the retrospective query window, and includes event metadata specifying the at least one IOC, and the computer-implementing method further includes: automatically generating a plurality of distinct retrospective IOC-based security alerts based on the plurality of historical security events identified during the retrospective cross-environment scanning operation; automatically routing the plurality of distinct retrospective IOC-based security alerts to a security alert queue; and executing, in response to routing the plurality of distinct retrospective IOC-based security alerts to the security alert queue, one or more threat mitigation actions to mitigate or resolve a security threat associated with the plurality of distinct retrospective IOC-based security alerts.

In one embodiment, the plurality of additional subscribers are different from the target subscriber, and before execution of the retrospective cross-environment scanning operation, the plurality of historical security events identified during the retrospective cross-environment scanning operation were determined to be non-malicious by the cybersecurity event detection and response service.

In one embodiment, the plurality of additional subscribers are different from the target subscriber, and before execution of the retrospective cross-environment scanning operation, the cybersecurity event detection and response service did not detect the security threat associated with the plurality of historical security events identified during the retrospective cross-environment scanning operation.

In one embodiment, the computer-implemented method further includes automatically commencing, at a predetermined interval, a sequence of operations to reduce a time to detect and remediate future security threats associated with the at least one IOC, wherein at least one iteration of the sequence of operations includes: automatically polling, using the one or more pollers, the plurality of distinct security devices to obtain new security event data; in response to receiving the new security event data, assessing, in real-time or near real-time, a normalized representation of the new security event data against the one or more IOC-based threat detection instructions; automatically generating one or more additional IOC-based security alerts based on the normalized representation of the new security event data satisfying the one or more IOC-based threat detection instructions; and executing, in real-time or near real-time, one or more threat mitigation actions to mitigate or resolve a security threat associated with each of the one or more additional IOC-based security alerts.

In one embodiment, the at least one IOC included in the threat hunt object includes: a first plurality of IOCs that correspond to a first class of IOCs, a second plurality of IOCs that correspond to a second class of IOCs, and a third plurality of IOCs that correspond to a third class of IOCs, the plurality of distinct security devices included in the threat hunt object includes: a first identifier that corresponds to a first distinct endpoint detection and response service, a second identifier that corresponds to a second distinct endpoint detection and response service, and a third identifier that corresponds to a third distinct endpoint detection and response service, and translating the threat hunt object into the plurality of distinct threat hunt queries includes: generating a first distinct threat hunt query that is written in the distinct query language required by the first distinct endpoint detection and response service, wherein the first distinct threat hunt query includes: the first plurality of IOCs, the second plurality of IOCs, and the third plurality of IOCs, the retrospective query window, and an application programming interface (API) endpoint for the first distinct endpoint detection and response service, generating a second distinct threat hunt query that is written in the distinct query language required by the second distinct endpoint detection and response service, wherein the second distinct threat hunt query includes: the first plurality of IOCs, the second plurality of IOCs, and the third plurality of IOCs, the retrospective query window, and an API endpoint for the second distinct endpoint detection and response service, and generating a third distinct threat hunt query that is written in the distinct query language required by the third distinct endpoint detection and response service, wherein the third distinct threat hunt query includes: the first plurality of IOCs, the second plurality of IOCs, and the third plurality of IOCs, the retrospective query window, and an API endpoint for the third distinct endpoint detection and response service.

In one embodiment, simultaneously executing the plurality of distinct threat hunt queries includes: transmitting, using the one or more pollers, a first API request that includes the first distinct threat hunt query to the API endpoint that corresponds to the first distinct endpoint detection and response service, transmitting, using the one or more pollers, a second API request that includes the second distinct threat hunt query to the API endpoint that corresponds to the second distinct endpoint detection and response service, and transmitting, using the one or more pollers, a third API request that includes the third distinct threat hunt query to the API endpoint that corresponds to the third distinct endpoint detection and response service, and obtaining the historical security event data from each security device of the plurality of distinct security devices includes: in response transmitting the first API request to the API endpoint of the first distinct endpoint detection and response service, receiving, from the first distinct endpoint detection and response service, a first plurality of historical security events that: were detected in one or more computing environments of one or more subscribers monitored by the first distinct endpoint detection and response service, occurred within the retrospective query window, and are associated with at least one of the first plurality of IOCs, the second plurality of IOCs, and the third plurality of IOCs, in response transmitting the second API request to the API endpoint of the second distinct endpoint detection and response service, receiving, from the second distinct endpoint detection and response service, a second plurality of historical security events that: were detected in the one or more computing environments of the one or more subscribers monitored by the second distinct endpoint detection and response service, occurred within the retrospective query window, and are associated with at least one of the first plurality of IOCs, the second plurality of IOCs, and the third plurality of IOCs, and in response transmitting the third API request to the API endpoint of the third distinct endpoint detection and response service, receiving, from the third distinct endpoint detection and response service, a third plurality of historical security events that: were detected in the one or more computing environments of the one or more subscribers monitored by the third distinct endpoint detection and response service, occurred within the retrospective query window, and are associated with at least one of the first plurality of IOCs, the second plurality of IOCs, and the third plurality of IOCs, wherein the historical security event data includes the first plurality of historical security events, the second plurality of historical security events, and the third plurality of historical security events.

In one embodiment, the computer-implemented method further includes in response to providing the threat hunt object to the large language model, generating, using the large language model, a single database query based on the threat hunt object, wherein: the single database query is executable against a target database, the single database query includes the at least one IOC and the retrospective query window, and the target database stores log data obtained from each of a plurality of distinct security services; in response to the large language model generating the single database query, executing the single database query against the target database; in response to executing the single database query, retrieving, from the target database, a corpus of logs that satisfy the single database query, wherein: a first subset of the corpus of logs includes a first plurality of logs generated by a first distinct security service of the plurality of distinct security services, a second subset of the corpus of logs includes a second plurality of logs generated by a second distinct security service of the plurality of distinct security services, and a third subset of the corpus of logs includes a third plurality of logs generated by a third distinct security service of the plurality of distinct security services; and generating a plurality of distinct retrospective IOC-based security alerts in response to assessing the corpus of logs retrieved from the target database against the one or more IOC-based threat detection instructions.

In one embodiment, the at least one IOC includes a first plurality of IOCs that correspond to a first class of IOCs, a second plurality of IOCs that correspond to a second class of IOCs, and a third plurality of IOCs that correspond to a third class of IOCs, and while generating the plurality of distinct threat hunt queries using the large language model: detecting (e.g., determining, predicting, etc.), by the large language model, that including the first plurality of IOCs, the second plurality of IOCs, and the third plurality of IOCs in a single threat hunt query would cause the single threat hunt query to exceed a maximum query size of the distinct security device to which the single threat hunt query corresponds; and in response to the large language model detecting that the single threat hunt query would exceed the maximum query size, generating multiple threat hunt queries for the distinct security device to which the single threat hunt query corresponds, wherein: a first threat hunt query of the multiple threat hunt queries includes the first plurality of IOCs and excludes the second plurality of IOCs and the third plurality of IOCs, a second threat hunt query of the multiple threat hunt queries includes the second plurality of IOCs and excludes the first plurality of IOCs and the third plurality of IOCs, and a third threat hunt query of the multiple threat hunt queries includes the third plurality of IOCs and excludes the first plurality of IOCs and the second plurality of IOCs, wherein: the plurality of distinct threat hunt queries includes the first threat hunt query, the second threat hunt query, and the third threat hunt query, and the first threat hunt query, the second threat hunt query, and the third threat hunt query collectively represent a logical equivalent of the single threat hunt query.

In one embodiment, generating a respective threat hunt query of the plurality of distinct threat hunt queries includes: obtaining, using the large language model, a plurality query components that define a query syntax of the distinct query language required by the distinct security device to which the respective threat hunt query corresponds, determining, using the large language model, an IOC class of the at least one IOC; selecting, using the large language model, a respective field identifier from the plurality query components that corresponds to the IOC class; and encoding, using the large language model, the respective threat hunt query by inserting the at least one IOC after the respective field identifier in accordance with the query syntax.

In one embodiment, the computer-implemented method further includes in response to executing the plurality of distinct threat hunt queries, generating query findings data using the historical security event data obtained from each security device of the plurality of distinct security devices, wherein the query findings data includes: a total number of historical security events identified by the plurality of distinct threat hunt queries, a total number of retrospective IOC-based security alerts generated based on the historical security event data obtained from each security device of the plurality of distinct security devices, and one or more query execution errors associated with at least one of the plurality of distinct threat hunt queries; automatically generating training data for the large language model using the query findings data; and training the large language model using the training data to improve a translation of a subsequent threat hunt object into a plurality of subsequent threat hunt queries.

In one embodiment, the one of the one or more IOC-based threat detection instructions specifies: generating a subject IOC-based security alert when a subject new security event includes at least one piece of event metadata equivalent to the at least one IOC, and the one of the one or more IOC-based threat detection instructions generated the at least one IOC-based security alert for the respective new security event based on the one of the one or more IOC-based threat detection instructions detecting that a respective piece of event metadata included in the respective new security event is equivalent to the at least one IOC.

In one embodiment, constructing a respective IOC-based threat detection instruction of the one or more IOC-based threat detection instructions includes: providing the historical security event data obtained from each of the plurality of distinct security devices to the large language model; assessing, using the large language model, the historical security event data obtained from each of the plurality of distinct security devices to detect a malicious behavior pattern associated with the at least one IOC; encoding, using the large language model, the respective IOC-based threat detection instruction to specify a detection condition that is satisfied when a subject new security event includes event metadata that (1) matches the malicious behavior pattern and (2) includes the at least one IOC, and the respective IOC-based threat detection generated the at least one IOC-based security alert for the respective new security event based on detecting that the respective new security event satisfies the detection condition of the respective IOC-based threat detection instruction.

In one embodiment, the computer-implemented method further includes tracking, in a computer database, a distinct query execution state for each of the plurality of distinct threat hunt queries, wherein the distinct query execution state indicates whether a respective threat hunt query has not been executed, is partially executed, or has completed execution; detecting one or more system restarts or one or more transient failures during execution of the plurality of distinct threat hunt queries; and in response to detecting the one or more system restarts or the one or more transient failures: identifying, using the computer database, a first subset of the plurality of distinct threat hunt queries that are partially completed, a second subset of the plurality of distinct threat hunt queries that have completed execution, and a third subset of the plurality of distinct threat hunt queries that have not been executed; in response to identifying the first subset of the plurality of distinct threat hunt queries, re-executing each distinct threat hunt query included in the first subset; in response to identifying the second subset of the plurality of distinct threat hunt queries, bypassing re-execution of each distinct threat hunt query included in the second subset; and in response to identifying the third subset of the plurality of distinct threat hunt queries, commencing asynchronous execution of each distinct threat hunt query included in the third subset.

In one embodiment, the computer-implemented method further includes in response to detecting a query execution failure associated with a respective threat hunt query of the plurality of distinct threat hunt queries: identifying a set of logs obtained prior to the query execution failure; generating, in real-time or near real-time, a modified version of the respective threat hunt query that, when executed, does not retrieve the set of logs obtained prior to the query execution failure; and executing the modified version of the respective threat hunt query to obtain additional logs distinct from the set of logs.

In one embodiment, the at least one IOC includes a first plurality of IOCs that correspond to a first class of IOCs, a second plurality of IOCs that correspond to a second class of IOCs, and a third plurality of IOCs that correspond to a third class of IOCs, and while generating the plurality of distinct threat hunt queries using the large language model: detecting (e.g., determining, predicting, etc.), by the large language model, that including the first plurality of IOCs, the second plurality of IOCs, and the third plurality of IOCs in a single threat hunt query would cause the single threat hunt query to exceed a maximum log return limit of the distinct security device to which the single threat hunt query corresponds; and in response to the large language model detecting (e.g., determining, predicting, etc.) that the single threat hunt query would exceed the maximum log return limit, generating multiple threat hunt queries for the distinct security device to which the single threat hunt query corresponds, wherein: a first threat hunt query of the multiple threat hunt queries includes the first plurality of IOCs and excludes the second plurality of IOCs and the third plurality of IOCs, a second threat hunt query of the multiple threat hunt queries includes the second plurality of IOCs and excludes the first plurality of IOCs and the third plurality of IOCs, and a third threat hunt query of the multiple threat hunt queries includes the third plurality of IOCs and excludes the first plurality of IOCs and the second plurality of IOCs, wherein: the plurality of distinct threat hunt queries includes the first threat hunt query, the second threat hunt query, and the third threat hunt query, and the first threat hunt query, the second threat hunt query, and the third threat hunt query collectively represent a logical equivalent of the single threat hunt query.

In one embodiment, the at least one IOC includes a first plurality of IOCs that correspond to a first class of IOCs, a second plurality of IOCs that correspond to a second class of IOCs, and a third plurality of IOCs that correspond to a third class of IOCs, and while generating the plurality of distinct threat hunt queries using the large language model: detecting (e.g., determining, predicting, etc.), by the large language model, that including the first plurality of IOCs, the second plurality of IOCs, and the third plurality of IOCs in a single threat hunt query would cause the single threat hunt query to exceed a maximum query return limit of the distinct security device to which the single threat hunt query corresponds; and in response to the large language model detecting (e.g., determining, predicting, etc.) that the single threat hunt query would exceed the maximum query return limit, generating multiple threat hunt queries for the distinct security device to which the single threat hunt query corresponds, wherein: a first threat hunt query of the multiple threat hunt queries includes the first plurality of IOCs and excludes the second plurality of IOCs and the third plurality of IOCs, a second threat hunt query of the multiple threat hunt queries includes the second plurality of IOCs and excludes the first plurality of IOCs and the third plurality of IOCs, and a third threat hunt query of the multiple threat hunt queries includes the third plurality of IOCs and excludes the first plurality of IOCs and the second plurality of IOCs, wherein: the plurality of distinct threat hunt queries includes the first threat hunt query, the second threat hunt query, and the third threat hunt query, and the first threat hunt query, the second threat hunt query, and the third threat hunt query collectively represent a logical equivalent of the single threat hunt query.

In one embodiment, the at least one IOC corresponds to a malicious internet protocol address, the at least one IOC-based security alert was generated for a target subscriber in response to detecting that the respective new security event comprises a communication between a device associated with the target subscriber and the malicious internet protocol address, and the computer-implemented method further includes: in response to generating the at least one IOC-based security alert, executing one or more automated threat mitigation actions to mitigate or resolve a security threat associated with the at least one IOC-based security alert, wherein the one or more automated threat mitigation actions, when executed: automatically terminates, in real-time, existing network connections between the device and the malicious internet protocol address, automatically prevents new network connections from the malicious internet protocol address from digitally communicating with the device, automatically isolates, in real-time, the device from one or more computing environments of the target subscriber to mitigate propagation of the security threat, and automatically modifies, in real-time, one or more firewall rules of the target subscriber to prevent subsequent network communications with the malicious internet protocol address.

In one embodiment, the at least one IOC corresponds to a malicious user agent, the at least one IOC-based security alert was generated for a target subscriber in response to detecting that the respective new security event includes metadata that corresponds to the malicious user agent, and the computer-implemented method further includes: in response to generating the at least one IOC-based security alert, executing, in real-time, one or more automated threat mitigation actions to mitigate or resolve a security threat associated with the at least one IOC-based security alert, wherein the one or more automated threat mitigation actions, when executed: automatically disables, in real-time, a user account of the target subscriber determined to be associated with the malicious user agent, wherein disabling the user account prevents unauthorized access to a target computing environment of the target subscriber, automatically prevents subsequent requests including the malicious user agent from being processed within the target computing environment, and automatically terminates, in real-time, one or more active sessions associated with the user account within the target computing environment.

In one embodiment, the at least one IOC corresponds to a file hash (e.g., malicious file hash), the at least one IOC-based security alert was generated for a target subscriber in response to detecting that the respective new security event includes metadata that corresponds to the file hash, and the computer-implemented method further includes: in response to generating the at least one IOC-based security alert, executing, in real-time or near real-time, one or more automated threat mitigation actions to mitigate or resolve a security threat associated with the at least one IOC-based security alert, wherein the one or more automated threat mitigation actions, when executed: automatically identifies, in real-time, a location of a target application within a computing environment of the target subscriber that corresponds to the file hash; automatically removes, in real-time, the target application from the computing environment, and automatically prevents future execution of the target application associated with the file hash from executing within the computing environment.

In one embodiment, the at least one IOC corresponds to an email address (e.g., malicious email address), the at least one IOC-based security alert was generated for a target subscriber in response to detecting that the respective new security event includes metadata that corresponds to the email address, and the computer-implemented method further includes: in response to generating the at least one IOC-based security alert, executing, in real-time or near real-time, one or more automated threat mitigation actions to mitigate or resolve a security threat associated with the at least one IOC-based security alert, wherein the one or more automated threat mitigation actions, when executed: automatically removes all electronic messages originating from the email address from one or more mailboxes within a computing environment of the target subscriber; automatically blocks, within the computing environment, receipt of subsequent electronic messages originating from the email address; and automatically prevents delivery of electronic messages associated with the email address to one or more user accounts of the target subscriber.

In one embodiment, the at least one IOC corresponds to a domain, the at least one IOC-based security alert was generated for a target subscriber in response to detecting that the respective new security event includes metadata that corresponds to the domain, and the computer-implemented method further includes: in response to generating the at least one IOC-based security alert, executing, in real-time or near real-time, one or more automated threat mitigation actions to mitigate or resolve a security threat associated with the at least one IOC-based security alert, wherein the one or more automated threat mitigation actions, when executed: automatically blocks, in real-time, access to the domain within a computing environment of the target subscriber; automatically prevents subsequent requests to the domain from being transmitted from the computing environment; and automatically terminates one or more processes or network sessions on a host within the computing environment that are associated with communications to the domain.

In one embodiment, the computer-implemented method further includes: detecting, during execution of the plurality of distinct threat hunt queries, a discrepancy condition in which at least two security devices return inconsistent historical security event data for the at least one IOC; and in response to detecting the discrepancy condition: generating, using the large language model, a reconciliation query that is executed against at least one additional data source to resolve the discrepancy condition. For instance, in a non-limiting example, a first security device may return a first set of historical security events indicating that a particular internet protocol address associated with the at least one IOC communicated with a host within a computing environment during the retrospective query window, while a second security device may return a second set of historical security events indicating no such communication occurred during the same retrospective query window. In such a scenario, the discrepancy condition is detected based on the inconsistency between the first set of historical security events and the second set of historical security events. In response, the large language model generates the reconciliation query to target at least one additional data source, such as a network flow log repository, a firewall log database, or a domain name system (DNS) query log store, wherein the reconciliation query is configured to retrieve supplemental event data corresponding to the at least one IOC and the retrospective query window. Execution of the reconciliation query against the at least one additional data source yields additional historical security event data that is analyzed to determine whether the communication associated with the at least one IOC occurred, thereby resolving the discrepancy condition. In some embodiments, resolving the discrepancy condition further includes updating the one or more IOC-based threat detection instructions based on the additional historical security event data obtained from the at least one additional data source and assigning a confidence level to each of the first set of historical security events and the second set of historical security events based on consistency with the additional historical security event data. In another non-limiting example, the discrepancy condition may correspond to a conflict in event attribution, wherein a first security device indicates that a user account associated with the at least one IOC performed a privileged action on a host device, while a second security device indicates that the same user account was inactive or not authenticated during a corresponding time interval. In such a scenario, the inconsistency may arise due to differences in clock synchronization, data ingestion latency, or incomplete log coverage across the plurality of distinct security devices. In response, the large language model generates the reconciliation query to retrieve additional contextual data from one or more identity management systems, authentication logs, or time-synchronization services, wherein the reconciliation query is configured to obtain timestamp-normalized authentication records and session activity corresponding to the user account and the retrospective query window. The additional contextual data is then used to align timestamps across the plurality of distinct security devices and to determine whether the privileged action was legitimately performed by the user account or represents anomalous or spoofed activity. In some embodiments, resolving the discrepancy condition further includes normalizing timestamps across the historical security event data obtained from the plurality of distinct security devices, correlating the normalized historical security event data with the additional contextual data, and updating the one or more IOC-based threat detection instructions to incorporate timing tolerance parameters or cross-source validation conditions to mitigate future occurrences of similar discrepancy conditions.

In one embodiment, the computer-implemented method further includes: constructing, using the historical security event data, a graph data structure that represents threat relationships between the at least one IOC and a plurality of entities (e.g., email addresses, domains, usernames, user agents, domains, etc.) extracted from the historical security event data; and deriving the one or more IOC-based threat detection instructions further includes identifying at least one multi-hop relationship pattern within the graph data structure that includes the at least one IOC, wherein the one or more IOC-based threat detection instructions specifies the multi-hop relationship pattern. For instance, in a non-limiting example, the graph data structure may include a first node corresponding to the at least one IOC comprising a malicious domain, a second node corresponding to a first user account, a third node corresponding to a host device, and a fourth node corresponding to a second domain, wherein edges between the nodes represent observed relationships derived from the historical security event data, including (i) the first user account accessing the malicious domain, (ii) the first user account authenticating to the host device, and (iii) the host device initiating a subsequent communication with the second domain. In such an example, identifying the at least one multi-hop relationship pattern includes detecting a sequence of relationships in the graph data structure that connects the malicious domain to the second domain through the first user account and the host device. The multi-hop relationship pattern therefore captures a potential lateral movement or propagation path associated with the at least one IOC that is not detectable from any single security event in isolation. The one or more IOC-based threat detection instructions may specify the multi-hop relationship pattern by encoding a detection condition that is satisfied when (i) a subject user account is observed accessing the malicious domain, (ii) the subject user account is subsequently associated with authentication activity on a subject host device within a defined temporal window, and (iii) the subject host device initiates a communication with an additional domain that is not previously known to be associated with the subject user account. In some embodiments, satisfaction of the detection condition results in generation of a corresponding IOC-based security alert indicating a suspected multi-stage attack sequence associated with the at least one IOC. In another non-limiting example, the graph data structure may include a first node corresponding to the at least one IOC comprising a malicious file hash, a second node corresponding to a first process executed on a host device, a third node corresponding to a second process spawned by the first process, and a fourth node corresponding to a network endpoint, wherein edges between the nodes represent observed relationships including (i) execution of a file associated with the malicious file hash resulting in the first process, (ii) the first process spawning the second process, and (iii) the second process initiating a network communication with the network endpoint. In such an example, identifying the at least one multi-hop relationship pattern includes detecting a sequence of process execution and communication events that link the malicious file hash to the network endpoint through the first process and the second process. The multi-hop relationship pattern therefore captures a process lineage and outbound communication behavior indicative of command-and-control activity or malware propagation. The one or more IOC-based threat detection instructions may specify the multi-hop relationship pattern by encoding a detection condition that is satisfied when (i) a subject process corresponding to a file hash associated with the at least one IOC is executed, (ii) the subject process spawns at least one child process within a defined temporal window, and (iii) the at least one child process initiates a network communication with an external endpoint. In some embodiments, the detection condition may further require that the external endpoint is not included in a predefined set of trusted endpoints, thereby reducing false positives. In some embodiments, satisfaction of the detection condition results in generation of a corresponding IOC-based security alert indicating a suspected process-based attack chain associated with the at least one IOC, and the system may further annotate the alert with the identified process lineage and communication sequence derived from the graph data structure.

In one embodiment, the computer-implemented method further includes monitoring, over time, a decay characteristic associated with the at least one IOC, wherein the decay characteristic reflects a reduction in predictive usefulness of the at least one IOC; and modifying the one or more IOC-based threat detection instructions by: (i) reducing, based on the decay characteristic, a weighting of the at least one IOC in detection conditions, or (ii) removing, based on the decay characteristic, the at least one IOC from the one or more IOC-based threat detection instructions. For instance, in a non-limiting example, the at least one IOC may correspond to a malicious internet protocol address that was initially associated with a high volume of confirmed malicious communications across multiple computing environments within the retrospective query window. Over time, however, subsequent monitoring may indicate that occurrences of the malicious internet protocol address in newly ingested security event data decrease below a threshold frequency, or that the internet protocol address begins to appear in benign contexts, such as legitimate content delivery network traffic or reassigned infrastructure. In such an example, the decay characteristic is determined based on one or more factors including (i) a temporal decrease in detection frequency of the at least one IOC, (ii) a reduction in correlation between the at least one IOC and confirmed malicious activity, and (iii) an increase in false positive associations involving the at least one IOC. Based on the decay characteristic, the system reduces the weighting of the at least one IOC within the detection conditions, such that satisfaction of the detection conditions requires additional corroborating indicators beyond the at least one IOC. In some embodiments, when the decay characteristic satisfies a removal criterion, the at least one IOC is removed from the one or more IOC-based threat detection instructions, and the system may archive the at least one IOC in a historical IOC repository for potential future reference. In further embodiments, the system may automatically replace the at least one IOC with one or more derived indicators that maintain higher predictive usefulness, such as behavioral patterns or related entities identified from the historical security event data. In another non-limiting example, the at least one IOC may correspond to a file hash associated with a previously identified malware sample, wherein the file hash was initially observed in multiple confirmed malicious executions across a plurality of computing environments. Over time, however, software updates, re-compilation of the malware, or polymorphic variations may result in the file hash no longer appearing in newly observed security events, while functionally similar malicious behaviors persist. In such an example, the decay characteristic may be determined based on (i) an absence of the file hash in newly ingested security event data over a defined temporal interval, and (ii) continued detection of behaviorally similar activity patterns, such as process execution chains, network communication patterns, or registry modifications associated with the original malware sample. Based on the decay characteristic, the system may reduce reliance on the file hash within the detection conditions and instead increase weighting of the behaviorally derived indicators. In some embodiments, when the decay characteristic satisfies a substitution criterion, the system replaces the file hash in the one or more IOC-based threat detection instructions with one or more invariant characteristics of the malware, thereby maintaining detection coverage despite evolution of the underlying threat artifact. In this manner, the system adaptively transitions from static IOC-based detection to behavior-based detection in response to the observed decay characteristic. An invariant characteristic of the malware, as generally referred to herein, may be a feature, behavior, or structural attribute of the malware that remains substantially unchanged across multiple instances, variants, or obfuscated forms of the malware. In the context of the present disclosure, invariant characteristics may include, by way of non-limiting example: behavioral patterns, such as sequences of process executions, privilege escalation steps, or lateral movement techniques; communication patterns, such as recurring command-and-control beaconing intervals, protocol usage, or traffic structures; structural artifacts, such as code segments, function call relationships, or binary layout features that persist across compiled variants; and operational signatures, such as consistent use of particular system resources, registry modifications, or persistence mechanisms. In other words, invariant characteristics are distinguished from static indicators of compromise (IOCs) in that they are less susceptible to evasion through simple modification and therefore provide a more reliable basis for detecting related threat activity across polymorphic or evolving threat implementations.

In one embodiment, the computer-implemented method further includes modifying the temporal look-back parameter of the threat hunt object to specify a subsequent time span that is temporally later than the retrospective query window; re-generating, using the large language model, the plurality of distinct threat hunt queries based on the threat hunt object including the modified temporal look-back parameter, wherein each re-generated threat hunt query specifies a query window corresponding to the subsequent time span; executing the plurality of re-generated threat hunt queries across the plurality of distinct security devices to obtain additional security event data corresponding to the subsequent time span; and assessing the additional security event data against the one or more IOC-based threat detection instructions to generate one or more additional IOC-based security alerts. For instance, in a non-limiting example, the temporal look-back parameter initially specified in the threat hunt object may correspond to a retrospective query window of a prior time period (e.g., the previous 30 days), which is used to generate the plurality of distinct threat hunt queries for retrieving historical security event data. After construction of the one or more IOC-based threat detection instructions, the temporal look-back parameter may be modified to correspond to a current or near real-time time span (e.g., the most recent five minutes, hour, or day). In response to modifying the temporal look-back parameter, the large language model re-generates the plurality of distinct threat hunt queries such that each threat hunt query maintains the same query structure and inclusion of the at least one IOC, but specifies an updated query window corresponding to the current time span. Execution of the re-generated plurality of distinct threat hunt queries retrieves newly ingested security event data from the plurality of distinct security devices. In another non-limiting example, the temporal look-back parameter may be continuously updated according to a rolling time window, such that the plurality of distinct threat hunt queries are periodically re-generated and executed to retrieve incremental security event data as it becomes available. In this manner, the system transitions from retrospective threat hunting to continuous monitoring using a consistent query formulation derived from the threat hunt object.

In one embodiment, the computer-implemented method further includes reusing the plurality of distinct threat hunt queries to query security event data corresponding to a current time span that is temporally later than the retrospective query window, wherein: each threat hunt query of the plurality of distinct threat hunt queries is executed with a time parameter corresponding to the current time span while maintaining inclusion of the at least one IOC and a query structure generated by the large language model; execution of the plurality of distinct threat hunt queries with the time parameter corresponding to the current time span retrieves new security event data from the plurality of distinct security devices; and assessing the new security event data against the one or more IOC-based threat detection instructions to generate one or more additional IOC-based security alerts. For instance, in a non-limiting example, the plurality of distinct threat hunt queries may initially be generated to retrieve historical security event data within the retrospective query window (e.g., prior 30 days). After generation, the same plurality of distinct threat hunt queries may be reused, without modification to query structure or IOC inclusion, to retrieve security event data corresponding to a current time span (e.g., a most recent one-minute interval). In such an example, the time parameter associated with execution of each threat hunt query is updated at runtime to correspond to the current time span, while the remainder of each threat hunt query remains unchanged. Execution of the plurality of distinct threat hunt queries at each interval (e.g., every minute) retrieves newly ingested security event data generated during the current time span. In another non-limiting example, the plurality of distinct threat hunt queries may be repeatedly executed at successive intervals, each time with a time parameter corresponding to a most recent time span, thereby enabling continuous monitoring for occurrences of the at least one IOC without re-generating the plurality of distinct threat hunt queries using the large language model.

For instance, in a non-limiting example, the at least one IOC may correspond to a malicious domain (e.g., "bad-domain.com") identified from a security artifact associated with a phishing campaign. The plurality of distinct threat hunt queries generated by the large language model may include, for example, (i) a first query configured for an endpoint detection and response (EDR) system to identify process executions associated with the malicious domain, (ii) a second query configured for a network monitoring system to identify outbound connections to the malicious domain, and (iii) a third query configured for a domain name system (DNS) log repository to identify resolution requests for the malicious domain. Initially, the plurality of distinct threat hunt queries may be executed using a temporal look-back parameter corresponding to a retrospective query window (e.g., the prior 30 days) to identify historical security event data associated with the malicious domain and to construct the one or more IOC-based threat detection instructions. Subsequently, the same plurality of distinct threat hunt queries may be reused, without modification to the query structure or inclusion of the malicious domain, to query security event data corresponding to a current time span (e.g., the most recent one-minute interval). For example, every minute, the system executes the same queries against the EDR system, the network monitoring system, and the DNS log repository, but with a time parameter corresponding to the most recent minute. In such an example, if a host device within a computing environment initiates a new outbound connection to "bad-domain.com" during the current one-minute interval, the corresponding query executed against the network monitoring system retrieves the new security event. The system then assesses the new security event against the one or more IOC-based threat detection instructions and generates a corresponding IOC-based security alert in real time. In this manner, the system implementing method 200 leverages the same plurality of distinct threat hunt queries for both retrospective threat hunting and continuous real-time monitoring, thereby reducing computational overhead associated with re-generating queries while maintaining consistent detection logic across historical and current security event data.

Stated another way, in one or more embodiments, the plurality of distinct threat hunt queries generated by the large language model are persisted and reused as executable query artifacts, such that the plurality of distinct threat hunt queries are decoupled from the temporal look-back parameter after initial generation. In such embodiments, execution of the plurality of distinct threat hunt queries is controlled by dynamically supplied time parameters at runtime, rather than requiring re-generation or structural modification of the queries. Accordingly, the same plurality of distinct threat hunt queries may be repeatedly executed across different time spans, including both retrospective query windows and current or near real-time intervals, by varying only the time parameter supplied during execution. This approach enables consistent application of IOC-based query logic, while reducing computational overhead and latency associated with repeatedly invoking the large language model to regenerate queries for each time span. In some embodiments, the plurality of distinct threat hunt queries are stored in a query execution layer and invoked by one or more pollers that supply updated time parameters corresponding to successive time intervals (e.g., minute-by-minute intervals). As a result, the cybersecurity event detection and response service provides continuous monitoring for occurrences of the at least one IOC using a stable set of query definitions that are adaptable to evolving time windows.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Remote Cyber Security Operations & Automated Investigations

Figure 1:
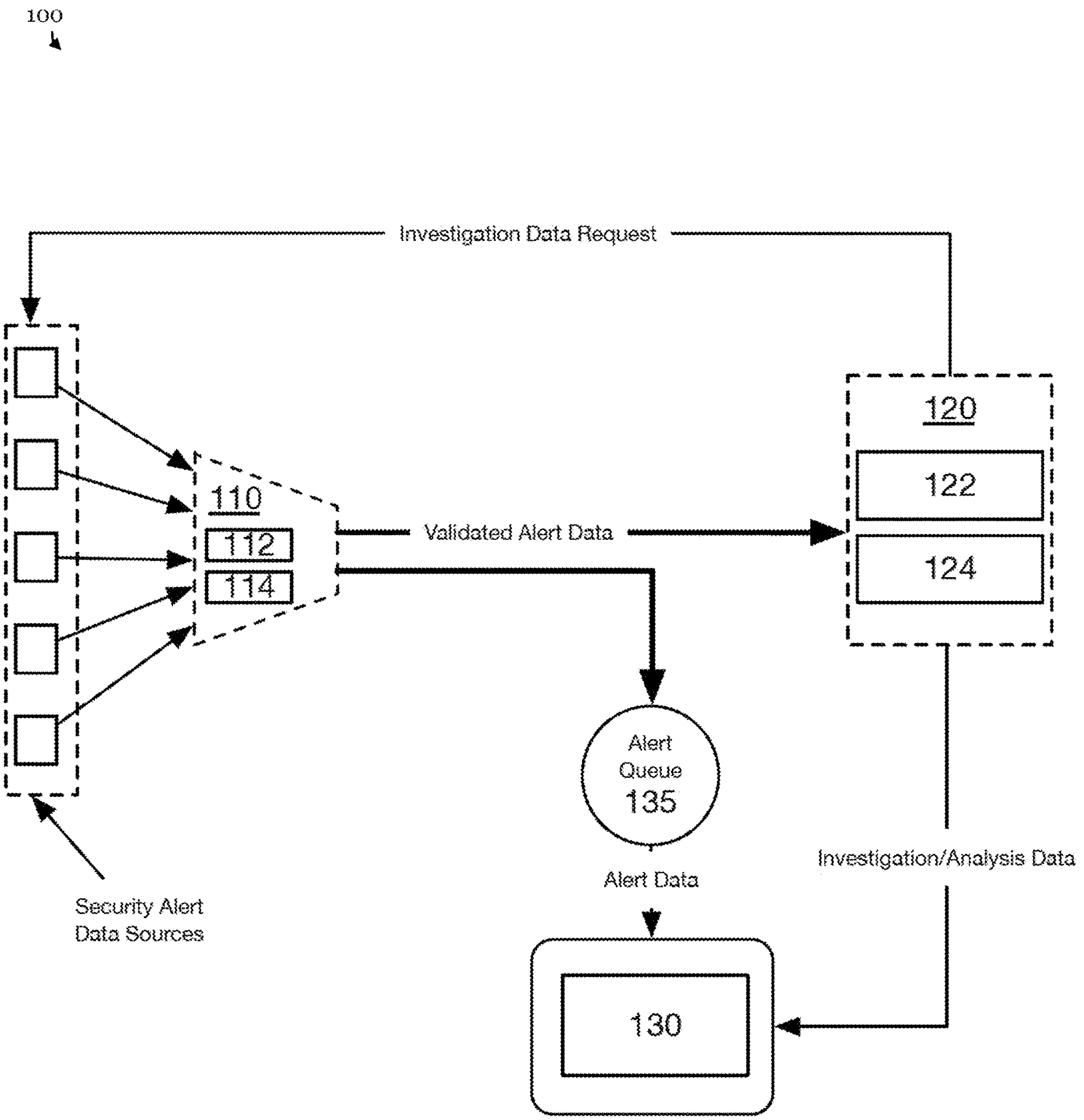
FIG. 1 illustrates a schematic representation of a system 100 in accordance with one or more embodiments of the present application.

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100 or a cybersecurity event detection and response service.

The system 100 may function to enable real-time cybersecurity threat detection, agile, and intelligent threat response for mitigating detected security threats.

1.1 Security Alert Engine

The security alert aggregation and identification module 110, sometimes referred to herein as the "security alert engine 110" may be in operable communication with a plurality of distinct sources of cyber security alert data. In one or more embodiments, the module 110 may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine 110 may include a security threat detection logic module 112 that may function to assess inbound security alert data using predetermined security detection logic that may validate or substantiate a subset of the inbound alerts as security threats requiring an escalation, an investigation, and/or a threat mitigation response by the system 100 and/or by a subscriber to the system 100.

Additionally, or alternatively, the security alert engine 100 may function as a normalization layer for inbound security alerts from the plurality of distinct sources of security alert data by normalizing all alerts into a predetermined alert format.

1.1.1 Security Alert Machine Learning Classifier

Optionally, or additionally, the security alert engine 110 may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform 110.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine

The automated security investigations engine 120, which may be sometimes referred to herein as the "investigations engine 120", preferably functions to automatically perform investigative tasks for addressing a security task and/or additionally, resolve a security alert. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional or to remove one or more of the plurality of distinct investigation instructions/scripts or investigation rules.

1.3 Security Threat Mitigation User Interface

The security mitigation user interface 130 (e.g., Workbench) may function to enable an analyst or an administrator to perform, in a parallel manner, monitoring, investigations, and reporting of security incidents and resolutions to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible to a subscribing entity.

Accordingly, in or more embodiments, a system user (e.g., an analyst) or an administrator implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security mitigation user interface 130 may include and/or may be in digital communication with a security alert queue 135 that stores and prioritizes validated security alerts.

2. Method for Automated Threat Detection Using Retrospective and Prospective Assessment of Emerging Indicators of Compromise (IOCs)

Figure 2:
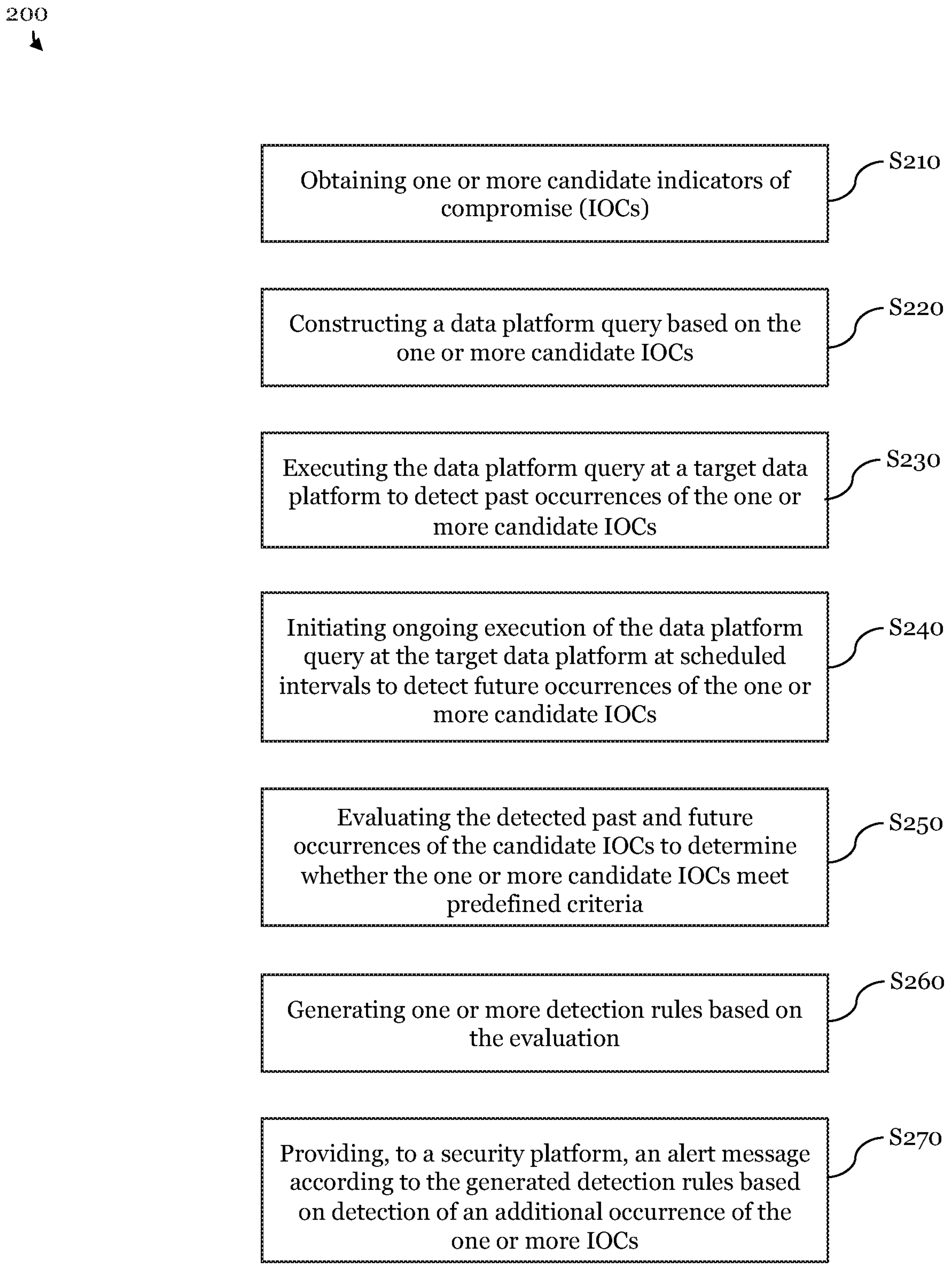
FIG. 2 illustrates an example method 200 in accordance with one or more embodiments of the present application.

As shown in FIG. 2, a method 200 for automated threat detection using retrospective and prospective assessment of emerging IOCs may include obtaining one or more candidate IOCs S210; constructing a data platform query based on the one or more candidate IOCs S220; executing the data platform query at a target data platform to detect past occurrences of the one or more candidate IOCs S230; initiating ongoing execution of the data platform query at the target data platform at scheduled intervals to detect future occurrences of the one or more candidate IOCs S240; evaluating the detected past and future occurrences of the candidate IOCs to determine whether one or more IOCs meet predefined criteria S250; generating one or more detection rules based on the evaluation S260; and providing, to a security platform, an alert message according to the generated detection rules based on detection of an additional occurrence of the one or more IOCs S270.

In one or more embodiments, a system or service implementing method 200 may additionally or alternatively use one or more processes and/or system components as described in U.S. patent application Ser. No. 19/059,945, titled SYSTEMS AND METHODS FOR AUTOMATICALLY TUNING ONE OR MORE API POLLERS IN A CYBERSECURITY EVENT DETECTION AND RESPONSE SERVICE, U.S. patent application Ser. No. 18/123,137, titled SYSTEMS AND METHODS FOR ACCELERATED REMEDIATIONS OF CYBERSECURITY ALERTS AND CYBERSECURITY EVENTS IN A CYBERSECURITY EVENT DETECTION AND RESPONSE PLATFORM, U.S. patent application Ser. No. 19/235,089, titled SYSTEMS AND METHODS FOR MACHINE LEARNING-BASED EVENT SIMILARITY DETECTION, EVENT SIMILARITY EXPLAINABILITY, AND EVENT HANDLING, U.S. patent application Ser. No. 19/304,982, titled SYSTEMS AND METHODS FOR REAL-TIME GENERATION AND EXECUTION OF COMPUTER-EXECUTABLE INVESTIGATIVE QUERIES IN A CYBERSECURITY EVENT DETECTION AND RESPONSE PLATFORM, U.S. patent application Ser. No. 18/749,222, titled SYSTEMS, METHODS, AND GRAPHICAL USER INTERFACES FOR ACCELERATING A CONSTRUCTION OF A DATA INTEGRATION FOR A NON-INTEGRATED TECHNOLOGY DATA SOURCE, U.S. patent application Ser. No. 19/054,568, titled SYSTEMS AND METHODS FOR AUTOMATICALLY CREATING NORMALIZED SECURITY EVENTS IN A CYBERSECURITY THREAT DETECTION AND MITIGATION PLATFORM, U.S. patent application Ser. No. 18/793,483, titled SYSTEMS, METHODS, AND GRAPHICAL USER INTERFACES FOR CONFIGURING AND IMPLEMENTING COMPUTER-EXECUTABLE DETECTION INSTRUCTIONS IN A CYBERSECURITY THREAT DETECTION AND MITIGATION PLATFORM, and U.S. patent application Ser. No. 18/820,043, titled SYSTEMS, METHODS, AND GRAPHICAL USER INTERFACES FOR CONFIGURING AND EXECUTING ONE OR MORE COMPUTER-EXECUTABLE THREAT HUNTING PROTOCOLS IN A CYBERSECURITY THREAT DETECTION AND MITIGATION PLATFORM, which are incorporated herein in their entireties by this reference.

The techniques described herein may be associated with one or more advantages. For instance, conventional security systems may not rely on emerging IOCs to detect security threats. Not using IOCs to detect security threats may cause a delay in identifying newly emerging or evolving attack vectors. This delay may grant time for an attacker to infiltrate a target environment and may thus result in an increased risk of system compromise. In contrast, the systems and methods described herein may improve threat detection speed by enabling candidate IOCs to be analyzed via retrospective analysis and monitored via prospective analysis, enabling emerging IOCs to be identified in real-time or near real-time. By enabling direct identification of emerging threats, the techniques described herein may shorten a time window between threat emergence and detection, decreasing potential exposure of protected systems to undetected malicious activity.

2.10 Obtaining Candidate IOC(s)

Figure 3:
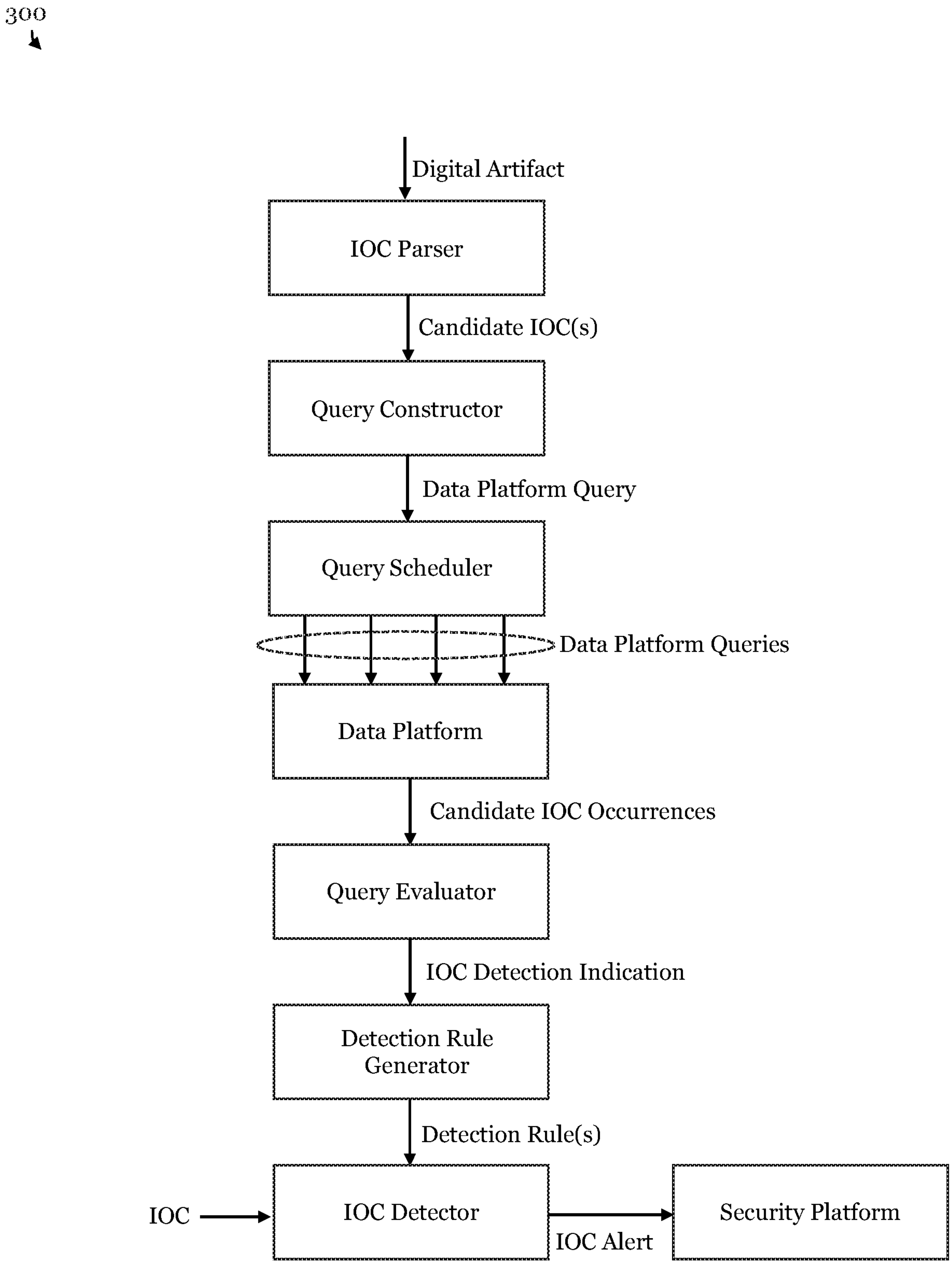
FIG. 3 illustrates an example schematic of a system or service implementing the method 200 in accordance with one or more embodiments of the present application.

S210, which includes obtaining one or more candidate IOCs, may function to extract, from one or more digital artifacts (e.g., security artifacts or the like) and via one or more processing devices of the emerging threat detection service (e.g., the cybersecurity event detection and response service), one or more candidate IOCs. In a non-limiting example, as described with reference to FIG. 3, an IOC parser may obtain a digital artifact and may extract, from the digital artifact, one or more candidate IOCs.

The term "IOC" may refer to a data artifact or piece of evidence that is used to identify potentially malicious activity within a computer system, network, or digital environment. IOCs may include, but are not limited to, specific IP addresses, domain names, file hashes (e.g., MD5, SHA-1, SHA-256), Uniform Resource Locators (URLs), email addresses, user agent strings, file names, file paths, command line artifacts, and autonomous system numbers (ASNs). These data artifacts may signify the presence of unauthorized access, malware, data exfiltration, or other types of security incidents. The presence of an IOC within system logs or network traffic may indicate that a system has been compromised or is at risk of compromise.

A candidate IOC may be a data artifact that has been preliminarily identified as being potentially associated with malicious activity, but which has not yet been fully validated or confirmed (e.g., a potential emerging threat). Candidate IOCs may undergo further assessment to determine their relevance as indicators of security threats (e.g., via retrospective or prospective assessment as described herein). Based on such assessment, a candidate IOC may be promoted to a confirmed IOC when predefined criteria are met.

The term "digital artifact" may refer to a discrete unit of electronically stored information that serves as evidence of activity within a computing environment. Non-limiting examples of a digital artifact may include network traffic records, system logs, authentication events, file metadata, process creation records, command line entries, application programming interface (API) call traces, or telemetry from endpoints of cloud-based monitoring systems. Candidate IOCs may be extracted from digital artifacts by identifying patterns, attributes, or values that correspond to anomalous, unauthorized, or malicious behavior. For instance, a suspicious IP address parsed from a firewall log or a file hash extracted from endpoint telemetry may each be an example of a candidate IOC extracted from a digital artifact (e.g., security artifact or the like).

Figure 4:
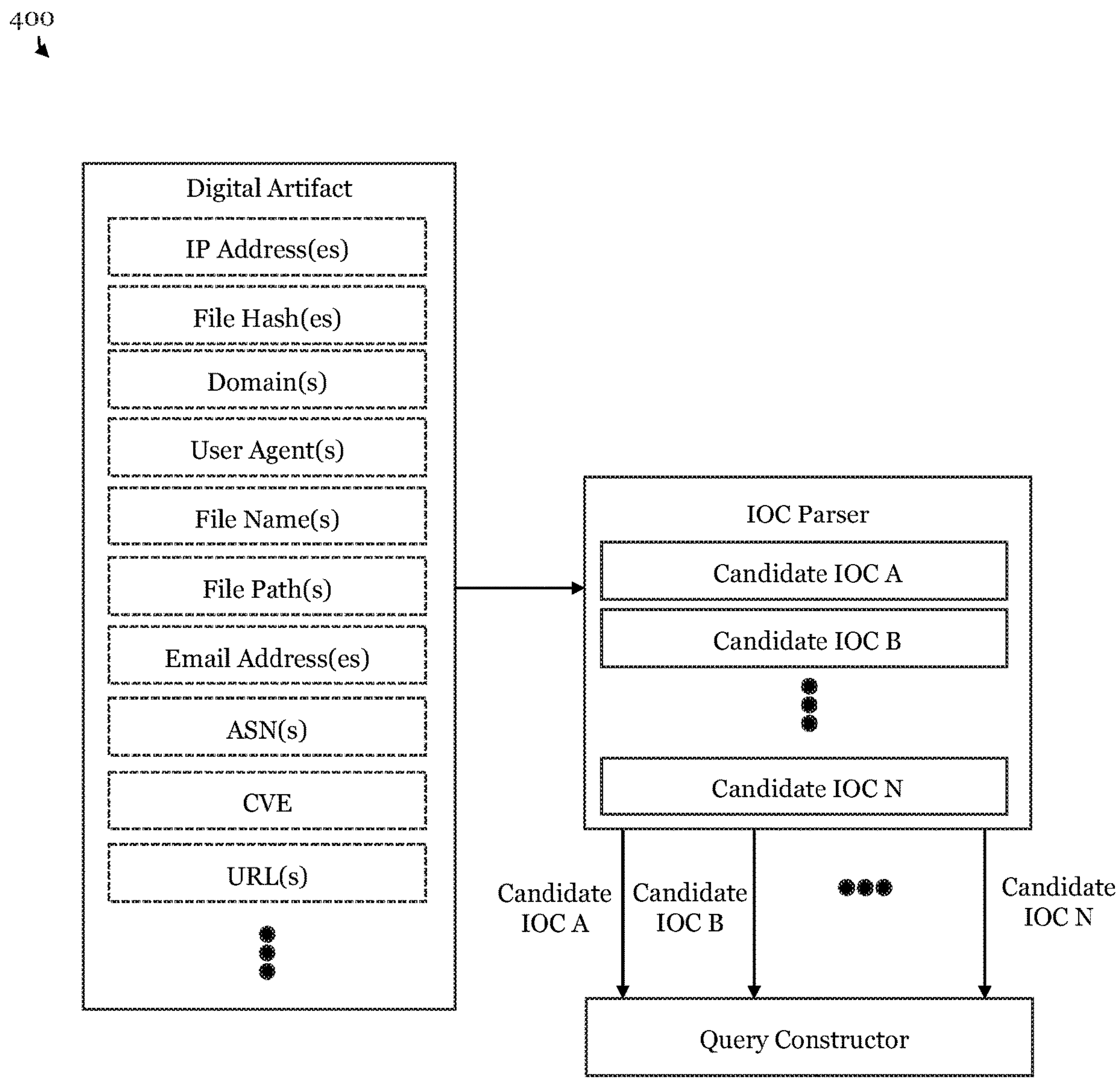
FIG. 4 illustrates an example schematic of a candidate IOC parsing procedure in accordance with one or more embodiments of the present application.

In a non-limiting example, as described with reference to FIG. 4, a digital artifact may include data artifacts, such as one or more IP addresses, file hashes, domains, user agents, file names, file paths, email addresses, ASNs, common vulnerabilities and exposures (CVE), or URLs. An IOC parser may detect one or more of the data artifacts as a candidate IOC and may output the candidate IOCs to a query constructor.

Figure 5:
FIG. 5 illustrates an example representation of a digital artifact in accordance with one or more embodiments of the present application.

FIG. 5 may depict a non-limiting example of a digital artifact (e.g., a YAML file). The digital artifact may include data artifacts, such as file names ("file_names"), file hashes ("file_hashes"), domain names ("net_domains"), and IP addresses ("net_ips"). Some or each of these data artifacts may be identified as a respective IOC and may be extracted from the digital artifact for inclusion in query construction.

In one or more embodiments, a system (e.g., system 100) or service (e.g., cybersecurity event detection and response service) implementing method 200 may use one or more indicators of compromise (IOCs) to perform, in real-time or near real-time, a retrospective assessment of historical security event data to identify a subset of the historical security event data that is associated with the one or more IOCs. Additionally, in such an embodiment, the system or service implementing method 200 may function to use the one or more IOCs to continuously scan and/or monitor new events occurring at one or more computing environments of subscribers to the cybersecurity event detection and response service to detect, in real-time or near real-time, suspicious or malicious activity occurring at the one or more computing environments of the subscribers. In other words, the one or more IOCs may be used to identify previously missed malicious digital activity and to detect ongoing or newly occurring malicious digital activity across the one or more computing environments.

In one or more embodiments, a system or service implementing method 200 may function to detect, in real-time or near real-time, at least one indicator of compromise (e.g., one indicator of compromise (IOC), two IOCs, twenty IOCs, four hundred IOCs, etc.) included in a security artifact. The at least one IOC, in one or more embodiments, may specify one or more (e.g., detected malicious) filenames, one or more (e.g., detected malicious) file hashes (e.g., md5 file hash, sha256 file hash, sha1 file hash, etc.), one or more (e.g., detected malicious) domains, one or more (e.g., detected malicious) internet protocol addresses, one or more (e.g., detected malicious) user agents, one or more (e.g., detected malicious) file paths, one or more (e.g., detected malicious) command lines, one or more (e.g., detected malicious) email addresses, one or more (e.g., detected malicious) autonomous system numbers (ASNs), one or more common security vulnerabilities and exposures (e.g., CVE), one or more (e.g., detected malicious) uniform resource locators.

A malicious filename, as generally referred to herein, may be a string of characters that identifies a computer file within a computer file system, wherein the computer file is associated with malicious activity or is indicative of a security threat.

A malicious file hash, as generally referred to herein, may be a fixed-length alphanumeric value generated by applying a hashing algorithm to a computer file, wherein the computer file is associated with malicious activity or is indicative of a security threat.

A malicious domain, as generally referred to herein, may be an identifier corresponding to a network location, wherein the network location is associated with malicious activity or is indicative of a security threat.

A malicious internet protocol address, as generally referred to herein, may be a numerical label or unique set of characters (e.g., 17.172.224.47) assigned to a network interface of a computing device that communicates over an internet protocol network, wherein the internet protocol address is associated with malicious activity or is indicative of a security threat.

A malicious file path, as generally referred to herein, may be a sequence of directory and file identifiers that specifies a location of a computer file within a computer file system, wherein the file path is associated with malicious activity or is indicative of a security threat.

A malicious command line, as generally referred to herein, may be a string of text that specifies one or more instructions executable by a computing device, wherein the command line is associated with malicious activity or is indicative of a security threat.

A malicious email address, as generally referred to herein, may be an identifier corresponding to an electronic mail account, wherein the electronic mail account is associated with malicious activity or is indicative of a security threat.

A malicious autonomous system number (ASN), as generally referred to herein, may be a unique identifier assigned to a network or group of networks under a common routing policy, wherein the network or the group of networks associated with the ASN is associated with malicious activity or is indicative of a security threat.

A malicious common vulnerability and exposure (CVE), as generally referred to herein, may be a standardized identifier corresponding to a known security vulnerability in software or hardware (e.g., CVE-2021-44228, CVE-2020-1472), wherein the vulnerability is associated with malicious activity or is indicative of a security threat.

A malicious uniform resource locator (URL), as generally referred to herein, may be a string of characters that specifies a location of a resource on a network (e.g., http://malicious-example.com/payload.exe, https://bad-domain.net/login/credential-harvest), wherein the resource is associated with malicious activity or is indicative of a security threat.

It shall be recognized that, in one or more embodiments, the system or service implementing method 200 may function to receive, over a computer network, a third-party threat intelligence data feed (e.g., security artifact) that includes threat intelligence data comprising a plurality of distinct candidate IOCs. In such an embodiment, detecting the at least one IOC may include assessing the plurality of distinct candidate IOCs to identify at least one candidate IOC included in the plurality of distinct candidate IOCs that was not previously recognized by the cybersecurity event detection and response service as a known IOC (e.g., confirmed IOC or the like) and, in response, designating the at least one candidate IOC as the at least one IOC. A third-party threat intelligence data feed, as generally referred to herein, may refer to any external data source provided by a third-party system or organization (e.g., an Information Sharing and Analysis Center (ISAC), threat intelligence provider, or security research entity) that includes threat intelligence data, such as candidate IOCs, indicators of malicious activity, or security artifacts.

For instance, in a non-limiting example, the third-party threat intelligence data feed may include a plurality of candidate IOCs comprising a set of file hashes, a set of internet protocol addresses, and a set of domains (e.g., "abc123hashvalue", "192.168.10.5", and "bad-domain.com"). In such an example, the cybersecurity event detection and response service may assess the plurality of candidate IOCs and determine that "bad-domain.com" is not included in a set of previously recognized IOCs stored by the cybersecurity event detection and response service. In response to determining that "bad-domain.com" is not previously recognized, the cybersecurity event detection and response service may designate "bad-domain.com" as the at least one IOC and generate, in real-time or near real-time, a respective IOC-based threat detection instruction that specifies the "bad-domain.com" and is operably configured to (i) assess security event data obtained from one or more security devices to identify security events that include event metadata corresponding to "bad-domain.com" and, in response, (ii) generate an IOC-based security alert when a security event includes event metadata corresponding to "bad-domain.com."

2.20 Constructing a Data Platform Query

S220, which includes constructing a data platform query, may function to automatically construct, via one or more processing devices of the emerging threat detection service (e.g., cybersecurity event detection and response service), one or more respective queries (e.g., a plurality of distinct threat hunt queries or the like) for one or more respective data platforms based on the extracted candidate IOCs. In a non-limiting example, as described with reference to FIG. 3, a query constructor may automatically construct, in real-time or near real-time, one or more respective queries for one or more respective data platforms based on candidate IOCs received from an IOC parser.

The term "data platform" may refer to a computing environment, system, endpoint detection and response device, endpoint detection and response service, or any other suitable security service capable of storing, processing, and querying structured, semi-structured, or unstructured data. Data platforms may serve as a repository for telemetry data, security events, system logs, network traffic records, endpoint activity, and other digital artifacts relevant to detecting threats. Data platforms may provide APIs that enable external systems (e.g., the emerging threat detection system) to retrieve data from them (e.g., via queries). Examples of data platforms may include, but not be limited to, BigQuery, Sumo Logic, Microsoft Defender, Azure Sentinel, or Splunk. In some examples, a security information and event management (SIEM) platform (e.g., Sumo Logic) or an endpoint detection and response (EDR) platform (e.g., Microsoft Defender) may each be an example of a data platform.

The term "data platform query" may refer to a structured set of instructions configured to retrieve and filter data from a data platform. The data platform query may be written in a platform-specific query language (e.g., SQL, Kusto Query Language (KQL)). A data platform query may be constructed to locate potentially malicious activity by matching against one or more candidate IOCs (e.g., the candidate IOCs detected at S210).

To construct a data platform query from extracted candidate IOCs, an emerging threat detection service may identify one or more data platforms to query. The emerging threat detection service may then generate a respective query for each of the identified one or more data platforms. To generate a query, the emerging threat detection service may assemble conditional expressions corresponding to each candidate IOC, may logically combine multiple conditions using logical operators (e.g., Boolean operators), and may insert temporal filters (e.g., a temporal look-back parameter, a retrospective query window, or the like) to constrain the query to a particular time window.

Figure 6:
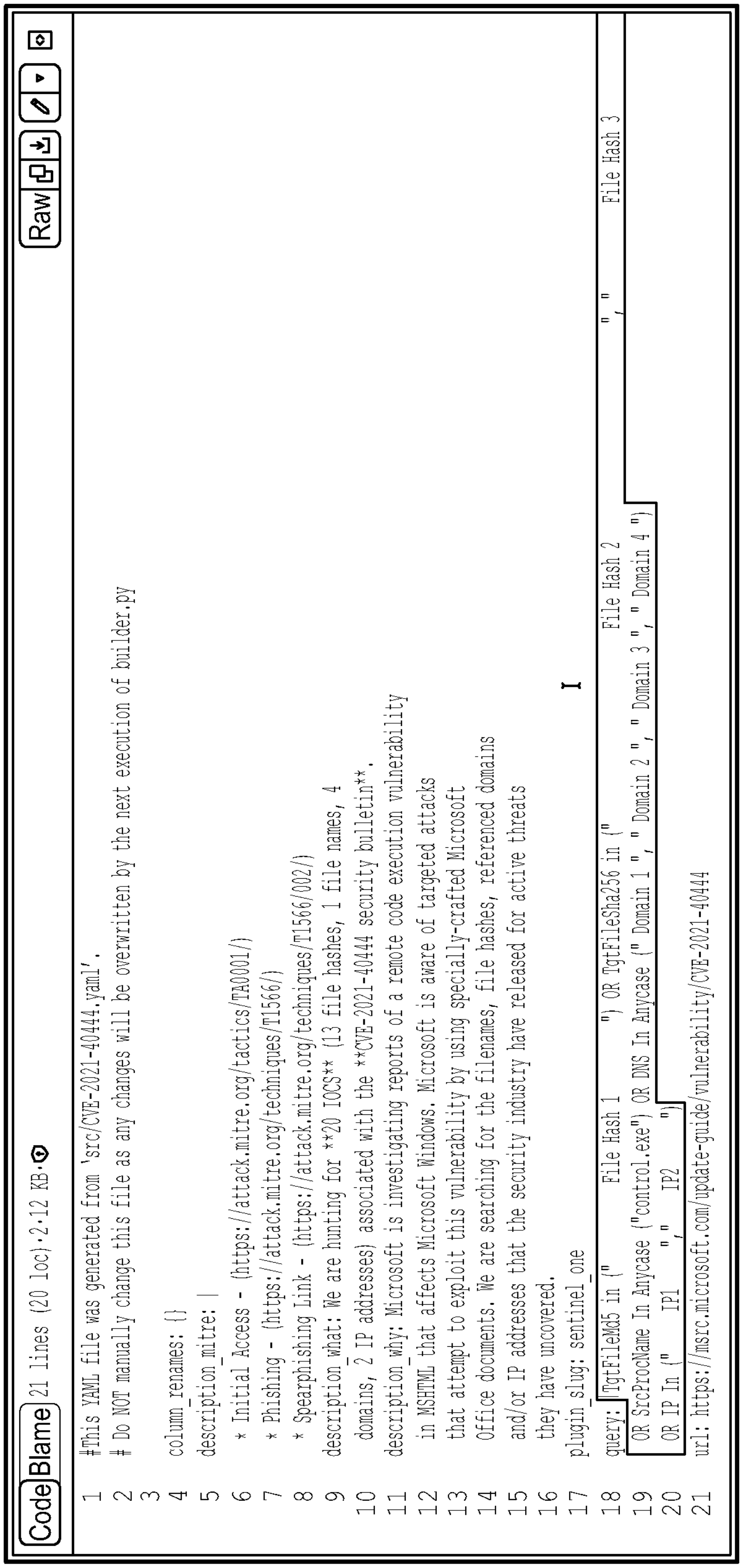
FIG. 6 illustrates an example of a constructed platform query in accordance with one or more embodiments of the present application.

FIG. 6 may depict a non-limiting example of a query constructed from the digital artifact depicted in FIG. 5. For instance, the query may indicate candidate IOCs related to file hashes (e.g., candidate IOCs indicated by "TgtFileMd5" or "TgtFileSha256"), candidate IOCs related to file names (e.g., candidate IOCs indicated by "SrcProcName"), candidate IOCs related to domains (e.g., candidate IOCs indicated by "DNS"), and candidate IOCs related to IP addresses (e.g., candidate IOCs indicated by "IP").

Stated differently, in one or more embodiments, in response to detecting the at least one IOC, the system or service implementing method 200 may function to automatically generate, in real-time or near real-time, a threat hunt object that specifies the at least one IOC, a temporal look-back parameter, and a plurality of distinct security devices eligible for IOC-based querying. In one or more embodiments, the at least one IOC included in the threat hunt object may be used to identify security event data stored at the plurality of distinct security devices that is associated with or digitally mapped to the at least one IOC.

The temporal look-back parameter, in one or more embodiments, may specify a retrospective time window over which the plurality of distinct security devices are to be queried to identify historical security event data associated with the at least one IOC. For instance, in a non-limiting example, the temporal look-back parameter may specify fourteen days, seven days, thirty days, or any other defined duration preceding a current time at which the plurality of distinct threat hunt queries are executed. In such a non-limiting example, if the temporal look-back parameter specified 14 days, the plurality of distinct threat hunt queries may be configured to retrieve historical security event data (e.g., a plurality of historical security events) from each of the plurality of distinct security devices preceding a reference time. The reference time, in such an embodiment, may correspond to (i) a time at which the plurality of distinct threat hunt queries are executed or (ii) a time at which the at least one IOC was detected. In other words, the plurality of distinct threat hunt queries may be configured to retrieve historical security event data that occurred within a target duration prior to either execution of the plurality of distinct threat hunt queries or detection of the at least one IOC.

Additionally, or alternatively, in such an embodiment, a threat hunt object may include a set of instructions that instructs a large language model to generate a distinct threat hunt query for each of the plurality of distinct security devices eligible for IOC-based querying. The set of instructions, in one or more embodiments, may function as a prompt that guides the large language model in generating the distinct threat hunt query for each of the plurality of distinct security devices eligible for IOC-based querying. For instance, in a non-limiting example, the set of instructions may specify one or more query generation constraint parameters such as a maximum query size (e.g., maximum number of characters that can be included in a respective threat hunt query generated by the large language model), a maximum number of IOCs (e.g., ten, twenty, thirty, forty, etc.) per threat hunt query generated by the large language model, one or more query formatting requirements of a corresponding query language, one or more syntactic or semantic rules associated with each of the plurality of distinct security devices, a maximum number of results retrievable per query (e.g., one hundred, one thousand, etc.), and one or more rate-limiting constraints associated with an application programming interface of a respective security device. A rate-limiting constraint, as generally referred to herein, may be a restriction that limits a number of requests (e.g., query executions, API calls) that can be made to a system, service, or device within a defined period of time (e.g., per second, per minute, per hour), wherein exceeding the restriction may result in throttling, delayed processing, or rejection of additional requests.

In one or more embodiments, the system or service implementing method 200 may function to identify or detect the plurality of distinct security devices eligible for IOC-based querying by assessing one or more configuration settings, integration states, or communication capabilities of the cybersecurity event detection and response service to determine which of the plurality of distinct security devices are accessible, available, and capable of executing IOC-based queries. For instance, in a non-limiting example, the system or service may select, from a larger set of integrated security devices (e.g., 1000 security devices), a subset of distinct security devices (e.g., 25 of the 1000) based on an IOC type or IOC class of the at least one IOC, such that only those security devices capable of processing or querying for the IOC type or IOC class are included in the plurality of distinct security devices eligible for IOC-based querying. In another non-limiting example, the system or service may select, from the larger set of integrated security devices (e.g., 1000 security devices), a subset of distinct security devices (e.g., 50 of the 1000) corresponding to endpoint detection and response (EDR) devices, such that only the EDR devices of the larger set of integrated security devices are included in the plurality of distinct security devices eligible for IOC-based querying.

At least one technical benefit of generating a threat hunt object, in one or more embodiments, includes enabling automated and targeted querying across the plurality of distinct security devices by constraining query execution to only those security devices that are relevant to the at least one IOC, thereby reducing unnecessary computational overhead, minimizing network resource consumption, and improving an efficiency and speed of identifying security event data associated with the at least one IOC.

Figure 14:
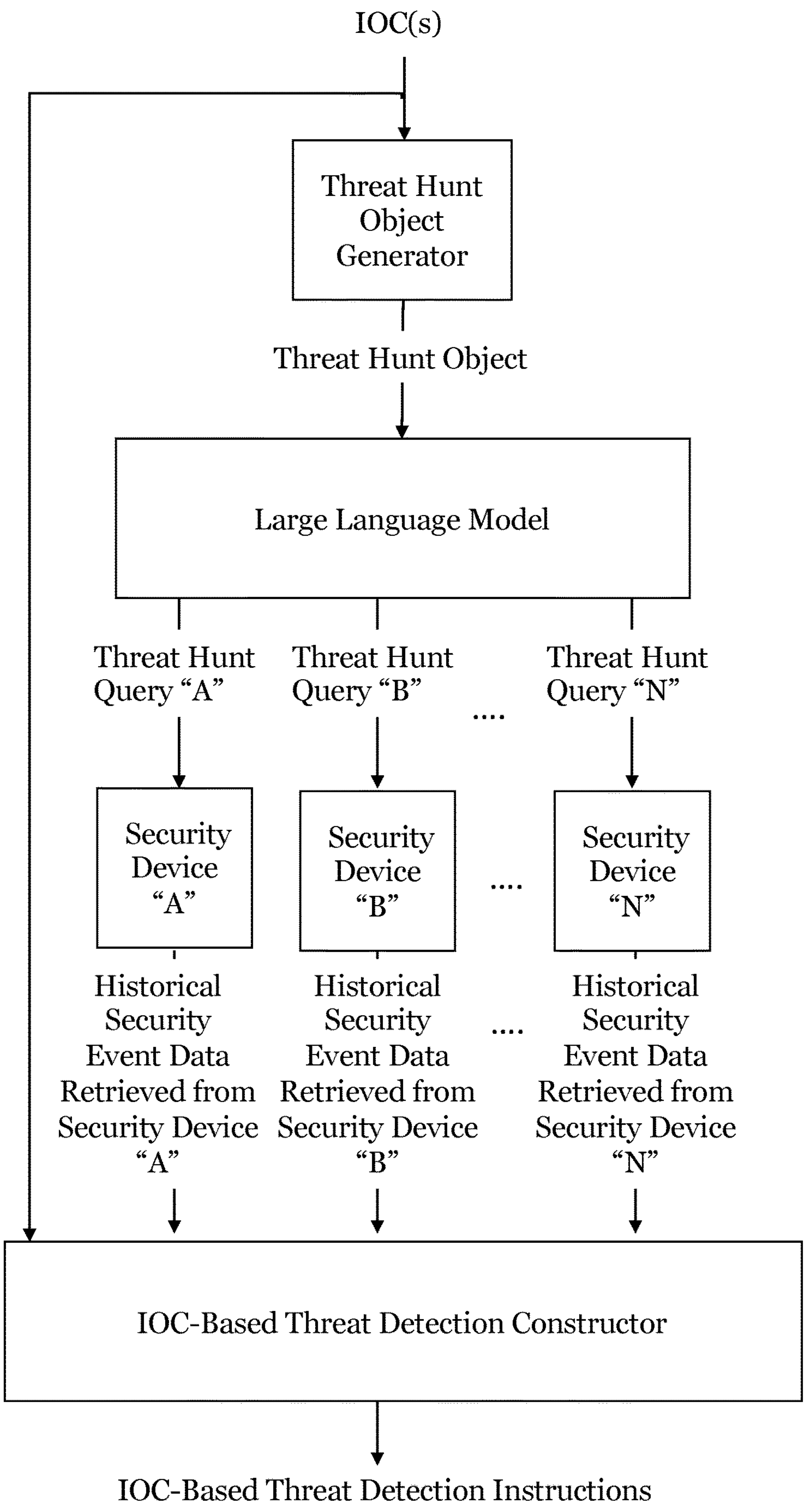
FIGS. 14-16 illustrate an example of using a large language model to generate and execute threat hunt queries in accordance with one or more embodiments of the present application.

Another technical benefit of generating the threat hunt object, in one or more embodiments, includes enabling device-agnostic query generation, such that a single threat hunt object may be translated by the large language model into a plurality of distinct threat hunt queries corresponding to the plurality of distinct security devices, thereby reducing complexity associated with generating device-specific queries and improving scalability of IOC-based threat hunting across heterogeneous security environments, as shown generally by way of example in FIG. 14.

Additionally, in one or more embodiments, the system or service implementing method 200 may function to provide the threat hunt object to a large language model and, in response, the large language model may function to translate the threat hunt object into a plurality of distinct threat hunt queries. In such an embodiment, each threat hunt query of the plurality of distinct threat hunt queries may be written in a distinct query language required by a distinct security device of the plurality of distinct security devices. Additionally, in such an embodiment, each threat hunt query of the plurality of distinct threat hunt queries may include the at least one IOC and specify a retrospective query window based on the temporal look-back parameter included in the threat hunt object.

For instance, in a non-limiting example, the threat hunt object may include an IOC corresponding to a malicious file hash (e.g., "abc123def456"), a temporal look-back parameter specifying seven days, and a plurality of distinct security devices including a first endpoint detection and response (EDR) device, a second security information and event management (SIEM) system, and a third cloud security service. In response to providing the threat hunt object to the large language model, the large language model may generate a first threat hunt query formatted in a first query language required by the first EDR device (e.g., a query that searches process execution logs for the malicious file hash within the seven-day window), a second threat hunt query formatted in a second query language required by the SIEM system (e.g., a structured query that obtains log records containing the malicious file hash within the seven-day window), and a third threat hunt query formatted in a third query language required by the cloud security service (e.g., an API-compatible query that retrieves events associated with the malicious file hash within the seven-day window). In such an example, each of the plurality of distinct threat hunt queries may be syntactically and semantically tailored to the respective security device while representing a logically equivalent query for retrieving security event data associated with the malicious file hash within the specified retrospective time window.

In another non-limiting example, the threat hunt object may include a first IOC corresponding to a malicious file hash (e.g., "abc123def456") and a second IOC corresponding to a malicious internet protocol address (e.g., "192.168.1.10"), a temporal look-back parameter specifying fourteen days, and a plurality of distinct security devices including a first endpoint detection and response (EDR) device and a second security information and event management (SIEM) system. In response to providing the threat hunt object to the large language model, the large language model may generate a first threat hunt query formatted in a first query language required by the first EDR device, wherein the first threat hunt query includes a first portion configured to search process or file-related event data for the malicious file hash and a second portion configured to search network connection event data for the malicious internet protocol address within the fourteen-day window. Additionally, the large language model may generate a second threat hunt query formatted in a second query language required by the SIEM system, wherein the second threat hunt query includes one or more filtering conditions that identify log entries containing either the malicious file hash or the malicious internet protocol address within the fourteen-day window. In such an example, the large language model may map each IOC to a corresponding field identifier of the respective query language (e.g., a file hash field and a destination IP field), such that the plurality of distinct threat hunt queries collectively enable identification of security event data associated with multiple IOC classes across the plurality of distinct security devices.

For instance, in a non-limiting example, the threat hunt object may include a first IOC corresponding to a malicious MD5 file hash, a second IOC corresponding to a malicious SHA256 file hash, a third IOC corresponding to a malicious process name, and a fourth IOC corresponding to one or more malicious domains, together with a temporal look-back parameter specifying a retrospective time window and a plurality of distinct security devices including a SentinelOne® security device. In response to providing the threat hunt object to the large language model, the large language model may generate a threat hunt query for the SentinelOne® security device in a query language required by the SentinelOne® security device, such as: "TgtFileMd5 in ("1d2094ce85d66878ee079185e2761beb") OR TgtFileSha256 in ("049ed15ef970bd12ce662cffa59f7d0e0b360 d47fac556ac3d36f2788a2bc5a4", "199b9e9a75334 31731fbb08ff19d437de1de6a7c4d7ce0f6c2b8d5b3f7a91c 21") OR SrcProcName in AnyCase ("command.exe") OR DNS in AnyCase ("dodpet.com", "hifusy.com", "diamond-.com", "pawchain.com"), together with a time constraint corresponding to the temporal look-back parameter. The large language model, in such a non-nonlimiting example, may map each IOC to a corresponding field identifier of the SentinelOne® query language such that the generated threat hunt query enables identification of historical security event data associated with multiple IOC classes within the specified retrospective time window.

Stated another way, in one or more embodiments, the system or service implementing method 200 may function to provide the threat hunt object to a large language model, and the large language model may function to interpret the at least one IOC, the temporal look-back parameter, and the plurality of distinct security devices specified in the threat hunt object to generate, for each of the plurality of distinct security devices, a corresponding threat hunt query that includes the at least one IOC and a retrospective query window based on the temporal look-back parameter and that is formatted in accordance with a query language required by the respective security device. At least one technical benefit of using the large language model includes enabling concurrent generation of the plurality of distinct threat hunt queries for the plurality of distinct security devices, thereby reducing latency associated with query generation and improving responsiveness of IOC-based threat hunting across the plurality of distinct security devices. Another technical benefit of using the large language model includes accelerating a speed at which the plurality of distinct threat hunt queries are generated for the plurality of distinct security devices, thereby enabling faster execution of IOC-based threat hunting across the plurality of distinct security devices.

It shall be recognized that, in one or more embodiments, the system or service implementing method 200 may function to train a target large language model to translate threat hunt objects into threat hunt queries. In such an embodiment, the system or service may generate a training corpus by constructing a plurality of training data samples, wherein each training data sample of the plurality of training data samples associates a threat hunt object (e.g., threat hunt data object or the like) with (i) a plurality of threat hunt queries generated for a plurality of distinct security devices and (ii) query execution findings data obtained from execution of each of the plurality of threat hunt queries.

For instance, in a non-limiting example, a respective training data sample of the plurality of training data samples may include a respective threat hunt object that specifies (a) a first IOC corresponding to a malicious SHA256 file hash (e.g., "049ed15ef970bd12"), (b) a second IOC corresponding to a malicious domain (e.g., "malicious.com"), (c) a temporal look-back parameter specifying fourteen days, and (d) a plurality of distinct security devices including a SentinelOne® security device and a security information and event management (SIEM) system. The respective training data sample, in such a non-limiting example, further includes (i) a first threat hunt query formatted in accordance with a query language required by the SentinelOne® security device, such as: TgtFileSha256 in ("049ed15ef970bd12") OR DNS in AnyCase ("malicious-.com") and (ii) a second threat hunt query formatted in accordance with a query language required by the SIEM system. The respective training data sample, in such a non-limiting example, further includes query execution findings data indicating that execution of the first threat hunt query resulted in a successful execution and that execution of the second threat hunt query resulted in a query execution error.

In another non-limiting example, a respective training data sample of the plurality of training data samples may include a respective threat hunt object that specifies (a) a first IOC corresponding to a malicious MD5 file hash (e.g., "1d2094ce85d66878ee079185e2761beb"), (b) a second IOC corresponding to a malicious internet protocol address (e.g., "185.211.44.17"), (c) a temporal look-back parameter specifying seven days, and (d) ten distinct security devices (e.g., a first distinct security device, a second distinct security device, a third distinct security device, a fourth distinct security device, a fifth distinct security device, a sixth distinct security device, a seventh distinct security device, an eighth distinct security device, a ninth distinct security device, and a tenth distinct security device). The respective training data sample, in such a non-limiting example, may further include (i) a first threat hunt query formatted in accordance with a query language required by the first distinct security device, such as: TgtFileMd5 in ("1d2094ce85d66878ee079185e2761beb") OR DstIP in ("185.211.44.17"), wherein the first threat hunt query further specifies a start time and an end time defining the seven-day retrospective query window, (ii) a second threat hunt query formatted in accordance with a query language required by the second distinct security device, such as: file_hash="1d2094ce85d66878ee079185e2761beb" OR destination_ip="185.211.44.17", wherein the second threat hunt query further specifies the start time and the end time of the seven-day retrospective query window, (iii) a third threat hunt query formatted in accordance with a query language required by the third distinct security device, such as: md5=="1d2094ce85d66878ee079185e2761beb" OR dst_ip=="185.211.44.17", wherein the third threat hunt query further specifies the start time and the end time of the seven-day retrospective query window, (iv) a fourth threat hunt query formatted in accordance with a query language required by the fourth distinct security device, such as: hash: "1d2094ce85d66878ee079185e2761beb" OR ip:"185.211.44.17", wherein the fourth threat hunt query further specifies the start time and the end time of the seven-day retrospective query window, (v) a fifth threat hunt query formatted in accordance with a query language required by the fifth distinct security device, such as: md5_hash ("1d2094ce85d66878ee079185e2761beb") OR ip_addr("185.211.44.17"), wherein the fifth threat hunt query further specifies the start time and the end time of the seven-day retrospective query window, (vi) a sixth threat hunt query formatted in accordance with a query language required by the sixth distinct security device, such as: file.md5="1d2094ce85d66878ee079185e2761beb" OR net.dst.ip="185.211.44.17", wherein the sixth threat hunt query further specifies the start time and the end time of the seven-day retrospective query window, (vii) a seventh threat hunt query formatted in accordance with a query language required by the seventh distinct security device, such as: md5: "1d2094ce85d66878ee079185e2761beb" OR ip:"185.211.44.17", wherein the seventh threat hunt query further specifies the start time and the end time of the seven-day retrospective query window, (viii) an eighth threat hunt query formatted in accordance with a query language required by the eighth distinct security device, such as: file_hash_md5="1d2094ce85d66878ee079185e2761beb" OR dst_ip_addr="185.211.44.17", wherein the eighth threat hunt query further specifies the start time and the end time of the seven-day retrospective query window, (ix) a ninth threat hunt query formatted in accordance with a query language required by the ninth distinct security device, such as: md5_value ("1d2094ce85d66878ee079185e2761beb") OR ip_value("185.211.44.17"), wherein the ninth threat hunt query further specifies the start time and the end time of the seven-day retrospective query window, and (x) a tenth threat hunt query formatted in accordance with a query language required by the tenth distinct security device, such as: fileHashMd5=="1d2094ce85d66878ee079185e2761beb" OR destinationIp=="185.211.44.17", wherein the tenth threat hunt query further specifies the start time and the end time of the seven-day retrospective query window. The respective training data sample, in such a non-limiting example, further includes query execution findings data indicating that execution of a first subset of the plurality of ten threat hunt queries resulted in successful execution and that execution of a second subset of the plurality of ten threat hunt queries resulted in one or more query execution errors. The query execution findings data may further indicate, for each of the plurality of threat hunt queries, at least one of an execution status, a number of results returned, and an execution latency. Execution latency, as generally referred to herein, may be a measure of an amount of time elapsed between initiation of execution of a respective threat hunt query and completion of execution of the respective threat hunt query, including retrieval of corresponding security event data from a respective security device.

In one or more embodiments, each of the plurality of training data samples included in the training corpus may be structured such that the respective threat hunt object defines a model input and the plurality of corresponding threat hunt queries corresponding to the respective threat hunt object defines a model output. In other words, in one or more embodiments, each of the plurality of training data samples included in the training corpus may be structured such that a respective threat hunt object is provided as an input representation and a corresponding plurality of threat hunt queries is provided as an output representation. In such an embodiment, the structured association between the threat hunt object and the plurality of corresponding threat hunt queries may enable the target large language model to learn how IOC classes, temporal look-back parameters, and identifiers of the plurality of distinct security devices correspond to device-specific query syntax, field identifiers, and query constraints required by each of the plurality of distinct security devices. Additionally, in some embodiments, inclusion of the query execution findings data in each of the plurality of training data samples may enable the target large language model to learn how variations in generated query structures affect execution outcomes across the plurality of distinct security devices. That is, the query execution findings data may be used as a feedback signal to adjust parameters (e.g., weights and biases, hyperparameters, etc.) of the target large language model, such that the target large language model learns to reduce occurrences of query execution errors, improve execution success rates, and reduce execution latency associated with subsequently generated threat hunt queries.

Accordingly, in one or more embodiments, the system or service implementing method 200 may function to train a target machine learning model (e.g., language model, large language model, or any other suitable machine learning model) using the plurality of training data samples included in the training corpus. The target machine learning model (e.g., large language model), once trained, may be configured to receive a threat hunt object as input and generate, in response, a plurality of threat hunt queries. It shall be recognized that using the trained machine learning model improves (i) an accuracy and consistency with which the plurality of threat hunt queries are generated across the plurality of distinct security devices, thereby reducing occurrences of syntactic errors and improving successful execution of the plurality of threat hunt queries, (ii) accelerates a speed at which the plurality of threat hunt queries are generated for the plurality of distinct security devices, and (iii) improves a speed at which security threats are detected across the plurality of distinct security devices.

Additionally, or alternatively, in one or more embodiments, the system or service implementing method 200 may function to train the target large language model using a reinforcement learning-based training approach. In such an embodiment, the target large language model may be configured to generate one or more candidate threat hunt queries for a given threat hunt object, and the system or service may function to execute the one or more candidate threat hunt queries across one or more distinct security devices to obtain corresponding query execution findings data. The system or service may then compute, for each of the one or more candidate threat hunt queries, a reward signal based on one or more execution performance metrics, including but not limited to query execution success, a number of relevant results returned, execution latency, and a degree of correspondence between returned results and expected threat characteristics associated with the threat hunt object.

In one or more embodiments, the system or service implementing method 200 may function to iteratively update one or more parameters of the target large language model based on the computed reward signal, such that the target large language model learns to generate threat hunt queries that optimize for successful execution and improved detection efficacy across the plurality of distinct security devices. In such an embodiment, the reinforcement learning process may enable the target large language model to adapt to variations in query language syntax, schema differences, and execution constraints across the plurality of distinct security devices without requiring explicit supervision for each possible query formulation.

Additionally, in some embodiments, the system or service implementing method 200 may function to incorporate a feedback loop in which security analysts provide validation inputs indicative of correctness or usefulness of the generated threat hunt queries and corresponding query results. The validation inputs may be used to further refine the reward signal, thereby enabling the target large language model to align generated threat hunt queries with human expert expectations and operational requirements. In this way, the target large language model may be trained to continuously improve query generation performance over time based on both automated execution feedback and human-in-the-loop guidance.

In another embodiment, the system or service implementing method 200 may function to train a plurality of distinct large language models to translate threat hunt objects into threat hunt queries, wherein each distinct large language model of the plurality of distinct large language models corresponds to a distinct security device of a plurality of distinct security devices. In such an embodiment, rather than training a single target large language model to generate threat hunt queries for all of the plurality of distinct security devices, the system or service may function to train a first large language model corresponding to a first distinct security device, a second large language model corresponding to a second distinct security device, a third large language model corresponding to a third distinct security device, and so on.

In one or more embodiments, the system or service implementing method 200 may function to generate a plurality of device-specific training corpora, wherein each device-specific training corpus corresponds to a distinct security device and includes a plurality of training data samples associating a threat hunt object with a target threat hunt query formatted in accordance with a query language required by the corresponding distinct security device. For example, a first device-specific training corpus corresponding to a SentinelOne® security device may include a plurality of training data samples in which each training data sample associates a respective threat hunt object with a target threat hunt query formatted in accordance with a query language required by the SentinelOne® security device. Similarly, a second device-specific training corpus corresponding to a SIEM system may include a plurality of training data samples in which each training data sample associates a respective threat hunt object with a target threat hunt query formatted in accordance with a query language required by the SIEM system.

In such an embodiment, each of the plurality of training data samples included in a respective device-specific training corpus may be structured such that the respective threat hunt object defines a model input and the corresponding target threat hunt query for the corresponding distinct security device defines a model output. In this way, a respective large language model corresponding to a respective distinct security device may be trained, in a supervised manner, to learn associations between IOC classes, temporal look-back parameters, and threat hunt constraints specified by the threat hunt object and device-specific query syntax, field identifiers, operators, and query construction requirements of the corresponding distinct security device.

Additionally, in some embodiments, the system or service implementing method 200 may function to include, within each of the plurality of device-specific training corpora, query execution findings data corresponding to execution of the target threat hunt queries generated for the corresponding distinct security device. The query execution findings data may indicate, for each target threat hunt query of a respective device-specific training corpus, at least one of an execution status, a number of results returned, an execution latency, or an indication of whether the target threat hunt query satisfied one or more query quality criteria. In such an embodiment, the query execution findings data may be used to filter, weight, or otherwise select the plurality of training data samples used to train the respective large language model corresponding to the respective distinct security device, such that the respective large language model is preferentially trained using target threat hunt queries associated with successful execution outcomes and reduced syntactic or semantic error rates.

Accordingly, in one or more embodiments, the system or service implementing method 200 may function to train each of the plurality of distinct large language models using a corresponding device-specific training corpus, such that each distinct large language model is specialized to generate threat hunt queries for a corresponding distinct security device. Once trained, the system or service implementing method 200 may function to select, based on an identifier of a target security device, a corresponding large language model of the plurality of distinct large language models and provide a target threat hunt object as input to the corresponding large language model. The corresponding large language model may then function to generate, in response to the target threat hunt object, a threat hunt query formatted in accordance with the query language and execution requirements of the target security device. In this way, the system or service implementing method 200 may improve accuracy and consistency of generated threat hunt queries, reduce occurrences of device-specific query generation errors, and improve execution success rates across the plurality of distinct security devices.

For instance, in a non-limiting example, a respective target threat hunt object may specify (a) a first IOC corresponding to a malicious SHA256 file hash (e.g., "049ed15ef970bd12"), (b) a second IOC corresponding to a malicious domain (e.g., "malicious.com"), (c) a temporal look-back parameter specifying fourteen days, (d) a first identifier corresponding to a first target security device, and (e) a second identifier corresponding to a second target security device. In such a non-limiting example, the system or service implementing method 200 may function to select, based on the first identifier included in the target threat hunt object, a first large language model of the plurality of distinct large language models corresponding to the first target security device, and provide the target threat hunt object as input to the first large language model. The first large language model may then function to generate, in response to the target threat hunt object, a first threat hunt query formatted in accordance with a query language required by the first target security device, such as: TgtFileSha256 in ("049ed15ef970bd12") OR DNS in AnyCase ("malicious-.com"), wherein the first threat hunt query further specifies a start time and an end time defining the fourteen-day retrospective query window. Additionally, the system or service implementing method 200 may function to select, based on the second identifier included in the target threat hunt object, a second large language model of the plurality of distinct large language models corresponding to the second target security device, and provide the target threat hunt object as input to the second large language model. The second large language model may then function to generate, in response to the target threat hunt object, a second threat hunt query formatted in accordance with a query language required by the second target security device, such as: file_hash_sha256="049ed15ef970bd12" OR domain="malicious.com", wherein the second threat hunt query further specifies a start time and an end time defining the fourteen-day retrospective query window. In this way, in the non-limiting example, inclusion of the first identifier and the second identifier within the target threat hunt object may enable the system or service implementing method 200 to generate, via corresponding distinct large language models, a plurality of device-specific threat hunt queries from a single threat hunt object, thereby improving efficiency and ensuring conformance with device-specific query syntax and execution requirements across multiple distinct security devices.

In another non-limiting example, a respective target threat hunt object may specify (a) a first IOC corresponding to a malicious internet protocol address (e.g., "185.211.44.17"), (b) a second IOC corresponding to a malicious user agent (e.g., "BadBot/1.0"), (c) a temporal look-back parameter specifying seven days, (d) a first identifier corresponding to an endpoint detection and response (EDR) security device, and (e) a second identifier corresponding to a network security monitoring system. In such an example, the system or service implementing method 200 may function to select, based on the first identifier, a first large language model trained for the EDR security device and generate, using the first large language model, a first threat hunt query formatted in accordance with the query language required by the EDR security device. Additionally, in such an example, the system or service implementing method 200 may function to select, based on the second identifier, a second large language model trained for the network security monitoring system and generate, using the second large language model, a second threat hunt query formatted in accordance with the query language required by the network security monitoring system, wherein the first threat hunt query is configured to identify endpoint-level events associated with the malicious internet protocol address and the malicious user agent and the second threat hunt query is configured to identify network-level communications associated with the malicious internet protocol address and the malicious user agent within the seven-day retrospective query window.

In this way, in one or more embodiments, the system or service implementing method 200 may enable parallel generation of device-specific threat hunt queries across multiple distinct security devices from a single threat hunt object, thereby reducing computational overhead associated with sequential query generation and improving throughput of threat detection operations. Additionally, inclusion of multiple identifiers within the threat hunt object and use of distinct large language models specialized for corresponding security devices may improve syntactic correctness and semantic alignment of generated threat hunt queries with device-specific query languages, thereby reducing query execution errors and increasing successful execution rates. Furthermore, the system or service may improve responsiveness of threat hunting workflows by enabling simultaneous deployment of threat hunt queries across the plurality of distinct security devices, thereby accelerating identification and mitigation of security threats across distributed computing environments.

In one or more embodiments, the at least one IOC included in the threat hunt object may include a first plurality of IOCs that correspond to a first class of IOCs (e.g., usernames), a second plurality of IOCs that correspond to a second class of IOCs (e.g., ASNs), a third plurality of IOCs that correspond to a third class of IOCs (e.g., domains). Furthermore, in such an embodiment, the plurality of distinct security devices included in the threat hunt object may include a first identifier that corresponds to a first distinct endpoint detection and response service, a second identifier that corresponds to a second distinct endpoint detection and response service, and a third identifier that corresponds to a third distinct endpoint detection and response service.

Accordingly, in such an embodiment, translating the threat hunt object into the plurality of distinct threat hunt queries may include generating, using the trained large language model, a first distinct threat hunt query that is written in the distinct query language required by the first distinct endpoint detection and response service. The first distinct threat hunt query, in such an embodiment, may include the first plurality of IOCs, the second plurality of IOCs, and the third plurality of IOCs, the retrospective query window (e.g., a start time and an end time), and an application programming interface (API) endpoint for the first distinct endpoint detection and response service. For instance, in a non-limiting example, the first distinct threat hunt query may be formatted as: "POST https://api.first-edr-service.com/v1/query {"query": "file.sha256 IN (\"049ed15ef970bd12\", \"abc123hashvalue\") OR domain IN (\"malicious.com\", \"bad-domain.com\") OR process-.name IN (\"powershell.exe\", \"cmd.exe\")", "start_time": "2026-01-01T10:00:00Z", "end_time":"2026-01-15T10:00:00Z"}. In such an example, the first distinct threat hunt query includes a plurality of file hash IOCs, a plurality of domain IOCs, a plurality of process-based IOCs, a start time and an end time defining the retrospective query window, and an API endpoint corresponding to the first distinct endpoint detection and response service. The first distinct threat hunt query, when executed, is operably configured to retrieve, from the first distinct endpoint detection and response service, security event data that matches any of the specified IOCs and that occurred between the start time and the end time.

Additionally, in such an embodiment, translating the threat hunt object into the plurality of distinct threat hunt queries may include generating, using the trained large language mode, a second distinct threat hunt query that is written in the distinct query language required by the second distinct endpoint detection and response service. The second distinct threat hunt query, in such an embodiment, may include the first plurality of IOCs, the second plurality of IOCs, and the third plurality of IOCs, the retrospective query window (e.g., the start time and the end time), an API endpoint for the second distinct endpoint detection and response service. For instance, in a non-limiting example, the second distinct threat hunt query may be formatted as: "POST https://api.second-edr-service.com/v2/search {"filter": "(sha256:("049ed15ef970bd12" OR "abc123hashvalue") OR dns.domain:("malicious.com" OR "bad-domain.com") OR process.name:("powershell.exe" OR "cmd.exe"))", "from":"2026-01-01T10:00:00Z", "to": "2026-01-15T10:00:00Z"}". In such an example, the second distinct threat hunt query may include the plurality of file hash IOCs, the plurality of domain IOCs, the plurality of process-based IOCs, the start time and the end time defining the retrospective query window, and the API endpoint corresponding to the second distinct endpoint detection and response service. The second distinct threat hunt query, when executed, is operably configured to retrieve, from the second distinct endpoint detection and response service, digital events that matches any of the specified IOCs and that occurred between the start time and the end time.

Furthermore, in such an embodiment, in such an embodiment, translating the threat hunt object into the plurality of distinct threat hunt queries may include generating, using the trained large language mode, a third distinct threat hunt query that is written in the distinct query language required by the third distinct endpoint detection and response service. The third distinct threat hunt query, in such an embodiment, may include the first plurality of IOCs, the second plurality of IOCs, and the third plurality of IOCs, the retrospective query window (e.g., the start time and the end time), and an API endpoint for the third distinct endpoint detection and response service. For instance, in a non-limiting example, the third distinct threat hunt query may be formatted as: "POST https://api.third-edr-service.com/v3/hunt {"search": "(event.file.sha256=="049ed15ef970bd12" OR event.file.sha256=="abc123hashvalue") OR (event.domain=="malicious.com" OR event.domain=="bad-domain.com") OR (event.process.name=="powershell.exe" OR event.process.name=="cmd.exe")", "start":"2026-01-01T10:00:00Z", "end": "2026-01-15T10:00:00Z"}". In such an example, the third distinct threat hunt query may include the plurality of file hash IOCs, the plurality of domain IOCs, the plurality of process-based IOCs, the start time and the end time defining the retrospective query window, and the API endpoint corresponding to the third distinct endpoint detection and response service. The third distinct threat hunt query, when executed, is operably configured to retrieve, from the third distinct endpoint detection and response service, digital events that match any of the specified IOCs and that occurred between the start time and the end time.

Accordingly, in one or more embodiments, the cybersecurity event detection and response service may function to simultaneously execute the plurality of distinct threat hunt queries generated by the trained large language model. For instance, in a non-limiting example, simultaneously executing the plurality of distinct threat hunt queries may include (i) transmitting, using the one or more pollers, a first API request that includes the first distinct threat hunt query to the API endpoint that corresponds to the first distinct endpoint detection and response service, (ii) transmitting, using the one or more pollers, a second API request that includes the second distinct threat hunt query to the API endpoint that corresponds to the second distinct endpoint detection and response service, and (iii) transmitting, using the one or more pollers, a third API request that includes the third distinct threat hunt query to the API endpoint that corresponds to the third distinct endpoint detection and response service.

In such an embodiment, in response transmitting the first API request to the API endpoint of the first distinct endpoint detection and response service, receiving, from the first distinct endpoint detection and response service, a first plurality of historical security events that (i) were detected in one or more computing environments of one or more subscribers monitored by the first distinct endpoint detection and response service, (ii) occurred within the retrospective query window, and (iii) are associated with at least one of the first plurality of IOCs, the second plurality of IOCs, and the third plurality of IOCs.

In such an embodiment, in response transmitting the second API request to the API endpoint of the second distinct endpoint detection and response service, receiving, from the second distinct endpoint detection and response service, a second plurality of historical security events that (i) were detected in the one or more computing environments of the one or more subscribers monitored by the second distinct endpoint detection and response service, (ii) occurred within the retrospective query window, and (iii) are associated with at least one of the first plurality of IOCs, the second plurality of IOCs, and the third plurality of IOCs.

In such an embodiment, in response transmitting the third API request to the API endpoint of the third distinct endpoint detection and response service, receiving, from the third distinct endpoint detection and response service, a third plurality of historical security events that (i) were detected in the one or more computing environments of the one or more subscribers monitored by the third distinct endpoint detection and response service, (ii) occurred within the retrospective query window, and (iii) are associated with at least one of the first plurality of IOCs, the second plurality of IOCs, and the third plurality of IOCs. It shall be recognized that, in one or more embodiments, the historical security event data may include the first plurality of historical security events, the second plurality of historical security events, and the third plurality of historical security events.

In one or more embodiments, in response to providing the threat hunt object to the large language model, the large language model may function to generate a single database query based on the threat hunt object. It shall be recognized that, in one or more embodiments, the single database query is executable against a target database. It shall be further recognized that, in one or more embodiments, the single database query includes the at least one IOC and the retrospective query window. It shall be further recognized that, in one or more embodiments, the target database stores log data obtained from each of a plurality of distinct security services (e.g., Amazon Web Services, Google Cloud Platform, Okta, etc.). In one or more embodiments, in response to the large language model generating the single database query, the cybersecurity event detection and response service may function to execute the single database query against the target database.

Figure 15:
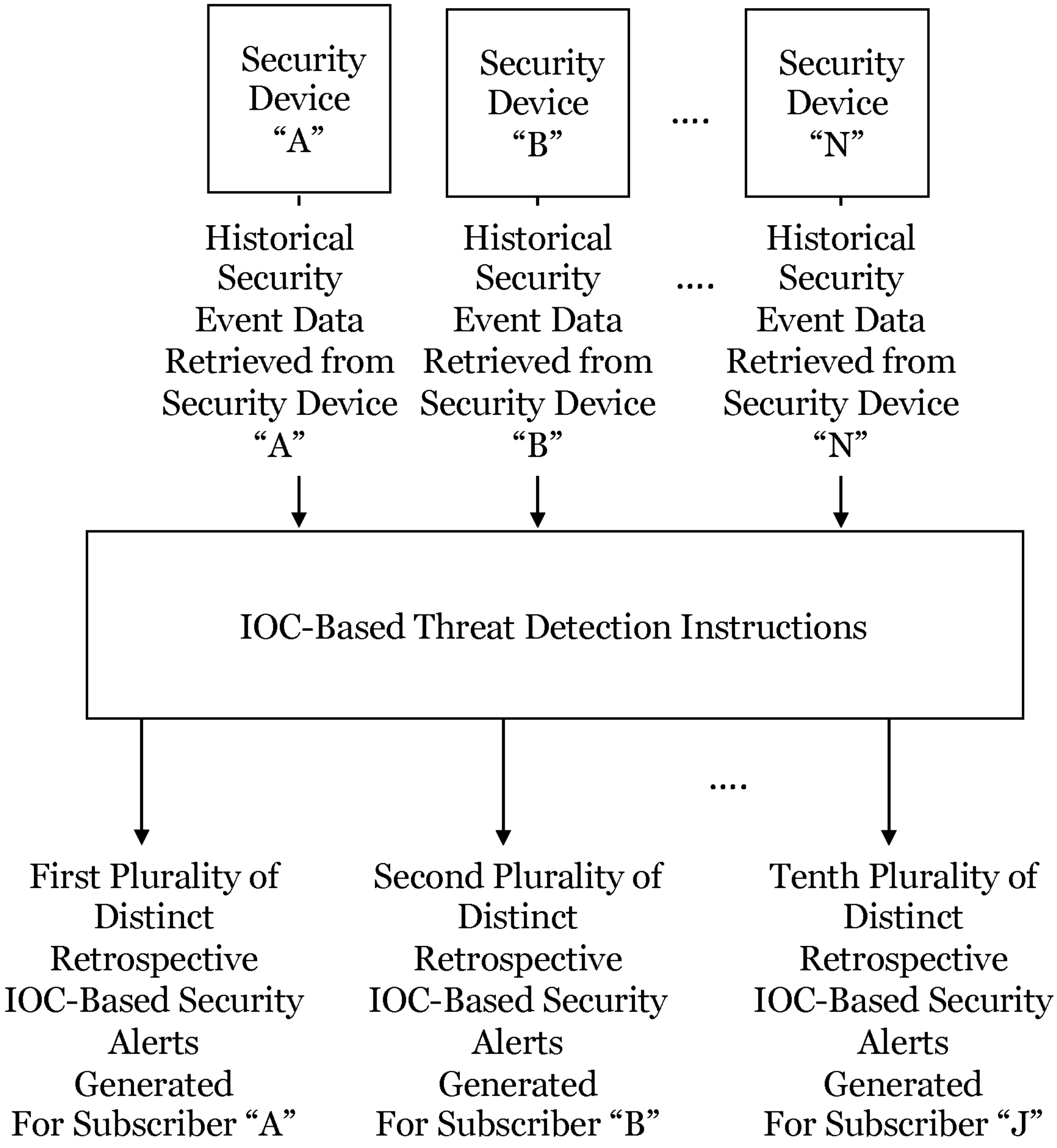

Accordingly, in one or more embodiments, in response to executing the single database query, the cybersecurity event detection and response service may function to retrieve, from the target database, a corpus of logs that satisfy the single database query. The corpus of logs, in such an embodiment, may include a first subset of the corpus of logs includes a first plurality of logs generated by a first distinct security service of the plurality of distinct security services, a second subset of the corpus of logs includes a second plurality of logs generated by a second distinct security service of the plurality of distinct security services, and a third subset of the corpus of logs includes a third plurality of logs generated by a third distinct security service of the plurality of distinct security services. Furthermore, in such an embodiment, the cybersecurity event detection and response service may function to generate a plurality of distinct retrospective IOC-based security alerts in response to assessing the corpus of logs retrieved from the target database against the one or more IOC-based threat detection instructions, as shown generally by way of example in FIG. 15.

Query Splitting

In one or more embodiments, the at least one IOC may include a first plurality of IOCs (e.g., 100 or more malicious email addresses) that correspond to a first class of IOCs (email addresses), a second plurality of IOCs (e.g., 300 or more malicious domains) that correspond to a second class of IOCs (e.g., domains), and a third plurality of IOCs (e.g., four hundred or more internet protocol addresses) that correspond to a third class of IOCs (e.g., internet protocol addresses).

In such an embodiment, while generating the plurality of distinct threat hunt queries using the large language model, the large language model may function to detect that including the first plurality of IOCs, the second plurality of IOCs, and the third plurality of IOCs in a single threat hunt query would cause the single threat hunt query to exceed a maximum query size (e.g., 3,000 characters) of the distinct security device to which the single threat hunt query corresponds. In one or more embodiments, in response to the large language model detecting that the single threat hunt query would exceed the maximum query size, the large language model may function to generate multiple threat hunt queries for the distinct security device to which the single threat hunt query corresponds.

For instance, in a non-limiting example, a first threat hunt query of the multiple threat hunt queries may include the first plurality of IOCs and exclude the second plurality of IOCs and the third plurality of IOCs. Additionally, in such a non-limiting example, a second threat hunt query of the multiple threat hunt queries may include the second plurality of IOCs and exclude the first plurality of IOCs and the third plurality of IOCs. Furthermore, in such a non-limiting example, a third threat hunt query of the multiple threat hunt queries may include the third plurality of IOCs and exclude the first plurality of IOCs and the second plurality of IOCs.

It shall be recognized that, in such an embodiment, the plurality of distinct threat hunt queries may include the first threat hunt query, the second threat hunt query, and the third threat hunt query. It shall be further recognized that, in such an embodiment, the first threat hunt query, the second threat hunt query, and the third threat hunt query may collectively represent a logical equivalent of the single threat hunt query.

At least one technical benefit of such a large language model includes enabling the cybersecurity event detection and response service to generate threat hunt queries that conform to query size constraints of distinct security devices while preserving completeness of IOC coverage, thereby ensuring that all IOCs are evaluated and reducing a likelihood of failed query execution due to exceeding maximum query size limitations.

A maximum query size, as generally referred to herein, may refer to a maximum allowable size of a threat hunt query defined by a respective security device or corresponding application programming interface, wherein the maximum allowable size limits an amount of content that can be included in the threat hunt query, such that exceeding the maximum allowable size prevents successful execution of the threat hunt query.

Log Return Limit

In one or more embodiments, the at least one IOC may include a first plurality of IOCs (e.g., 100 or more malicious email addresses) that correspond to a first class of IOCs (email addresses), a second plurality of IOCs (e.g., 300 or more malicious domains) that correspond to a second class of IOCs (e.g., domains), and a third plurality of IOCs (e.g., four hundred or more internet protocol addresses) that correspond to a third class of IOCs (e.g., internet protocol addresses).

In such an embodiment, while generating the plurality of distinct threat hunt queries using the large language model, the large language model may function to detect that including the first plurality of IOCs, the second plurality of IOCs, and the third plurality of IOCs in a single threat hunt query would cause the single threat hunt query to exceed a maximum log return limit of the distinct security device to which the single threat hunt query corresponds. A maximum log return limit, as generally referred to herein, may refer to a maximum number of security events or log records that a respective security device or corresponding application programming interface is capable of returning in response to execution of a single threat hunt query, such that exceeding the maximum log return limit results in truncation, incomplete results, or failure to return all matching security events.

In one or more embodiments, in response to the large language model detecting that the single threat hunt query would exceed the maximum log return limit, the large language model may function to generate multiple threat hunt queries for the distinct security device to which the single threat hunt query corresponds.

For instance, in a non-limiting example, a first threat hunt query of the multiple threat hunt queries may include the first plurality of IOCs and exclude the second plurality of IOCs and the third plurality of IOCs. Additionally, in such a non-limiting example, a second threat hunt query of the multiple threat hunt queries may include the second plurality of IOCs and exclude the first plurality of IOCs and the third plurality of IOCs. Furthermore, in such a non-limiting example, a third threat hunt query of the multiple threat hunt queries may include the third plurality of IOCs and exclude the first plurality of IOCs and the second plurality of IOCs.

It shall be recognized that, in such an embodiment, the plurality of distinct threat hunt queries may include the first threat hunt query, the second threat hunt query, and the third threat hunt query. It shall be further recognized that, in such an embodiment, the first threat hunt query, the second threat hunt query, and the third threat hunt query may collectively represent a logical equivalent of the single threat hunt query.

At least one technical benefit of such a large language model includes enabling the cybersecurity event detection and response service to generate threat hunt queries that conform to output constraints of distinct security devices while preserving comprehensive search coverage of the at least one IOC, thereby reducing a likelihood of incomplete query results and improving reliability of detecting security events associated with the at least one IOC.

Query Execution Time Limit

In one or more embodiments, the at least one IOC may include a first plurality of IOCs (e.g., 100 or more malicious email addresses) that correspond to a first class of IOCs (email addresses), a second plurality of IOCs (e.g., 300 or more malicious domains) that correspond to a second class of IOCs (e.g., domains), and a third plurality of IOCs (e.g., four hundred or more internet protocol addresses) that correspond to a third class of IOCs (e.g., internet protocol addresses).

In such an embodiment, while generating the plurality of distinct threat hunt queries using the large language model, the large language model may function to detect that including the first plurality of IOCs, the second plurality of IOCs, and the third plurality of IOCs in a single threat hunt query would cause the single threat hunt query to exceed a maximum query execution time limit of the distinct security device to which the single threat hunt query corresponds. A maximum query execution time limit, as generally referred to herein, may refer to a maximum allowable duration for execution of a threat hunt query by a respective security device or corresponding application programming interface, such that exceeding the maximum allowable duration results in termination of the threat hunt query prior to completion or failure to return complete results.

In one or more embodiments, in response to the large language model detecting that the single threat hunt query would exceed the maximum query execution time limit, the large language model may function to generate multiple threat hunt queries for the distinct security device to which the single threat hunt query corresponds.

For instance, in a non-limiting example, a first threat hunt query of the multiple threat hunt queries may include the first plurality of IOCs and exclude the second plurality of IOCs and the third plurality of IOCs. Additionally, in such a non-limiting example, a second threat hunt query of the multiple threat hunt queries may include the second plurality of IOCs and exclude the first plurality of IOCs and the third plurality of IOCs. Furthermore, in such a non-limiting example, a third threat hunt query of the multiple threat hunt queries may include the third plurality of IOCs and exclude the first plurality of IOCs and the second plurality of IOCs.

It shall be recognized that, in such an embodiment, the plurality of distinct threat hunt queries may include the first threat hunt query, the second threat hunt query, and the third threat hunt query. It shall be further recognized that, in such an embodiment, the first threat hunt query, the second threat hunt query, and the third threat hunt query may collectively represent a logical equivalent of the single threat hunt query.

At least one technical benefit of such a large language model includes enabling the cybersecurity event detection and response service to generate threat hunt queries that conform to query execution time constraints of distinct security devices while preserving comprehensive search coverage of the at least one IOC, thereby reducing a likelihood of incomplete query results and improving reliability of detecting security events associated with the at least one IOC.

Query Complexity Constraint

In one or more embodiments, the at least one IOC may include a first plurality of IOCs (e.g., 100 or more malicious email addresses) that correspond to a first class of IOCs (email addresses), a second plurality of IOCs (e.g., 300 or more malicious domains) that correspond to a second class of IOCs (e.g., domains), and a third plurality of IOCs (e.g., four hundred or more internet protocol addresses) that correspond to a third class of IOCs (e.g., internet protocol addresses).

In such an embodiment, while generating the plurality of distinct threat hunt queries using the large language model, the large language model may function to detect that including the first plurality of IOCs, the second plurality of IOCs, and the third plurality of IOCs in a single threat hunt query would cause the single threat hunt query to exceed a query complexity constraint of the distinct security device to which the single threat hunt query corresponds. A query complexity constraint, as generally referred to herein, may refer to a limitation on a structural or logical complexity of a threat hunt query, including a maximum number of logical operators, conditions, nested expressions, or clauses that may be included in the threat hunt query, such that exceeding the limitation results in failure to execute the threat hunt query. For instance, in a non-limiting example, a query complexity constraint may specify a maximum number of logical operators (e.g., OR, AND) that may be included in a single threat hunt query (e.g., no more than fifty OR conditions), such that exceeding the maximum number of logical operators results in failure to execute the threat hunt query. In another non-limiting example, a query complexity constraint may specify a maximum depth of nested expressions (e.g., no more than five nested conditional clauses), such that exceeding the maximum nesting depth results in rejection of the threat hunt query by the respective security device. In yet another non-limiting example, a query complexity constraint may specify a maximum number of distinct conditions (e.g., no more than one hundred IOCs) that may be included in a single threat hunt query, such that exceeding the maximum number of conditions results in degraded performance or timeout of the threat hunt query.

In one or more embodiments, in response to the large language model detecting that the single threat hunt query would exceed the query complexity constraint, the large language model may function to generate multiple threat hunt queries for the distinct security device to which the single threat hunt query corresponds.

For instance, in a non-limiting example, a first threat hunt query of the multiple threat hunt queries may include the first plurality of IOCs and exclude the second plurality of IOCs and the third plurality of IOCs. Additionally, in such a non-limiting example, a second threat hunt query of the multiple threat hunt queries may include the second plurality of IOCs and exclude the first plurality of IOCs and the third plurality of IOCs. Furthermore, in such a non-limiting example, a third threat hunt query of the multiple threat hunt queries may include the third plurality of IOCs and exclude the first plurality of IOCs and the second plurality of IOCs.

It shall be recognized that, in such an embodiment, the plurality of distinct threat hunt queries may include the first threat hunt query, the second threat hunt query, and the third threat hunt query. It shall be further recognized that, in such an embodiment, the first threat hunt query, the second threat hunt query, and the third threat hunt query may collectively represent a logical equivalent of the single threat hunt query.

At least one technical benefit of such a large language model includes enabling the cybersecurity event detection and response service to generate threat hunt queries that conform to query complexity constraints of distinct security devices while preserving comprehensive search coverage of the at least one IOC, thereby reducing a likelihood of query execution errors.

Threat Hunt Query Generation Example Using Large Language Model

In one or more embodiments, generating a respective threat hunt query of the plurality of distinct threat hunt queries may include one or more of (i) obtaining, using the large language model, a plurality query components that define a query syntax of the distinct query language required by the distinct security device to which the respective threat hunt query corresponds; (ii) determining, using the large language model, an IOC class of the at least one IOC; (iii) selecting, using the large language model, a respective field identifier from the plurality query components operably that corresponds to the IOC class; and (iv) encoding, using the large language model, the respective threat hunt query by inserting the at least one IOC after the respective field identifier in accordance with the query syntax.

For instance, in a non-limiting example, if the at least one IOC corresponds to a malicious domain (e.g., "malicious-.com"), the large language model may function to determine that the IOC class corresponds to a domain class and, based on the determination, select a field identifier (e.g., "dns.domain" or "domain") from the plurality of query components that corresponds to the domain class. The large language model may further function to obtain a query syntax associated with the distinct query language required by the distinct security device (e.g., a syntax requiring a field-value pair format) and encode the respective threat hunt query by inserting "malicious.com" after the selected field identifier in accordance with the query syntax (e.g., "dns.domain='malicious.com'"). In such an example, the resulting threat hunt query is operably configured to retrieve security event data in which each distinct security event included in the security event data includes one or more pieces of metadata corresponding to the malicious domain.

In another non-limiting example, if the at least one IOC includes a malicious internet protocol address (e.g., "185.211.44.17") and a malicious domain (e.g., "malicious-.com"), the large language model may function to determine that the IOC classes correspond to an internet protocol address class and a domain class and, based on the determination, select respective field identifiers (e.g., "dst_ip" and "dns.domain") from the plurality of query components that correspond to the internet protocol address class and the domain class. The large language model may further function to obtain a query syntax associated with the distinct query language required by the distinct security device and encode the respective threat hunt query by inserting "185.211.44.17" and "malicious.com" after the respective field identifiers in accordance with the query syntax (e.g., "dst_ip='185.211.44.17' OR dns.domain='malicious.com'"). In such an example, the resulting threat hunt query is operably configured to retrieve security event data in which each distinct security event included in the security event data includes one or more pieces of metadata corresponding to the malicious internet protocol address and/or the malicious domain.

2.30 Detecting Past Candidate IOC Occurrences Via the Data Platform Query

S230, which includes detecting past candidate IOC occurrences of the candidate IOCs via the data platform query, may function to execute, via the one or more processing devices of the emerging threat detection service, the data platform query at a target data platform to detect past occurrences of the one or more candidate IOCs. The term "target data platform" may refer to a specific data platform selected for execution of a data platform query. In a non-limiting example, as described with reference to FIG. 3, a query scheduler may receive a data platform query and may execute the data platform query at a data platform to detect past occurrences of the one or more candidate IOCs. The data platform may report the past occurrences to a query evaluator.

A past occurrence of a candidate IOC may refer to any instance in which a data record stored within a data platform contains one or more attributes that match a previously extracted candidate IOC and is timestamped prior to the execution time of the data platform query. Such past occurrences may be identified by executing a retrospective or lookback query against historical data maintained by the target data platform. The presence of a candidate IOC or a combination of candidate IOCs in historical data may indicate that the associated malicious activity or threat was present in the computing environment prior to the candidate IOC or the combination of candidate IOCs being identified. It should be noted that there may be examples in which the search is limited to a particular time range (e.g., two weeks prior to execution of the data platform query).

Figure 7:
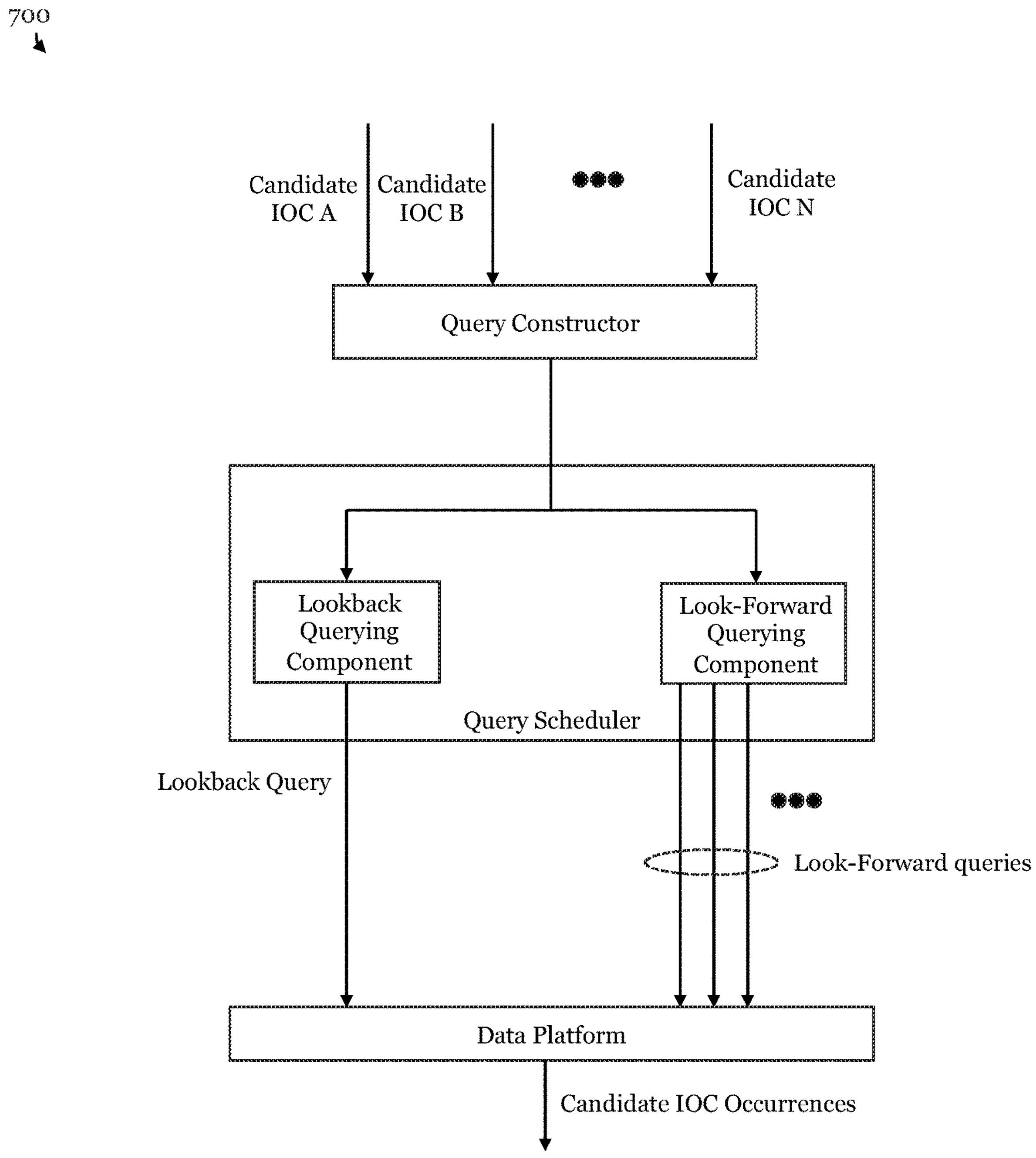
FIG. 7 illustrates an example of a query scheduling procedure in accordance with one or more embodiments of the present application.

In a non-limiting example, as described with reference to FIG. 7, a query constructor may provide a query to a lookback querying component of the query scheduler. The lookback querying component may insert one or more temporal conditions into the query and may provide the query to the data platform. The data platform may then detect and report associated past occurrences associated with the candidate IOCs.

Figure 8:
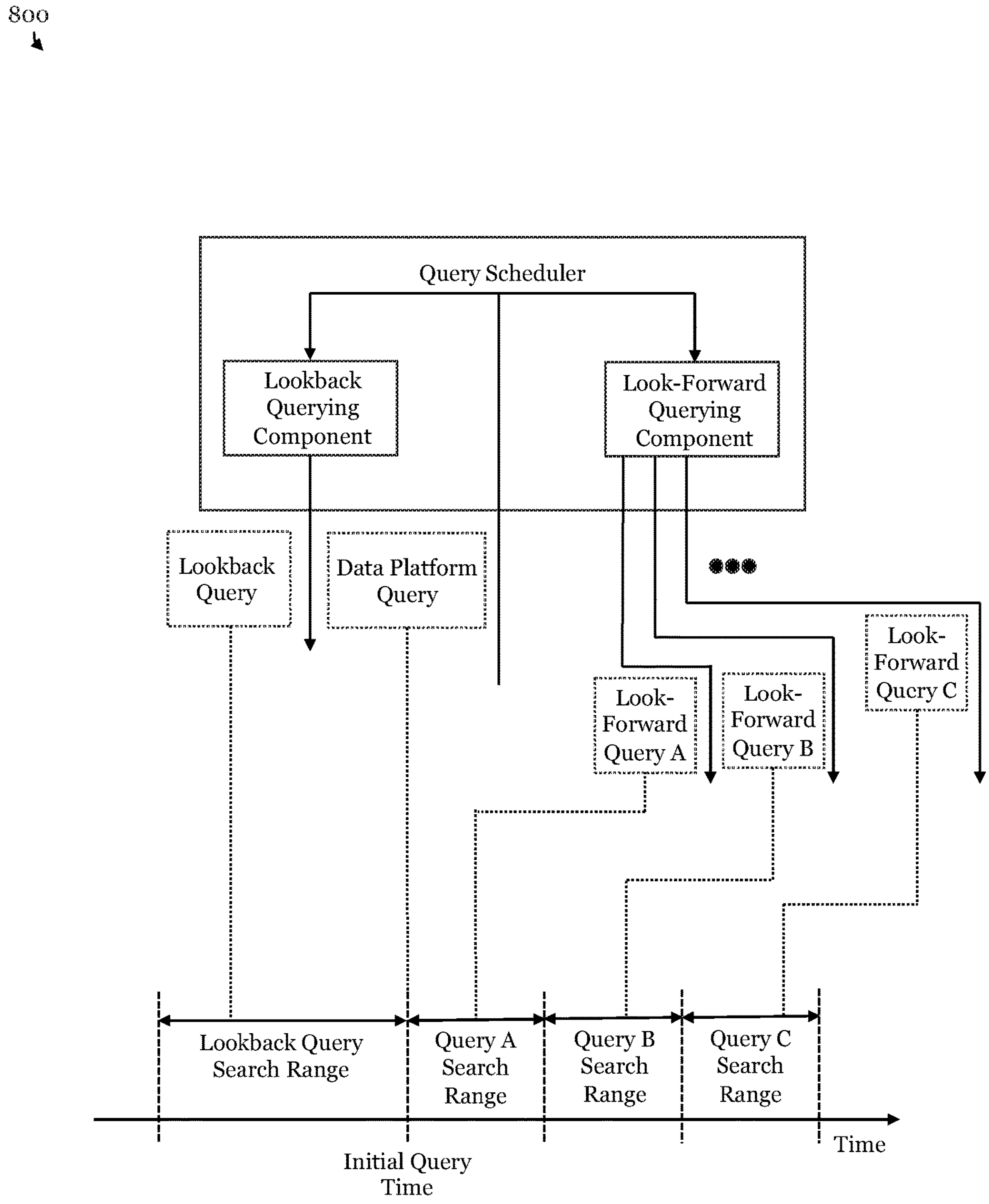
FIG. 8 illustrates an example of a query scheduling time range relationship in accordance with one or more embodiments of the present application.

FIG. 8 may depict a non-limiting example of a search range associated with the lookback query provided by the lookback querying component. The search range associated with the lookback query may be set to search for occurrences of candidate IOCs within a search range prior to execution of the data platform query. It should be noted that the search range may be constrained to a particular temporal width (e.g., 2 weeks) or may be unconstrained in its width.

In one or more embodiments, in response to S220 translating the threat hunt object into the plurality of distinct threat hunt queries, the system or service implementing method 200 may function to simultaneously execute, using one or more pollers, the plurality of distinct threat hunt queries across the plurality of distinct security devices. Accordingly, in response to executing the plurality of distinct threat hunt queries, the system or service implementing method 200 may function to obtain historical security event data from each security device of the plurality of distinct security devices. It shall be recognized that, in one or more embodiments, the plurality of distinct threat hunt queries, when executed across the plurality of distinct security devices, automatically performs a sweep of all computing environments of all subscribers to the cybersecurity event detection and response service to identify a plurality of historical security events that (1) occurred in the computing environments of the subscribers, (2) occurred within the retrospective query window, and (3) are associated with the at least one IOC, wherein each historical security event of the plurality of historical security events includes one or more pieces of metadata corresponding to the at least one IOC. It shall be recognized that, in one or more embodiments, in response to identifying the plurality of historical security events, the cybersecurity event detection and response service may generate, in real-time or near real-time, a plurality of distinct retrospective IOC-based security alerts based in part on the plurality of historical security events identified from executing the plurality of distinct threat hunt queries and, in turn, display the plurality of distinct retrospective IOC-based security alerts on a graphical user interface.

Furthermore, in such an embodiment, the system or service implementing method 200 may function to automatically construct one or more IOC-based threat detection instructions using one or more of the (a) the historical security event data obtained from each of the plurality of distinct security devices and (b) the one or more IOCs specified in the threat hunt object. Additionally, or alternatively, in one or more embodiments, the system or service implementing method 200 may function to assess the historical security event data obtained from each security device of the plurality of distinct security devices against a corpus of threat detection instructions that may include the one or more IOC-based threat detection instructions and, in response, generate one or more retrospective IOC-based security alerts based on the assessment of the historical security event data obtained from each security device of the plurality of distinct security devices against the corpus of threat detection instructions.

A retrospective IOC-based security alert, as generally referred to herein, may be a security alert generated based on detection of a security event included in historical security event data that is associated with the one or more IOCs specified in the threat hunt object and that was not previously detected or identified a security threat (e.g., malicious) by the system or service at a time the security event originally occurred.

An IOC-based threat detection instruction, as generally referred to herein, may be a rule, condition, or set of executable logic derived from one or more IOCs included in a threat hunt object or one or more threat hunt queries, wherein the IOC-based threat detection instruction specifies how event data is to be evaluated to determine whether a security event is indicative of a potential security threat. For instance, in a non-limiting example, if a threat hunt object or a corresponding threat hunt query includes an IOC corresponding to a malicious SHA256 file hash (e.g., "049ed15ef970bd12"), an IOC-based threat detection instruction derived therefrom may specify generating a security alert when a security event includes event metadata specifying a file hash matching the malicious SHA256 file hash. In another non-limiting example, if the threat hunt object or the corresponding threat hunt query includes an IOC corresponding to a malicious internet protocol address (e.g., "185.211.44.17"), the IOC-based threat detection instruction may specify generating a security alert when a security event includes event metadata specifying communication with the malicious internet protocol address. In yet another non-limiting example, if the threat hunt object or the corresponding threat hunt query includes an IOC corresponding to a malicious domain (e.g., "malicious.com") and an IOC corresponding to a suspicious process name (e.g., "powershell.exe"), the IOC-based threat detection instruction may specify generating a security alert when a security event includes event metadata indicating specifying execution of the suspicious process and a connection to the malicious domain.

Stated another way, in one or more embodiments, the system or service implementing method 200 may function to, in response to identifying one or more IOCs, retrieve, from the plurality of distinct security devices monitoring computing environments of all subscribers subscribing to the cybersecurity event detection and response service, historical security event data that is associated with the one or more IOCs and that occurred within a target historical time span (e.g., past 14 days, past 90 days, etc.). In such an embodiment, the system or service implementing method 200 may function to assess the retrieved historical security event data to identify one or more security events that include one or more pieces of event metadata corresponding to the one or more IOCs and, in turn, generate one or more retrospective IOC-based security alerts based on the one or more security events. At least one technical benefit of such a process enables an automatic, computer-implemented identification of previously undetected security threats across computing environments of all subscribers.

For example, in response to detecting one or more IOCs within a computing environment of a first subscriber (e.g., subscriber A), the system or service may automatically assess, in real-time or near real-time, log data of all other subscribers to the cybersecurity event detection and response service using the one or more IOCs as query parameters to identify digital activity (e.g., digital events or the like) that (i) occurred within computing environments of the other subscribers and (ii) are associated with or linked to the one or more IOCs. Accordingly, in one or more embodiments, the system or service implementing method 200 may function to generate one or more retrospective IOC-based security alerts based on the digital activity identified within the computing environments of the other subscribers to inform the other subscribers of security threats that were not previously detected at a time the digital activity originally occurred.

That is, detection of one or more IOCs within a computing environment of a single distinct subscriber may commence, in real-time or near real-time, an automated process to identify historical digital events that (i) occurred in computing environments of all other subscribers (e.g., 500 other subscribers, 1,000 other subscribers, etc.) to the event detection and response service and (ii) have metadata matching the one or more IOCs. In this way, the system or service implementing method 200 may use the one or more IOCs detected within the computing environment of the single distinct subscriber to identify historical digital events occurring in computing environments of the other subscribers that are associated with the one or more IOCs and generate one or more retrospective IOC-based security alerts based on the identified historical digital events.

It shall be recognized that, in one or more embodiments, in response to the system or service implementing method 200 constructing the one or more IOC-based threat detection instructions, the system or service implementing method 200 may function to automatically assess, in real-time or near real-time, historical security event data obtained from each of a plurality of distinct security devices against the one or more IOC-based threat detection instructions. In such an embodiment, the system or service implementing method 200 (e.g., cybersecurity event detection and response service) may function to generate, in real-time or near real-time, a plurality of distinct retrospective IOC-based security alerts (e.g., two retrospective IOC-based security alerts, five hundred retrospective IOC-based security alerts, etc.) based on detecting that at least a subset of the historical security event data obtained from each of the plurality of distinct security devices satisfies the one or more IOC-based threat detection instructions. Accordingly, in response to generating the plurality of distinct retrospective IOC-based security alerts, the system or service implementing method 200 may function to automatically execute, in real-time or near real-time, one or more automated threat mitigation actions to mitigate or resolve a security threat associated with the plurality of distinct retrospective IOC-based security alerts.

It shall be noted that, in one or more embodiments, the one or more automated threat mitigation actions, when executed, may function to mitigate, in real-time, the security threat associated with the plurality of distinct retrospective IOC-based security alerts by terminating one or more malicious sessions (linked to the at least IOC) that is occurring in one or more computing environments of a plurality of subscribers to the event detection and response service, automatically blocking network communications associated with the at least one IOC across the one or more computing environments, automatically preventing re-establishment of one or more network connections associated with the at least one IOC, automatically isolating one or more affected hosts or endpoints to prevent lateral movement of the security threat, automatically disabling one or more user accounts associated with the at least one IOC to prevent unauthorized access into the one or more computing environments, automatically removing or quarantining one or more files, applications, or processes associated with the at least one IOC from the one or more computing environments, automatically preventing future execution of one or more files or applications associated with the at least one IOC within the one or more computing environments, and/or automatically updating one or more security policies across the one or more computing environments to mitigate recurrence of the security threat.

Stated another way, in one or more embodiments, the historical security event data obtained from each security device of the plurality of distinct security devices may include a plurality of distinct sets of historical security events that correspond to a plurality of distinct subscribers to the cybersecurity event detection and response service. Each set of historical security events of the plurality of distinct sets of historical security events may (i) correspond to a distinct subscriber of the plurality of distinct subscribers and (ii) include all historical security events of the distinct subscriber that (1) occurred within the retrospective query window and (2) include at least one piece of event metadata corresponding to the at least one IOC. In other words, each historical event included in a respective set of historical security events may include at least one piece of event metadata that corresponds to, is equivalent to, or matches the at least one IOC. Additionally, in one or more embodiments, in response to constructing the one or more IOC-based threat detection instructions, the system or service implementing method 200 may function to assess, in real-time or near real-time, the plurality of distinct sets of historical security events that correspond to the plurality of distinct subscribers against the one or more IOC-based threat detection instructions and, in response, generate, in real-time or near real-time, a plurality of distinct retrospective IOC-based security alerts for each distinct subscriber of the plurality of distinct subscribers based on the assessment of the plurality of distinct sets of historical security events against the one or more IOC-based threat detection instructions.

For instance, in a non-limiting example, the at least one IOC may correspond to a malicious SHA256 file hash (e.g., "049ed15ef970bd12") and a malicious domain (e.g., "malicious.com"), and the retrospective query window may correspond to the past fourteen days. In such an example, if a current time is January 15, the retrospective query window may correspond to a time period from January 1 through January 15. A first set of historical security events corresponding to a first subscriber may include a plurality of historical security events occurring within the time period from January 1 through January 15 in which event metadata includes a file hash matching "049ed15ef970bd12" or a domain matching "malicious.com." Similarly, a second set of historical security events corresponding to a second subscriber may include a different plurality of historical security events occurring within the time period from January 1 through January 15 in which event metadata includes a file hash matching "049ed15ef970bd12" or a domain matching "malicious.com." In such a non-limiting example, the system or service implementing method 200 may function to assess each of the first set of historical security events and the second set of historical security events against the one or more IOC-based threat detection instructions and, in response, generate a first plurality of retrospective IOC-based security alerts for the first subscriber and a second plurality of retrospective IOC-based security alerts for the second subscriber based on detecting that at least a subset of the historical security events in each respective set satisfies the one or more IOC-based threat detection instructions.

Security Incident as Security Artifact

In one or more embodiments, the security artifact may correspond to a security incident detected in a compromised computing environment of a target subscriber (e.g., single subscriber) subscribing to the cybersecurity event detection and response service. It shall be recognized that the cybersecurity event detection and response service may have detected the security incident during a security investigation of one or more security alerts generated, by the cybersecurity event detection and response service, for the target subscriber.

In one or more embodiments, the plurality of distinct threat hunt queries, when executed across the plurality of distinct security devices, automatically performs a retrospective cross-environment scanning operation across computing environments of a plurality of additional subscribers to identify a plurality of historical security events associated with the at least one IOC. It shall be recognized that the plurality of additional subscribers are different from the target subscriber. In such an embodiment, each historical security event of the plurality of historical security events may have (i) occurred at one of the computing environments of the plurality of additional subscribers, (ii) occurred within the retrospective query window, and (iii) includes event metadata specifying the at least one IOC.

Accordingly, in one or more embodiments, the cybersecurity event detection and response service may function to generate a plurality of distinct retrospective IOC-based security alerts based on the plurality of historical security events identified during the retrospective cross-environment scanning operation. Furthermore, in such an embodiment, the cybersecurity event detection and response service may function to automatically route the plurality of distinct retrospective IOC-based security alerts to a security alert queue. Additionally, in such an embodiment, based on or in response to routing the plurality of distinct retrospective IOC-based security alerts to the security alert queue, the cybersecurity event detection and response service may function to execute (e.g., in real-time or near real-time) one or more threat mitigation actions to mitigate or resolve a security threat associated with the plurality of distinct retrospective IOC-based security alerts.

It shall be recognized that, in one or more embodiments, before execution of the retrospective cross-environment scanning operation, the cybersecurity event detection and response service may have determined that the plurality of historical security events identified during the retrospective cross-environment scanning operation were non-malicious (e.g., not a security threat, benign, etc.). In other words, before execution of the retrospective cross-environment scanning operation, the cybersecurity event detection and response service did not detect a security threat associated with the plurality of historical security events identified during the retrospective cross-environment scanning operation.

For instance, in a non-limiting example, the cybersecurity event detection and response service may detect, at 10:00 AM on January 15, within a computing environment of a target subscriber (e.g., subscriber A), a security incident involving execution of a suspicious file having a SHA256 file hash (e.g., "049ed15ef970bd12") and communication with a domain (e.g., "malicious.com"). In such an example, the cybersecurity event detection and response service may designate the SHA256 file hash and the domain as the at least one IOC and construct one or more IOC-based threat detection instructions using the SHA256 file hash (e.g., "049ed15ef970bd12") and the domain (e.g., "malicious.com"). In such a non-limiting example, the cybersecurity event detection and response service may generate a plurality of distinct threat hunt queries specifying a retrospective query window corresponding to the past fourteen days relative to the time the security incident was detected. Thus, if the security incident was detected at 10:00 AM on January 15, the plurality of distinct threat hunt queries may specify a start time of 10:00 AM on January 1 and an end time of 10:00 AM on January 15. The cybersecurity event detection and response service may execute the plurality of distinct threat hunt queries across a plurality of distinct security devices deployed across (or monitoring) computing environments of additional subscribers (e.g., subscriber B, subscriber C, etc.) to perform the retrospective cross-environment scanning operation. Accordingly, in one or more embodiments, during execution of the plurality of distinct threat hunt queries, the cybersecurity event detection and response service may identify historical security events within computing environments of the additional subscribers that occurred between 10:00 AM on January 1 and 10:00 AM on January 15. It shall be recognized that each historical security event of the identified historical security events may include event metadata specifying the SHA256 file hash "049ed15ef970bd12" and/or the domain "malicious.com."

In such a non-limiting example, prior to the retrospective cross-environment scanning operation, the cybersecurity event detection and response service may have classified the identified historical security events within the computing environments of the additional subscribers as benign or non-malicious. However, based on detecting the security incident within the computing environment of the target subscriber and leveraging the at least one IOC, the cybersecurity event detection and response service may reclassify the historical security events as indicative of a security threat and generate a plurality of retrospective IOC-based security alerts for the additional subscribers. The cybersecurity event detection and response service may further route the plurality of retrospective IOC-based security alerts to a security alert queue and automatically initiate one or more threat mitigation actions (e.g., blocking network communication with "malicious.com," quarantining files associated with the SHA256 file hash, etc.) within the computing environments of the additional subscribers.

At least one technical benefit of such a process enables the cybersecurity event detection and response service to identify previously undetected security threats across computing environments of all subscribers (to the cybersecurity event detection and response service) by using one or more IOCs detected for a target subscriber in an active, ongoing, or recently identified security incident.

Large Language Model Feedback Loop

In one or more embodiments, in response to executing the plurality of distinct threat hunt queries, the cybersecurity event detection and response service may function to generate query findings data using the historical security event data obtained from each security device of the plurality of distinct security devices. The query findings data, in one or more embodiments, may include a total number of historical security events identified by the plurality of distinct threat hunt queries, a total number of retrospective IOC-based security alerts generated based on the historical security event data obtained from each security device of the plurality of distinct security devices, and/or one or more query execution errors associated with at least one of the plurality of distinct threat hunt queries.

In such an embodiment, the cybersecurity event detection and response service may function to automatically generate training data for the large language model based on the query findings data. Accordingly, in such an embodiment, in response to generating the training data, the cybersecurity event detection and response service may function to train the large language model using the training data to improve a translation of a subsequent threat hunt object into a plurality of subsequent threat hunt queries.

At least one technical benefit of such a training process includes enabling the cybersecurity event detection and response service to continuously improve accuracy and reliability of translating threat hunt objects into threat hunt queries by incorporating feedback derived from query execution outcomes, thereby reducing a likelihood of query execution errors and improving effectiveness of detecting security events associated with IOCs.

For instance, in a non-limiting example, if a first threat hunt query of a first security device results in a query execution error (e.g., due to use of an incorrect field identifier or unsupported query syntax) and a second threat hunt query of the first security device successfully executes and returns a plurality of historical security events, the cybersecurity event detection and response service may function to generate training data that associates (i) the incorrect query structure of the first threat hunt query with the query execution error and (ii) the correct query structure of the second threat hunt query with successful execution. In such an example, the large language model may be trained using the training data to avoid generating threat hunt queries having the incorrect query structure and to preferentially generate threat hunt queries having the correct query structure, thereby improving subsequent generation of threat hunt queries for the first security device that conform to syntax requirements of the first security device.

2.40 Detecting Future Candidate IOC Occurrences Via the Data Platform Query

S240, which includes detecting future candidate IOC occurrences via the data platform query, may function to initiate, via one or more processing devices of the emerging threat detection service, ongoing execution of the data platform query at the target data platform at scheduled intervals to detect future occurrences of the one or more candidate IOCs. In a non-limiting example, as described with reference to FIG. 3, a query scheduler, upon receiving a data platform query, may initiate ongoing execution of the data platform query at a data platform at scheduled intervals (e.g., every minute, every hour, every day, etc.) to detect future occurrences of the one or more candidate IOCs. The data platform may report future occurrences to a query evaluator.

A future occurrence of a candidate IOC may refer to any instance in which a data record stored by the target data platform after the initiation of monitoring contains one or more attributes that match the candidate IOC. Future occurrences of candidate IOCs may be detected by querying the data platform after initial execution of the data platform query (e.g., after execution of the lookback data platform query). Detection of a future occurrence of a candidate IOC or a combination of candidate IOCs may indicate that the associated IOC or combination of candidate IOCs is still active or relevant in the monitored computing environment and may reflect an ongoing or recurring threat.

The execution being ongoing may refer to a repeated operation of the data platform query over time (e.g., as compared to a one-time retrospective analysis). Such a repeated operation of the data platform query may be referred to as prospective analysis. To balance computational efficiency with ensuring timely detection, ongoing execution may be configured to occur at scheduled intervals. The scheduled intervals may be spaced periodically and a data platform query executed for a particular interval may be constructed such that the data platform query searches for future occurrences of IOCs that occur after the previous interval (e.g., or after the initial search range in the case of the first data platform query executed after the lookback data platform query).

In a non-limiting example, as described with reference to FIG. 7, a query constructor may provide a query to a look-forward querying component of the query scheduler. The look-forward querying component may insert one or more temporal conditions into the query and may provide the associated query to the data platform at scheduled intervals. The data platform may then detect and report associated future occurrences associated with the candidate IOCs. The queries provided by the look-forward querying component may be referred to as look-forward queries.

FIG. 8 may depict a non-limiting example of search-ranges associated with the lookback queries provided by the lookback querying component. For instance, a first look-forward query (i.e., look-forward query A) may be provided by the look-forward querying component prior to a second look-forward query (i.e., look-forward query B), and the second look-forward query may be provided by the look-forward querying component prior to a third look-forward query (i.e., look-forward query C). The search range of the first look-forward query may begin at the execution time of the lookback query and may end at the execution time of the first look-forward query; the search range of the second look-forward query may begin at the execution time of the first look-forward query and may end at the execution time of the second look-forward query; and the search range of the third look-forward query may begin at the execution time of the second look-forward query and may end at the execution time of the third look-forward query.

In some examples, the query scheduler may manage the lifecycle, orchestration, and tracking of data platform queries. For instance, the query scheduler may maintain metadata for each data platform query, including corresponding candidate IOCs, a corresponding target data platform, execution start times, recurrence intervals for prospective monitoring, a query type (e.g., retrospective or prospective), and the status of each query (e.g., pending, active expired, retired, failed). The query scheduler may coordinate the execution of queries across multiple data platforms in parallel and may support automated version management, where modifications to candidate sets of IOCs may trigger dynamic updating of data platform queries. In some examples, the query scheduler may manage query retirement and deactivation when candidate IOCs become obsolete (e.g., based on an expiration policy, threat intelligence updates, or user input).

In one or more embodiments, after constructing the one or more IOC-based threat detection instructions, the system or service implementing method 200 may function to assess each new raw event obtained by the system or service implementing method 200 and/or each new security event normalized by the system or service implementing method 200 against the one or more IOC-based threat detection instructions. In other words, the system or service implementing method 200 may continuously monitor incoming event data in real-time or near real-time to determine whether the incoming event data satisfies one or more of the IOC-based threat detection instructions and, when at least one of the one or more IOC-based threat detection instructions is satisfied, generate one or more IOC-based security alerts corresponding to the incoming event data. At least one technical benefit of such a process enables real-time or near real-time detection of malicious digital activity occurring at any computing environment monitored by the system or service based on previously identified IOCs, thereby reducing a time to detect and respond to security incidents.

For instance, in a non-limiting example, the system or service implementing method 200 may function to assess, in real-time or near real-time, new security events normalized by the cybersecurity event detection and response service and, in response, automatically generate, in real-time or near real-time, at least one IOC-based security alert based on detecting that a respective new security event of the new security events satisfies one of the one or more IOC-based threat detection instructions.

In one or more embodiments, before assessing the new security events normalized by the cybersecurity event detection and response service, the system or service implementing method 200 may function to initialize a counter (e.g., computer counter or the like) for a target IOC (e.g., the at least one IOC). The counter, as generally referred to herein, may be a digital circuit or software variable that tracks and records the number of times a target IOC occurs within a target period (e.g., 7 days, etc.). A target period (e.g., target time span or the like), in one or more embodiments, may refer to a defined duration of time beginning at an initialization time at which the counter is initialized and extending for a predetermined length of time (e.g., seven days, fourteen days, etc.), during which occurrences of the at least one IOC are tracked and recorded by the counter.

In such an embodiment, while assessing the new security events normalized by the cybersecurity event detection and response service, the system or service implementing method 200 may function to track, using the counter (e.g., computer counter), a total number of times that the at least one IOC was detected in the new security events during the target period. Accordingly, at expiration of the target period, the cybersecurity event detection and response service may function to automatically perform, in real-time or near real-time, at least one detection handling action based on the total number of times that the at least one IOC was detected in the new security events during the target period. For instance, in a non-limiting example, the at least one detection handling action includes may include terminating the one or more IOC-based threat detection instructions when the total number of times that the at least one IOC was detected in the new security events during the target period fails to satisfy a predetermined minimum IOC count threshold. In another non-limiting example, the at least one detection handling action may include bypassing (or preventing) the termination of the one or more IOC-based threat detection instructions when the total number of times that the at least one IOC was detected in the new security events during the target period satisfies the predetermined minimum IOC count threshold.

In other words, the system or service implementing method 200 may function to dynamically determine whether the one or more IOC-based threat detection instructions remain active or are terminated based on a frequency with which the at least one IOC is detected within the target period, such that IOC-based threat detection instructions associated with infrequent or non-recurring IOCs may be automatically removed while IOC-based threat detection instructions associated with recurring or persistent IOCs may remain active.

For instance, in a non-limiting example, if the target IOC corresponds to a malicious domain (e.g., "malicious.com"), the predetermined minimum IOC count threshold is five occurrences within a seven-day target period, and the counter indicates that the malicious domain was detected only two times in the new security events during the seven-day target period, the system or service implementing method 200 may function to automatically terminate, in real-time or near real-time, all IOC-based threat detection instructions of the one or more IOC-based threat detection instructions (e.g., a plurality of IOC-based threat detection instructions or the like) mapped to the malicious domain.

In another non-limiting example, if the target IOC corresponds to a malicious internet protocol address (e.g., "185.211.44.17"), the predetermined minimum IOC count threshold is five occurrences within a seven-day target period, and the counter indicates that the malicious internet protocol address was detected ten times in the new security events during the seven-day target period, the system or service implementing method 200 may function to keep active (e.g., not terminate) all IOC-based threat detection instructions of the one or more IOC-based threat detection instructions (e.g., a plurality of IOC-based threat detection instructions or the like) mapped to the malicious internet protocol address.

In another non-limiting example, if the target IOC corresponds to a malicious file hash (e.g., "1d2094ce85d66878ee079185e2761beb"), the predetermined minimum IOC count threshold is five occurrences within a seven-day target period, and the counter indicates that the malicious file hash was detected three times in the new security events during the seven-day target period, the system or service implementing method 200 may function to route all IOC-based threat detection instructions mapped to the malicious file hash to a review queue displayed on a graphical user interface for assessment prior to termination. Accordingly, in such an embodiment, the system or service implementing method 200 may function to receive, via the graphical user interface, an input indicating termination of all the IOC-based threat detection instructions mapped to the malicious file hash and, in response to the input, the system or service may function to terminate all IOC-based threat detection instructions mapped to the malicious file hash. Terminating a respective IOC-based threat detection instruction, as generally referred to herein, may refer to deactivating or removing the respective IOC-based threat detection instruction such that the respective IOC-based threat detection instruction is no longer used by the cybersecurity event detection and response service to assess new or incoming security event data.

In another non-limiting example, if the target IOC corresponds to a malicious file hash (e.g., "1d2094ce85d66878ee079185e2761beb"), the predetermined minimum IOC count threshold is five occurrences within a seven-day target period, and the counter indicates that the malicious file hash was detected three times in the new security events during the seven-day target period, the system or service implementing method 200 may function to route all IOC-based threat detection instructions mapped to the malicious file hash to a review queue displayed on a graphical user interface for assessment prior to termination. Accordingly, in such an embodiment, the system or service implementing method 200 may function to receive, via the graphical user interface, an input indicating that termination of all the IOC-based threat detection instructions mapped to the malicious file hash is not to be performed and, in response to the input, the system or service may function to keep active all IOC-based threat detection instructions mapped to the malicious file hash. Keeping active a respective IOC-based threat detection instruction, as generally referred to herein, may refer to retaining the respective IOC-based threat detection instruction such that the respective IOC-based threat detection instruction continues to be used by the cybersecurity event detection and response service to assess new or incoming security event data.

At least one technical benefit of performing detection handling actions enables the cybersecurity event detection and response service to accelerate detection of security threats by eliminating stale or non-useful IOC-based threat detection instructions, thereby reducing memory usage and processing overhead associated with evaluating incoming security event data.

In another non-limiting example, before assessing the new security events normalized by the cybersecurity event detection and response service, the cybersecurity event detection and response service may function to initialize a counter for a target IOC (e.g., the at least one IOC). The counter, in such a non-limiting example, may track a total number of times that the at least one IOC was detected in log data of all subscribers subscribing to the cybersecurity event detection and response service within a target time span. The target time span, in some embodiments, may refer to a predetermined duration of time beginning at an initialization time at which the counter is initialized and extending for a predetermined length of time (e.g., seven days after the initialization time). In one or more embodiments, at expiration of the target time span, the cybersecurity event detection and response service may function to (i) automatically assess the total number of times that the at least one IOC was detected in the log data, (ii) automatically extend, for a subsequent target time span, a duration that the one or more IOC-based threat detection instructions (created in S230 or any other step of method 200) are active in the cybersecurity event detection and response service based on the assessment of the total number of times that the at least one IOC was detected in the log data, and (iii) reset the counter to an initial value (e.g., default value or the like) to track a subsequent total number of times that the at least one IOC is detected in all computing environments of the all subscribers subscribing to the cybersecurity event detection and response service during the subsequent target time span. Accordingly, at expiration of the subsequent target time span, the cybersecurity event detection and response service may function to automatically assess the subsequent total number of times that the at least one IOC was detected during the subsequent target time span and, in response, automatically cease use of the one or more IOC-based threat detection instructions based on the assessment of the subsequent total number of times that the at least one IOC was detected during the subsequent target time span.

In other words, the cybersecurity event detection and response service may function to iteratively evaluate, over sequential target time spans, a frequency with which the at least one IOC is detected across computing environments of all subscribers and, based on the frequency, dynamically determine whether to continue use of or cease use of the one or more IOC-based threat detection instructions, such that IOC-based threat detection instructions associated with persistently detected IOCs remain active across successive target time spans while IOC-based threat detection instructions associated with infrequently detected IOCs are automatically discontinued.

For instance, in a non-limiting example, if the target IOC corresponds to a malicious domain (e.g., "malicious.com"), the cybersecurity event detection and response service may initialize a counter at a first time (e.g., 12:00 AM on January 1) and define a first target time span of seven days (e.g., January 1 through January 8). During the first target time span, the counter may track a total number of times that the malicious domain is detected across computing environments of all subscribers (e.g., thousands or even millions of subscribers). If, at expiration of the first target time span, the counter indicates that the malicious domain was detected twenty times, which exceeds a predetermined threshold (e.g., five detections), the cybersecurity event detection and response service may function to extend, for a subsequent seven-day target time span (e.g., January 9 through January 16), a duration that all IOC-based threat detection instructions corresponding to the malicious domain remain active, and reset the counter to track detections during the subsequent target time span (e.g., January 9 through January 16).

In such a non-limiting example, during the subsequent target time span (e.g., January 9 through January 16), the counter may track zero detections of the malicious domain across computing environments of all subscribers. If the counter indicates, at expiration of the subsequent target time span, that the malicious domain was detected zero times, which fails to exceed the predetermined threshold, the cybersecurity event detection and response service may function to cease use of all IOC-based threat detection instructions corresponding to the malicious domain remain active, thereby preventing the cybersecurity event detection and response service from continuing to monitor computing environments of all subscribers for the malicious domain.

At least one technical benefit of such a process includes enabling the cybersecurity event detection and response service to automatically adapt monitoring of IOCs based on digital activity observed across computing environments of all subscribers, thereby reducing unnecessary consumption of computational resources and memory associated with monitoring inactive or non-relevant IOCs while continuing to perform real-time or near real-time monitoring of IOCs indicative of persistent or widespread security threats.

Additionally, or alternatively, in one or more embodiments, S240 may function to automatically commence, at a predetermined interval (e.g., every second, every minute, every hour, every day, etc.), a sequence of operations to reduce a time to detect and remediate future security threats associated with the at least one IOC detected in S210. Each iteration of the sequence of operations, in one or more embodiments, may include automatically polling, using one or more pollers, the plurality of distinct security devices to obtain new security event data, assessing, in real-time or near real-time, a normalized representation of the new security event data against the one or more IOC-based threat detection instructions in response to receiving the new security event data, and automatically generating, in real-time or near real-time, one or more additional IOC-based security alerts based on the normalized representation of the new security event data satisfying at least one of the one or more constructed IOC-based threat detection instructions.

Figure 16:
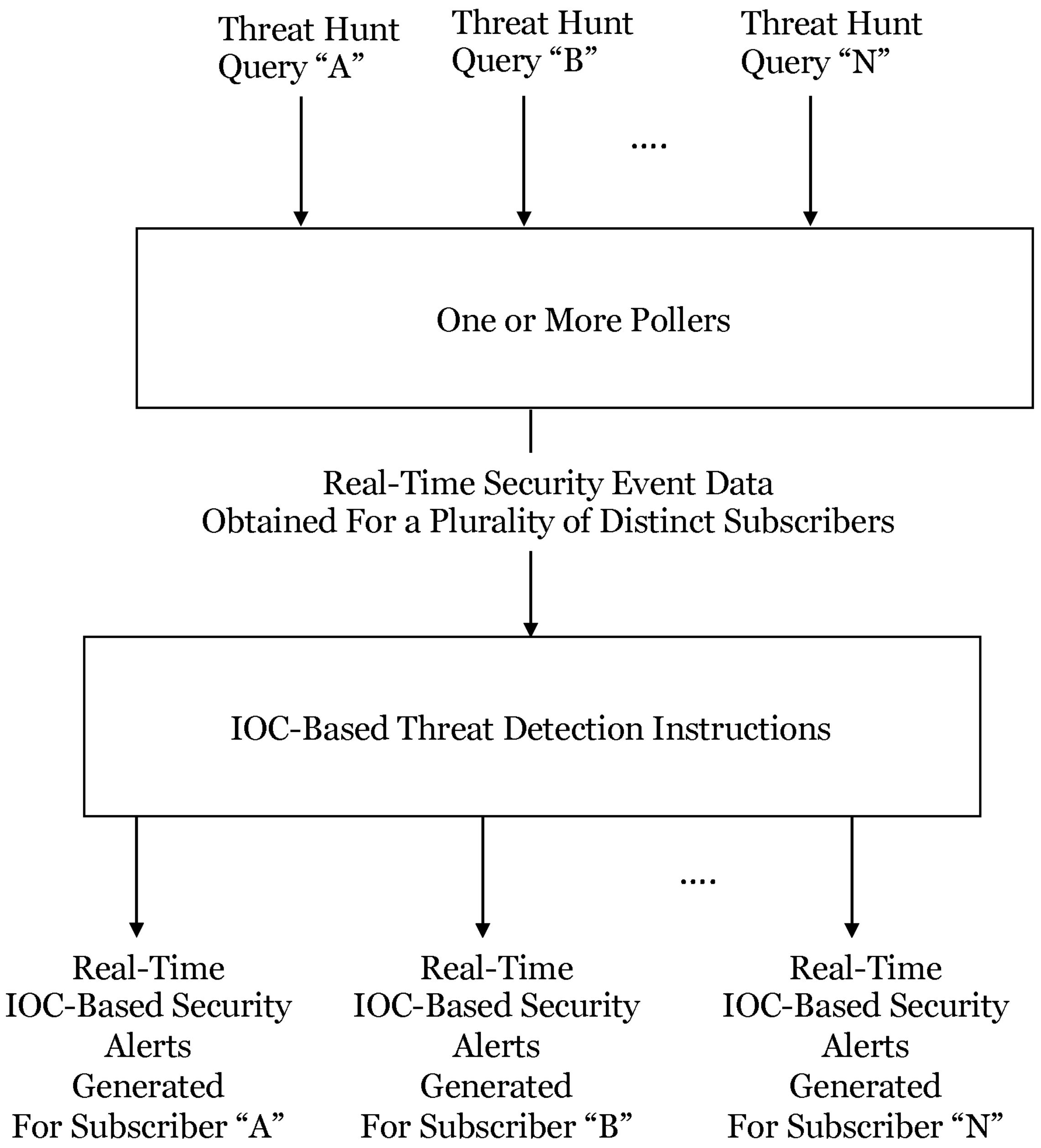

For instance, in a non-limiting example, if the predetermined interval corresponds to every second, the sequence of operations may be executed at a first time (e.g., 10:00:00 AM) and a second time (e.g., 10:00:01 AM). At the first time (e.g., 10:00:00 AM), the system or service implementing method 200 may function to poll the plurality of distinct security devices to obtain a first set of new security event data, assess the first set of new security event data against the one or more constructed IOC-based threat detection instructions, and, in response to detecting that at least one event of the first set of new security event data satisfies the one or more IOC-based threat detection instructions, generate one or more IOC-based security alerts for the at least one event. At the second time (e.g., 10:00:01 AM), the system or service implementing method 200 may function to again poll the plurality of distinct security devices to obtain a second set of new security event data, assess the second set of new security event data against the one or more IOC-based threat detection instructions, and, in response to detecting that at least one event of the second set of new security event data satisfies the one or more IOC-based threat detection instructions, generate one or more additional IOC-based security alerts, thereby enabling continuous, near real-time detection of security threats associated with the at least one IOC, as shown generally by way of example in FIG. 16.

At least one technical benefit of such an approach includes enabling continuous, near real-time monitoring of security event data across the plurality of distinct security devices, thereby reducing a time to detect and respond to security threats associated with the at least one IOC and preventing future security threats involving the at least one IOC from propagating across computing environments.

Additionally, or alternatively, in one or more embodiments, one of the one or more IOC-based threat detection instructions may specify generating a subject IOC-based security alert when a subject new security event includes at least one piece of metadata equivalent to a target IOC. In such an embodiment, in response to the one of the one or more IOC-based threat detection instructions detecting that a respective piece of metadata included in a respective new security event is equivalent to the target IOC, the one of the one or more IOC-based threat detection instructions may generate a corresponding IOC-based security alert for the respective new security event.

Additionally, or alternatively, in one or more embodiments, constructing a respective IOC-based threat detection instruction of the one or more IOC-based threat detection instructions may include one or more of providing the historical security event data obtained from each of the plurality of distinct security devices to the large language model, assessing, using the large language model, the historical security event data obtained from each of the plurality of distinct security devices to detect a malicious behavior pattern associated with the at least one IOC, and/or encoding, using the large language model, the respective IOC-based threat detection instruction to specify a detection condition that is satisfied when a subject new security event includes event metadata that (1) matches the malicious behavior pattern and (2) includes the at least one IOC. In such an embodiment, the respective IOC-based threat detection may generate a subject IOC-based security alert for a respective new security event when the respective new security event satisfies the detection condition of the respective IOC-based threat detection instruction.

For instance, in a non-limiting example, if the at least one IOC corresponds to a malicious domain (e.g., "malicious-.com"), the large language model may function to assess the historical security event data and detect a malicious behavior pattern in which a process (e.g., "powershell.exe") initiates an outbound network connection to "malicious.com" followed by execution of a secondary process within a predetermined time interval. In such an example, the large language model may encode the respective IOC-based threat detection instruction to specify a detection condition that is satisfied when a new security event includes event metadata indicating (i) execution of "powershell.exe," (ii) a network connection to "malicious.com," and (iii) execution of the secondary process within the predetermined time interval. The respective IOC-based threat detection instruction, when applied to new security events, is operably configured to generate a subject IOC-based security alert when the new security event satisfies the detection condition corresponding to the malicious behavior pattern.

Query Tracking

In one or more embodiments, the cybersecurity event detection and response service may function to track, in a computer database, a distinct query execution state for each of the plurality of distinct threat hunt queries. The distinct query execution state may indicate whether a respective threat hunt query has not been executed, is partially executed, or has completed execution.

In such an embodiment, the cybersecurity event detection and response service may detect one or more transient failures during execution of the plurality of distinct threat hunt queries and/or undergo one or more system restarts during execution of the plurality of distinct threat hunt queries. Accordingly, in one or more embodiments, in response to detecting the one or more system restarts or the one or more transient failures, the cybersecurity event detection and response service may function to identify, using the computer database, a first subset of the plurality of distinct threat hunt queries that are partially completed, a second subset of the plurality of distinct threat hunt queries that have completed execution, and a third subset of the plurality of distinct threat hunt queries that have not been executed.

In such an embodiment, in response to identifying the first subset of the plurality of distinct threat hunt queries, the cybersecurity event detection and response service may function to re-execute each distinct threat hunt query included in the first subset.

In such an embodiment, in response to identifying the second subset of the plurality of distinct threat hunt queries, the cybersecurity event detection and response service may function to bypass re-execution of each distinct threat hunt query included in the second subset.

In such an embodiment, in response to identifying the second subset of the plurality of distinct threat hunt queries, the cybersecurity event detection and response service may function to commence asynchronous execution of each distinct threat hunt query included in the third subset.

At least one technical benefit of such an approach includes enabling the cybersecurity event detection and response service to reliably execute the plurality of distinct threat hunt queries in the presence of system interruptions or transient failures by preserving query execution state, thereby preventing redundant query execution, reducing unnecessary consumption of computational resources, and improving efficiency and completeness of retrieving security event data.

For instance, in a non-limiting example, the plurality of distinct threat hunt queries may include ten distinct threat hunt queries (e.g., Q1-Q10) submitted for execution across a plurality of distinct security devices. During execution, the cybersecurity event detection and response service may track, in the computer database, a respective query execution state for each of Q1-Q10. At a first time (e.g., 10:00 AM), the cybersecurity event detection and response service may experience a system restart or transient failure after completing execution of Q1-Q4, partially executing Q5 and Q6, and not yet executing Q7-Q10. In such an example, upon recovery (e.g., 10:01 AM), the cybersecurity event detection and response service may function to access the computer database and identify (i) a first subset including Q5 and Q6 as partially executed queries, (ii) a second subset including Q1-Q4 as completed queries, and (iii) a third subset including Q7-Q10 as not yet executed queries. The cybersecurity event detection and response service may then re-execute Q5 and Q6, bypass re-execution of Q1-Q4, and commence asynchronous execution of Q7-Q10, thereby ensuring completion of all ten threat hunt queries without redundant execution of previously completed queries.

2.50 Evaluating Whether Occurrences of Candidate IOCs Meet Predefined Criteria

S250, which includes evaluating, via the one or more processing devices of the emerging threat detection service, whether occurrences of candidate IOCs meet predefined criteria, may function to evaluate the detected past and future occurrences of the candidate IOCs to determine whether the one or more candidate IOCs meet the predefined criteria. In non-limiting examples, as described with reference to FIG. 3, a query evaluator may receive candidate IOC occurrences from a data platform and may evaluate whether the one or more candidate IOCs meet predefined criteria. If the one or more candidate IOCs meet the predefined criteria, the query evaluator may provide an IOC detection indication to a detection rule generator. The IOC detection indication may indicate one or more candidate IOCs relevant to the satisfied predefined criteria.

The predefined criteria may refer to one or more predefined evaluative conditions, thresholds, instructions, or rules used to assess whether candidate IOCs indicate an emerging threat based on observed occurrences reported by a data platform. These criteria may include, but not be limited to, a frequency of matches within a defined time windows to a candidate IOC or a combination of candidate IOCs, a quantity of distinct endpoints or clients exhibiting a candidate IOC or particular combination of candidate IOCs, a diversity of data sources (e.g., data platforms) confirming a candidate IOC or a combination of candidate IOCs, a time span over which a candidate IOC or a combination of candidate IOCs are observed, or an observed correlation of a candidate IOC a combination of IOCs with known malicious behaviors or tactics.

An occurrence of a candidate IOC or a combination of candidate IOCs may meet predefined criteria when aggregated evidence associated with the candidate IOC or the combination of candidate IOCs satisfies the one or more evaluative conditions. Meeting the predefined criteria may trigger a promotion of the candidate IOC or each candidate IOC within the combination of candidate IOCs to confirmed IOCs and may result in a generation of one or more detection rules (e.g., as described at S260) via a corresponding IOC detection indication. It should be noted that a candidate IOC that has been determined to be a confirmed IOC may, in some examples, be referred to as an emerging IOC.

2.60 Generating Detection Rule(s) Based on the Evaluation

S260, which includes generating detection rules, may function to generate, via the one or more processing devices of the emerging threat detection service, detection rules based on the evaluation of the occurrences of the candidate IOCs satisfying the predefined criteria. In a non-limiting example as described with reference to FIG. 3, a detection rule generator may receive an IOC detection indication from a query evaluator and may generate one or more detection rules for the associated candidate IOCs based on the IOC detection indication. The detection rule generator may provide the one or more detection rules to an IOC detector.

A detection rule (e.g., IOC-based threat detection instruction or the like) may refer to a logical construct that specifies conditions under which a security platform should recognize, flag, and/or respond to potentially malicious activity based on matching data patterns, values, or behaviors. A detection rule may include one or more matching criteria, such as specific IOCs or specific combinations of IOCs. Generating a detection rule may involve translating validated IOC attributes into a format compatible with a particular security platform. Once generated, the detection rule may enable automated identification of future threats matching confirmed IOCs.

2.70 Providing an Alert Message to a Security Platform

S270, which includes providing an alert message (e.g., IOC-based security alert or the like) to a security platform, may function to provide, to the security platform via the one or more processing devices of the emerging threat detection service, the alert message according to the generated detection rules based on detection of an additional occurrence of the one or more IOCs. In a non-limiting example, as described with reference to FIG. 3, an IOC detector may receive one or more detection rules and may monitor for an additional occurrence of an IOC associated with the one or more detection rules. Upon receiving the additional occurrence of the IOC, the IOC detector may generate an alert message (e.g., an IOC alert) and may provide (e.g., transmit) the alert message to a security platform.

The term "alert message" may refer to a machine-generated notification or data packet that indicates the detection of a security-relevant event or condition, such as an occurrence of an IOC within monitored data. The alert message may contain information identifying the matched IOC, contextual metadata such as the time of detection, a severity of the event, and/or a recommendation of remediation actions. The term "security platform" may refer to a system, service, or framework configured to receive, process, and act upon alert messages. A non-limiting example of such a system may include Workbench. Other non-limiting examples may include SIEM systems; EDR platforms; security orchestration automation, and response (SOAR) systems; and cloud-native security services. These platforms may correlate alerts, prioritize incidents, and initiate defensive measures.

Figure 13:
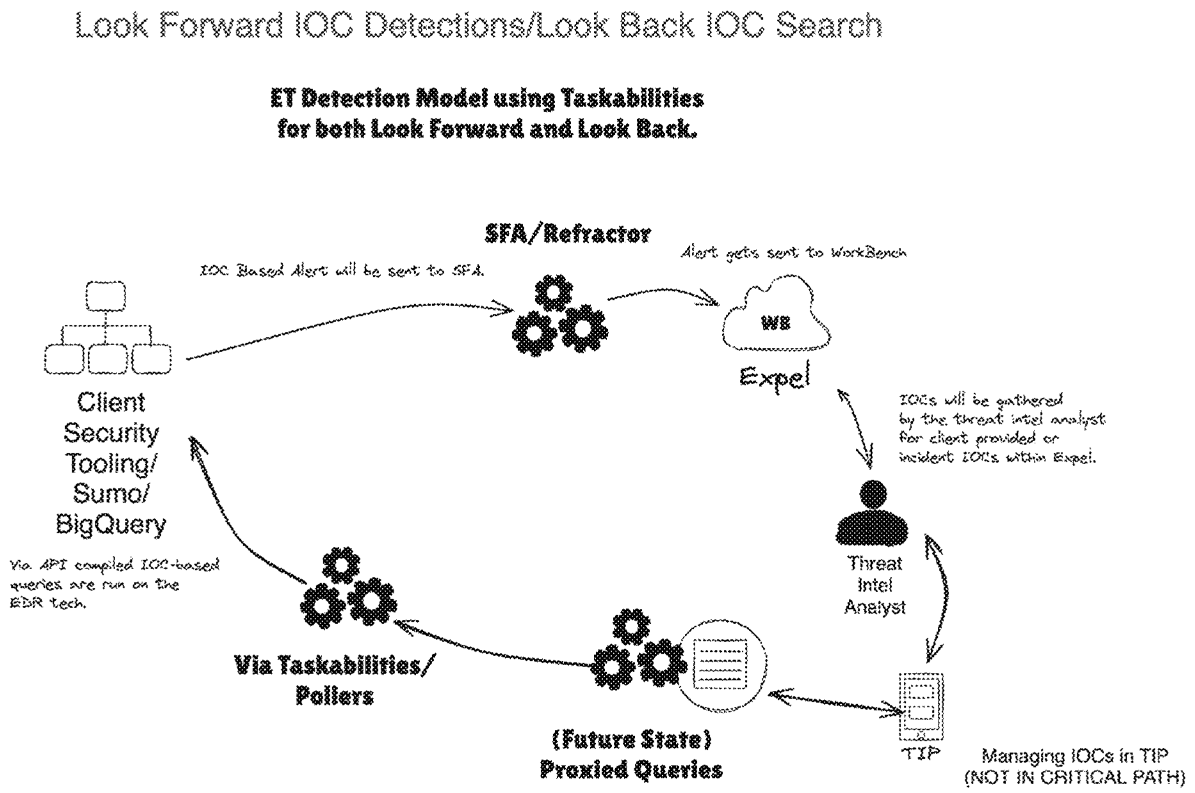
FIG. 13 illustrates a system that supports IOC detection in accordance with one or more embodiments of the present application.

In one example scenario, a detection rule may be generated based on the evaluation of a candidate IOC including a suspicious domain name identified during prior retrospective and prospective analysis. Once deployed, the detection rule may continuously monitor incoming network traffic data (e.g., at a target data platform). Upon detection of an additional occurrence of the suspicious domain, the detection rule may trigger the generation of an alert message, which may be then transmitted to a security platform. It should be noted that there may be examples where the system 1300 as depicted in FIG. 13 may be configured to perform the steps of method 200.

Emerging Threats User Interface

Figure 9:
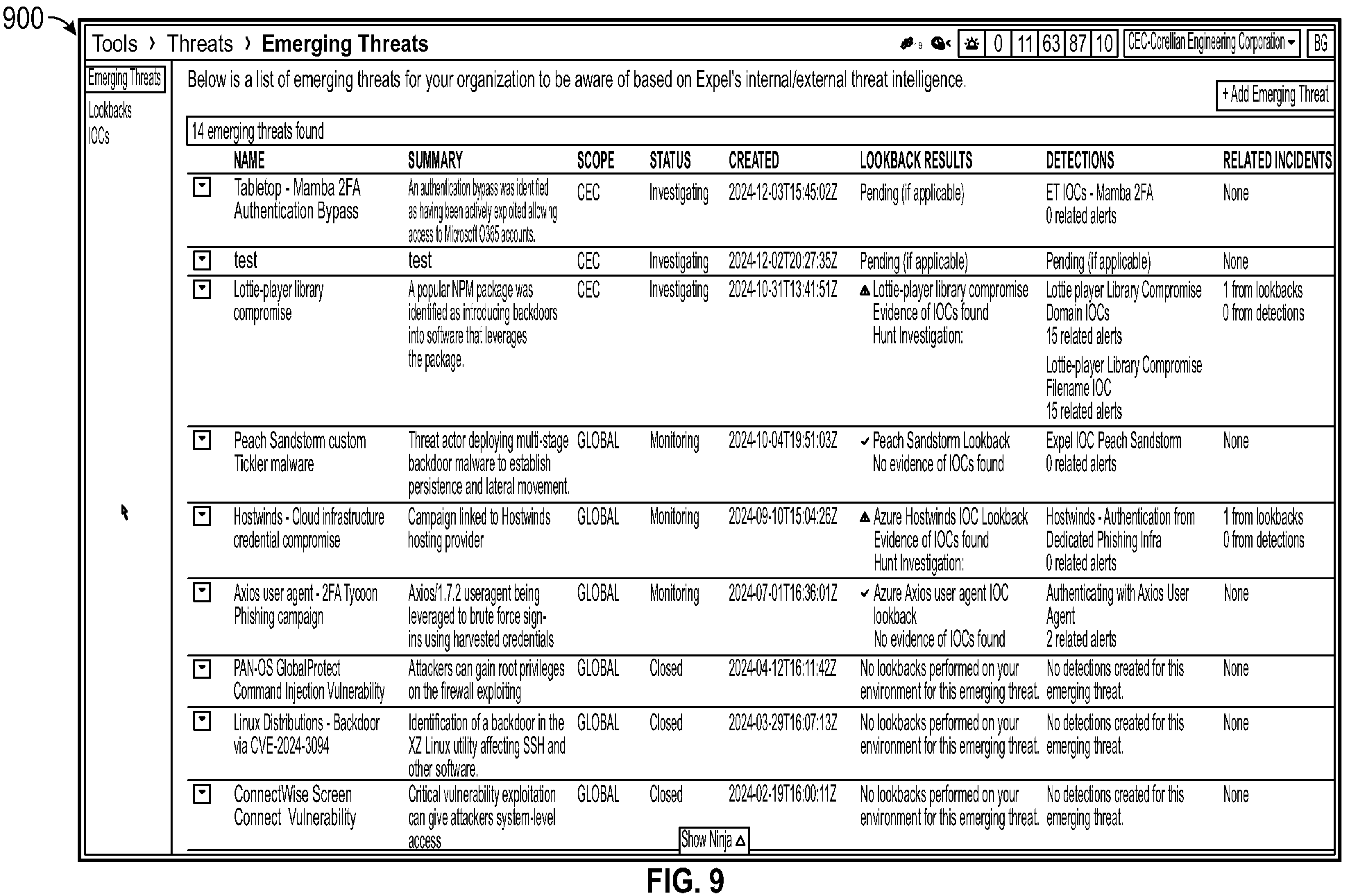
FIGS. 9 through 12C illustrates examples of graphical user interface interviews that support IOC detection in accordance with one or more embodiments of the present application.

In some examples, the emerging threat detection service may provide an emerging threats user interface configured to receive digital artifacts that include candidate IOCs and to display whether candidate IOCs have been confirmed as emerging IOCs. An example of such a user interface may be depicted in FIG. 9 (e.g., user interface view 900).

The emerging threats user interface may include a user interface control element that enables one or more digital artifacts including candidate IOCs to be uploaded to the emerging threat detection service. Alternatively, the emerging threats user interface may include user interface input elements that support user input which indicates candidate IOCs. Once the digital artifacts and/or the user input indicating candidate IOCs is received, a new emerging threat entry may be created and a new user interface display element corresponding to the new emerging threat entry may be displayed in the emerging threats user interface.

The emerging threats user interface may further include a set of user interface display elements corresponding to previously created emerging threat entries. These user interface display elements may include one or more of an identifier (e.g., name) for the emerging threat, a summary of the emerging threat, a scope of the emerging threat, a status of the emerging threat, a timestamp indicating when the emerging threat entry was created, a result of a lookback query, an indication of one or more detections corresponding to the emerging threat, and/or an indication of related incidents.

Detection Result Refinement User Interface

In some examples, the emerging threat detection service may provide a detection result refinement user interface configured to refine detection results prior to an alert message being sent to a security platform upon a detection rule being triggered. An example of such a user interface may be depicted in FIG. 10 and FIGS. 11A through 11D (e.g., user interface views 1000, 1100A, 1100B, 1100C, and 1100D). It should be noted that there may be examples where a system external to but in communication with the emerging threat detection service may provide the detection result refinement user interface.

Figure 10:
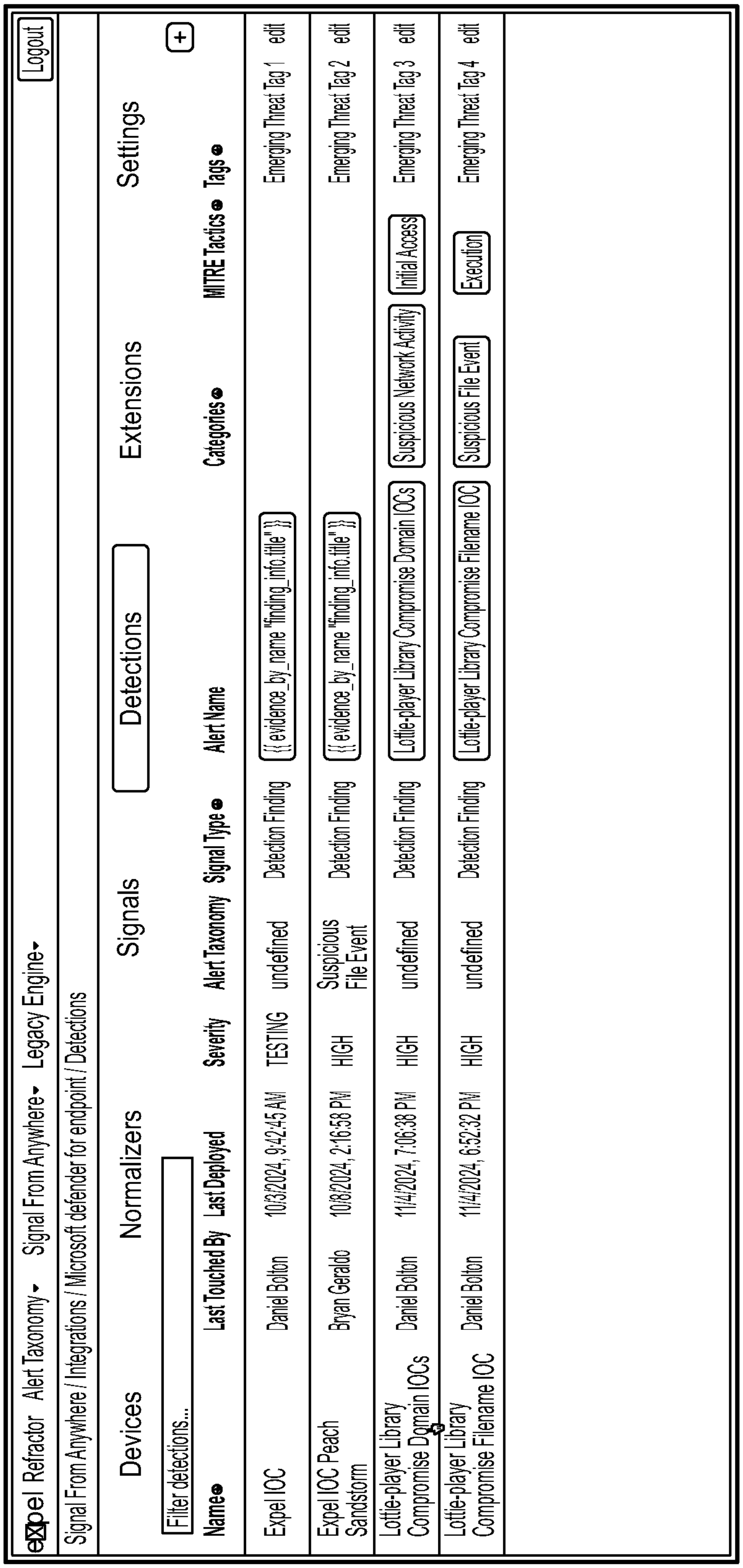
Figure 11A:
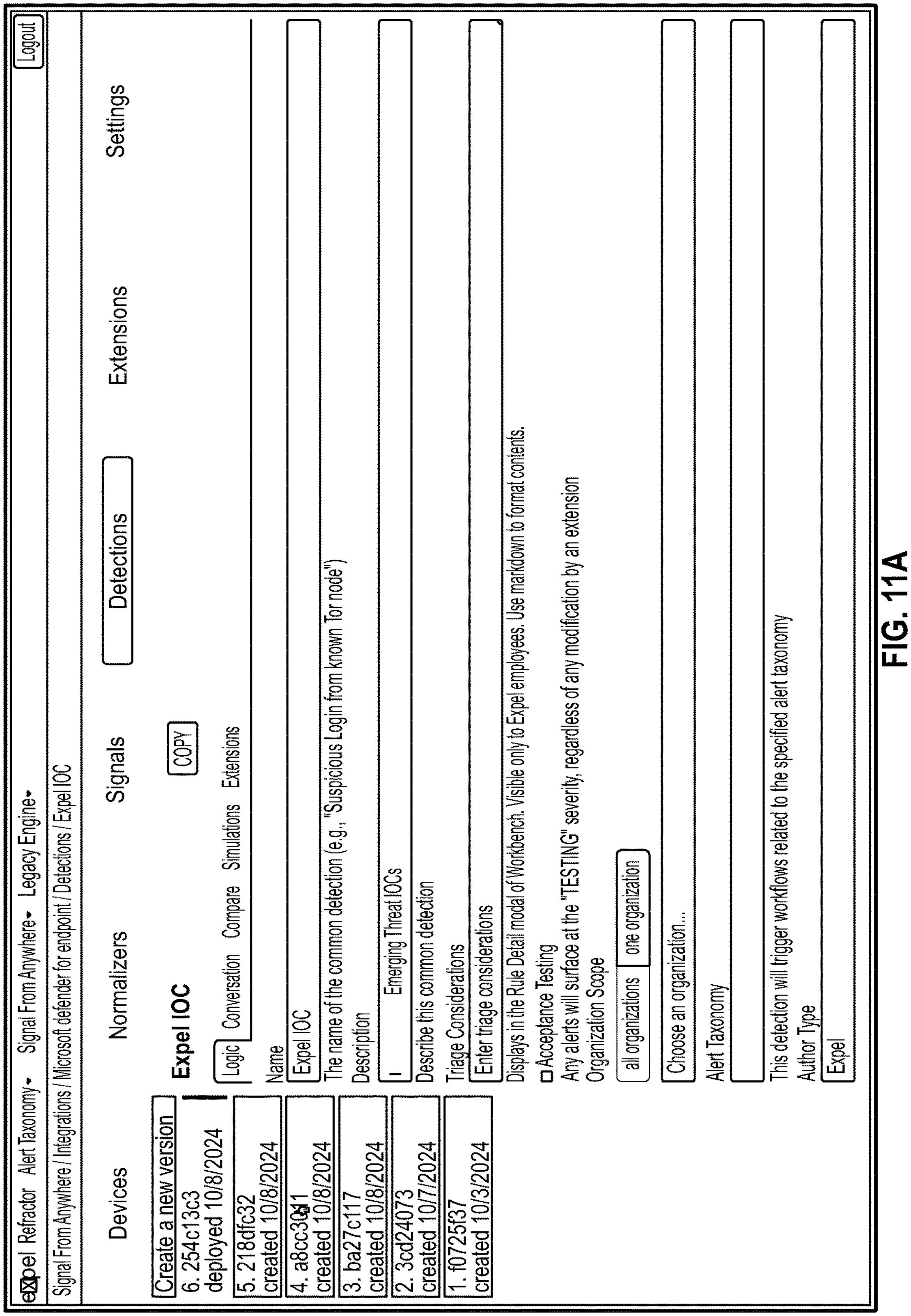
Figure 11B:
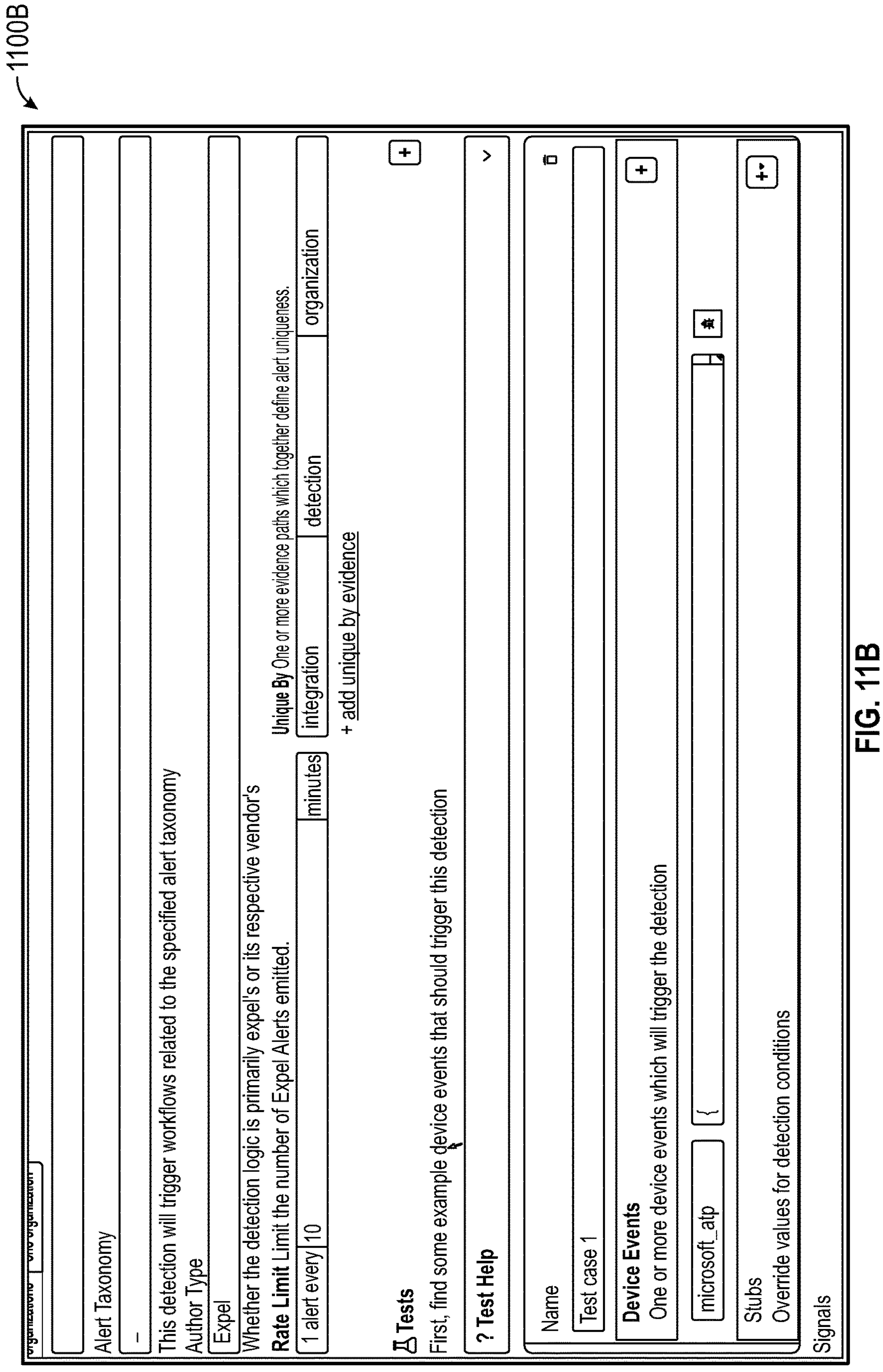
Figure 11C:
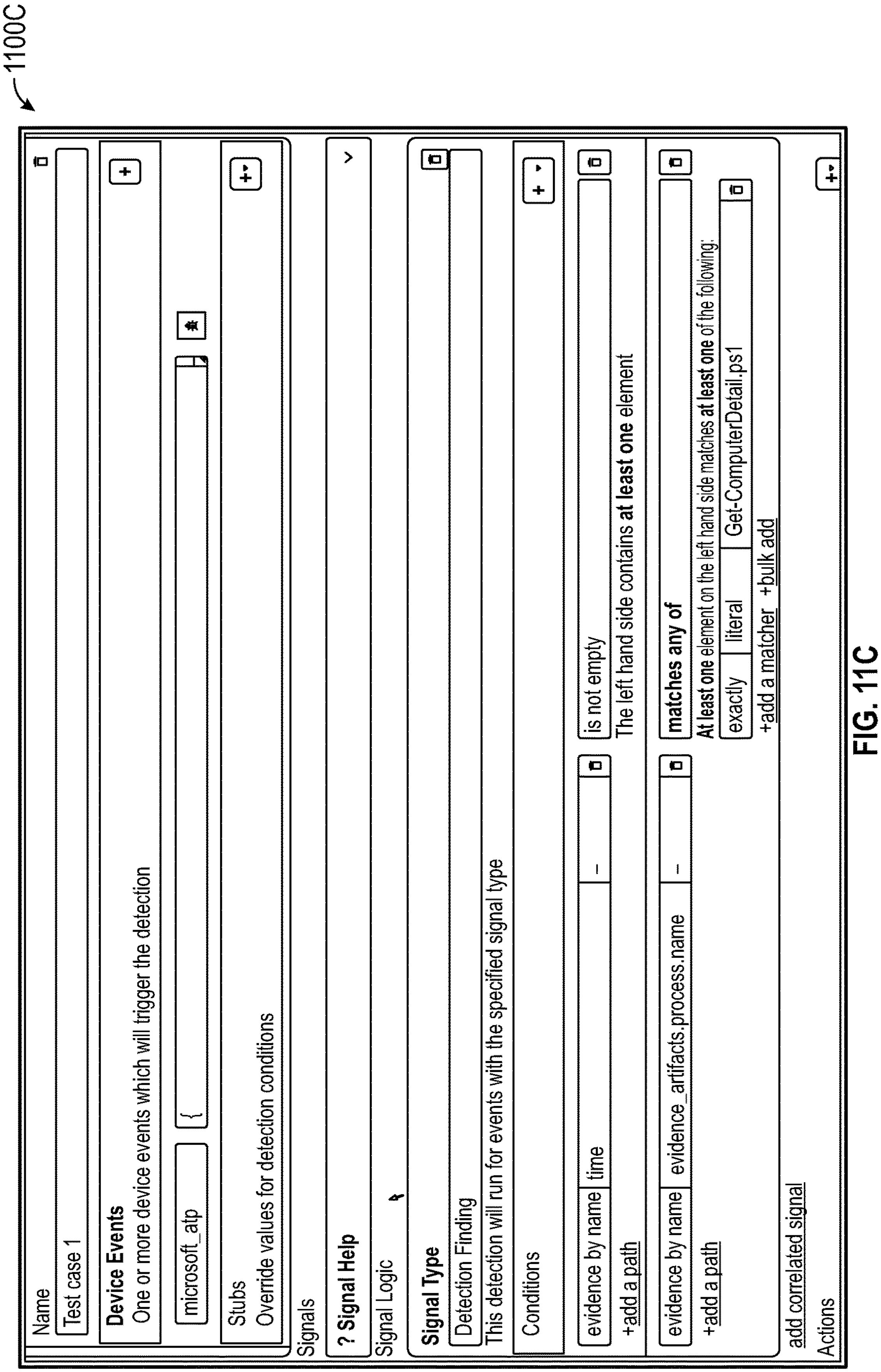
Figure 11D:
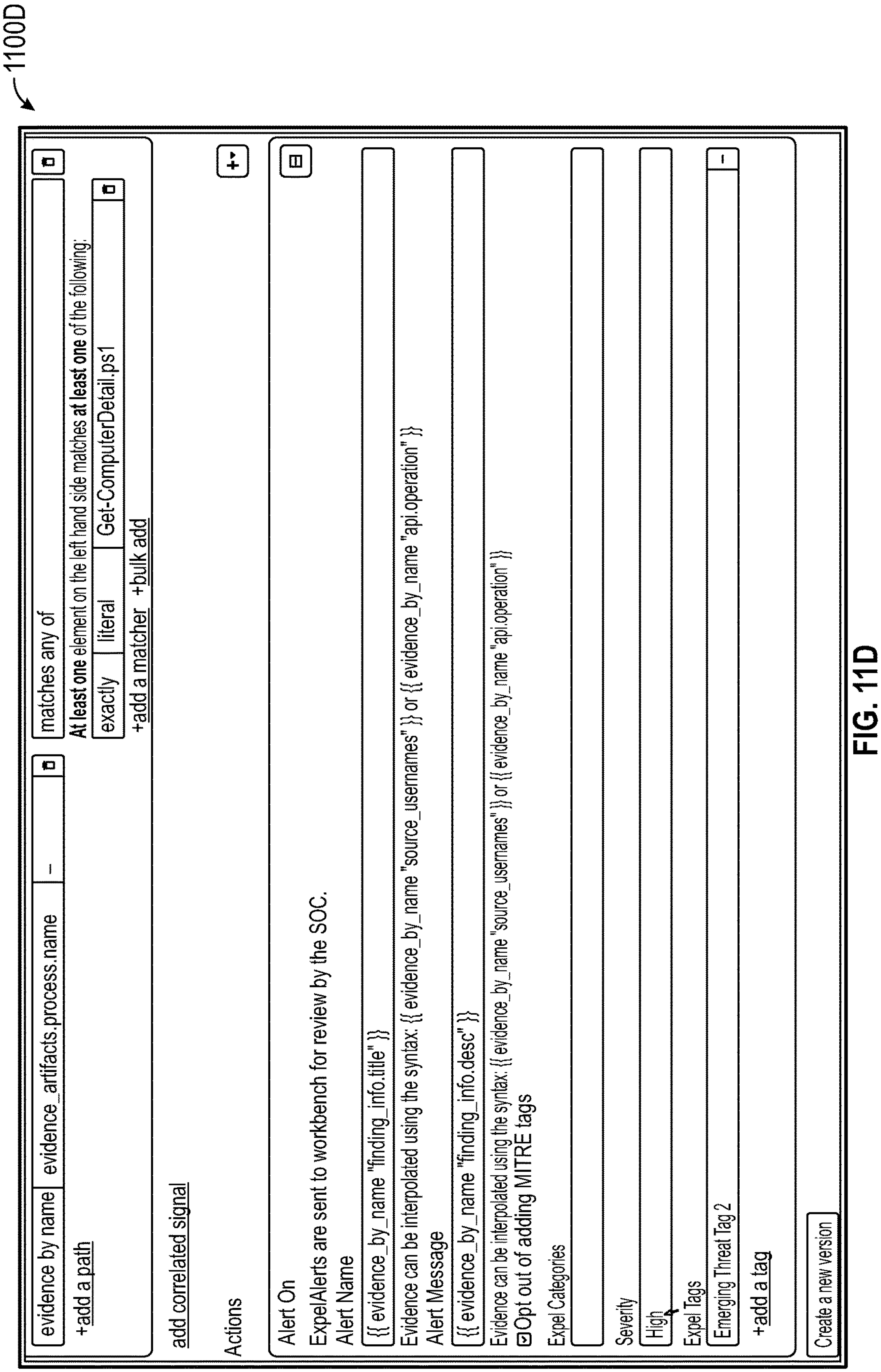

FIG. 10 may depict a user interface view that includes user interface display elements, where each user interface display element may correspond to an entry linked to a respective set of configured detection result refinement parameters for a particular detection rule or a particular set of detection rules. Each user interface display element may include an identifier associated with the detection rule and/or set of detection rules (e.g., a name), an indication of a user that last modified detection result refinement parameters, an indication of when the detection result refinement parameters were initially configured, a severity associated with the detection rule and/or the set of detection rules being triggered, an alert taxonomy, a signal type, an alert name, an associated category, one or more associated MITRE tactics, and one or more associated tags.

Upon user input being provided to one of the user interface display elements of FIG. 10, the user interface views depicted in FIGS. 11A through 11D may be generated. The user interface views depicted in FIGS. 11A through 11D may include user interface input elements that enable configuration of parameters for refining detection results associated with a particular detection rule and/or a particular set of detection rules. Such parameters may correspond to metadata parameters (e.g., a name or description for a detection rule and/or a set of detection rules), a rate limit parameter (e.g., how often an alert should be sent), test parameters, a signal parameter, signal logic parameters, and/or action parameters (e.g., what action to take when a detection rule is triggered).

Security Platform User Interface

Figure 12A:
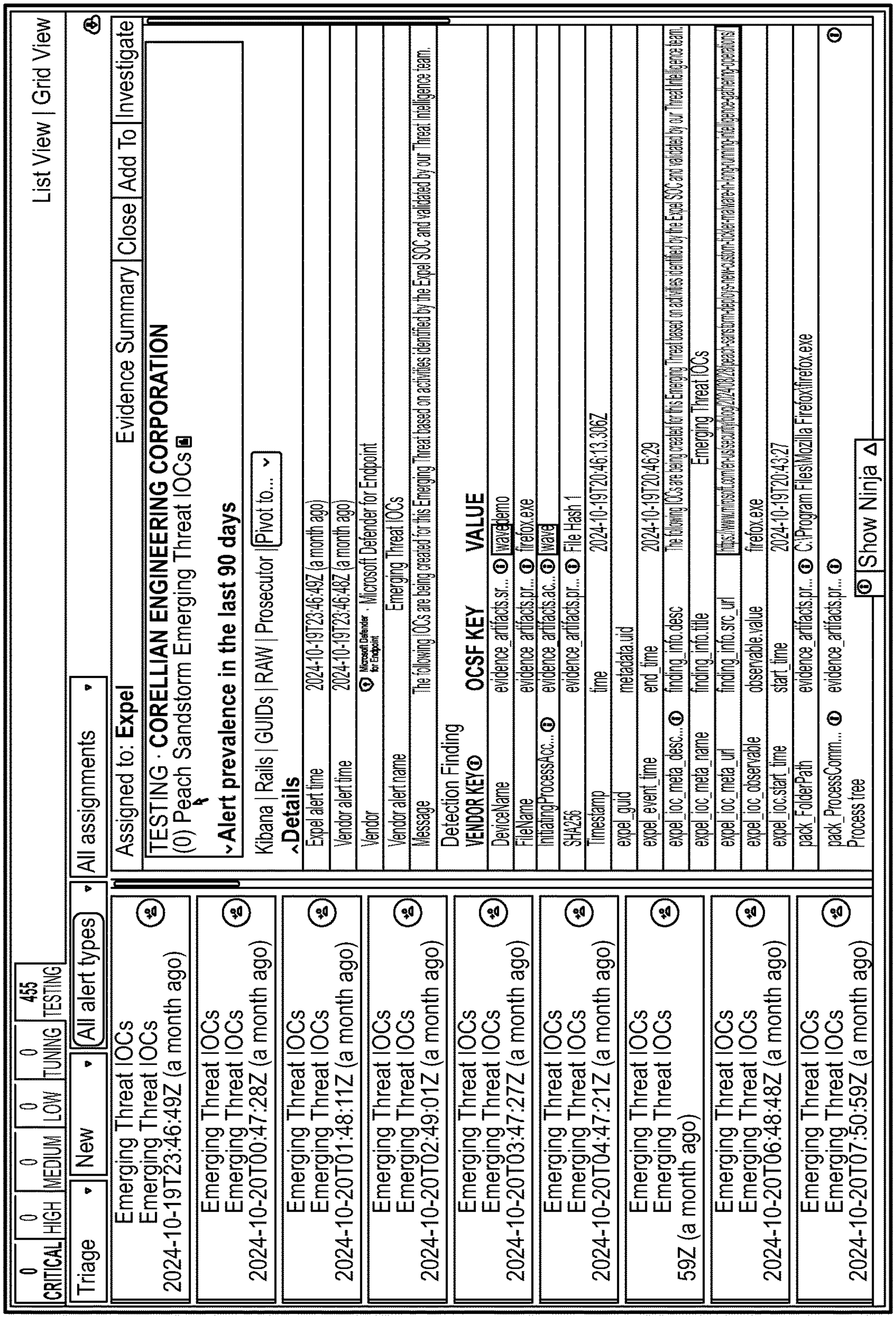
Figure 12B:
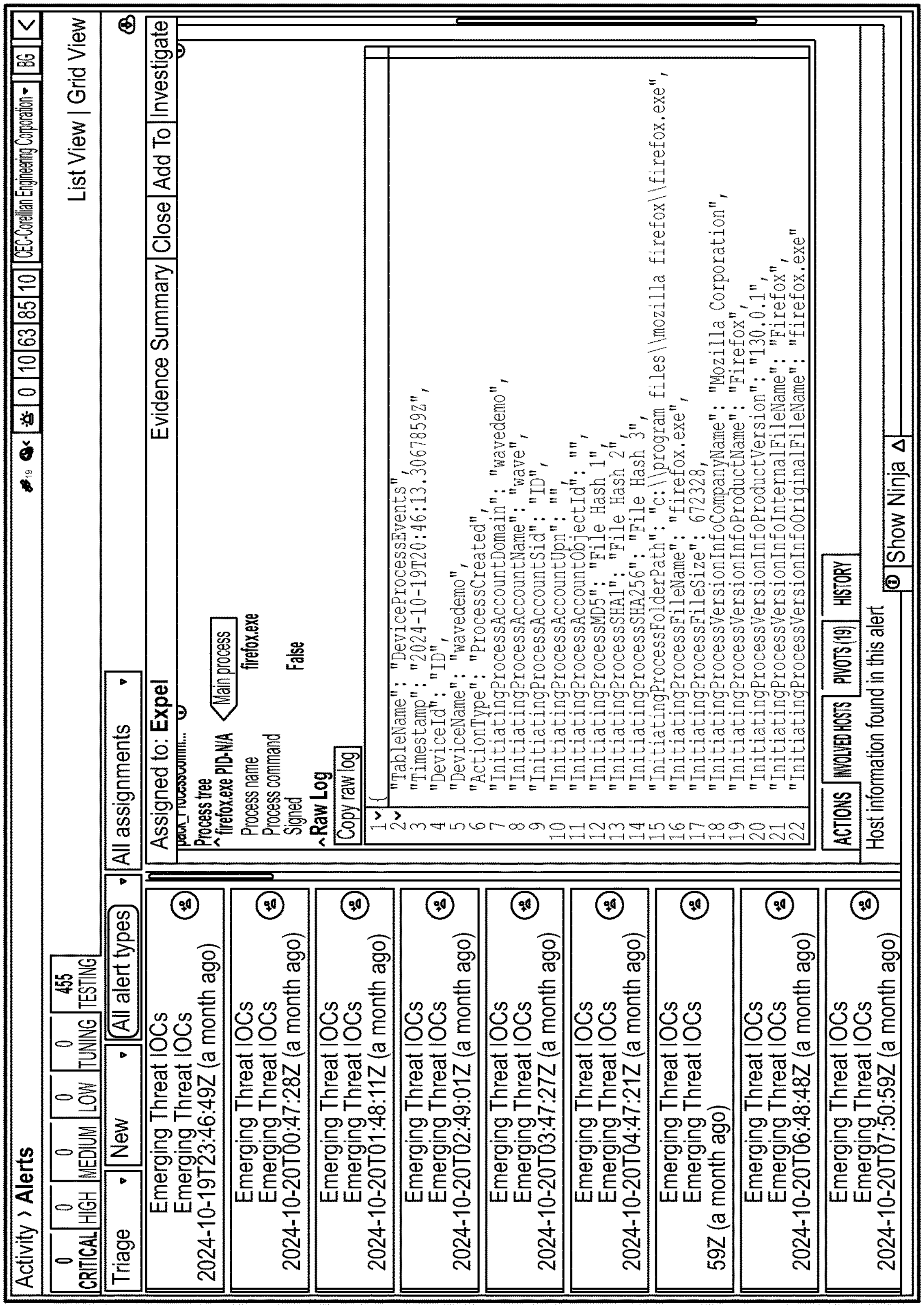
Figure 12C:
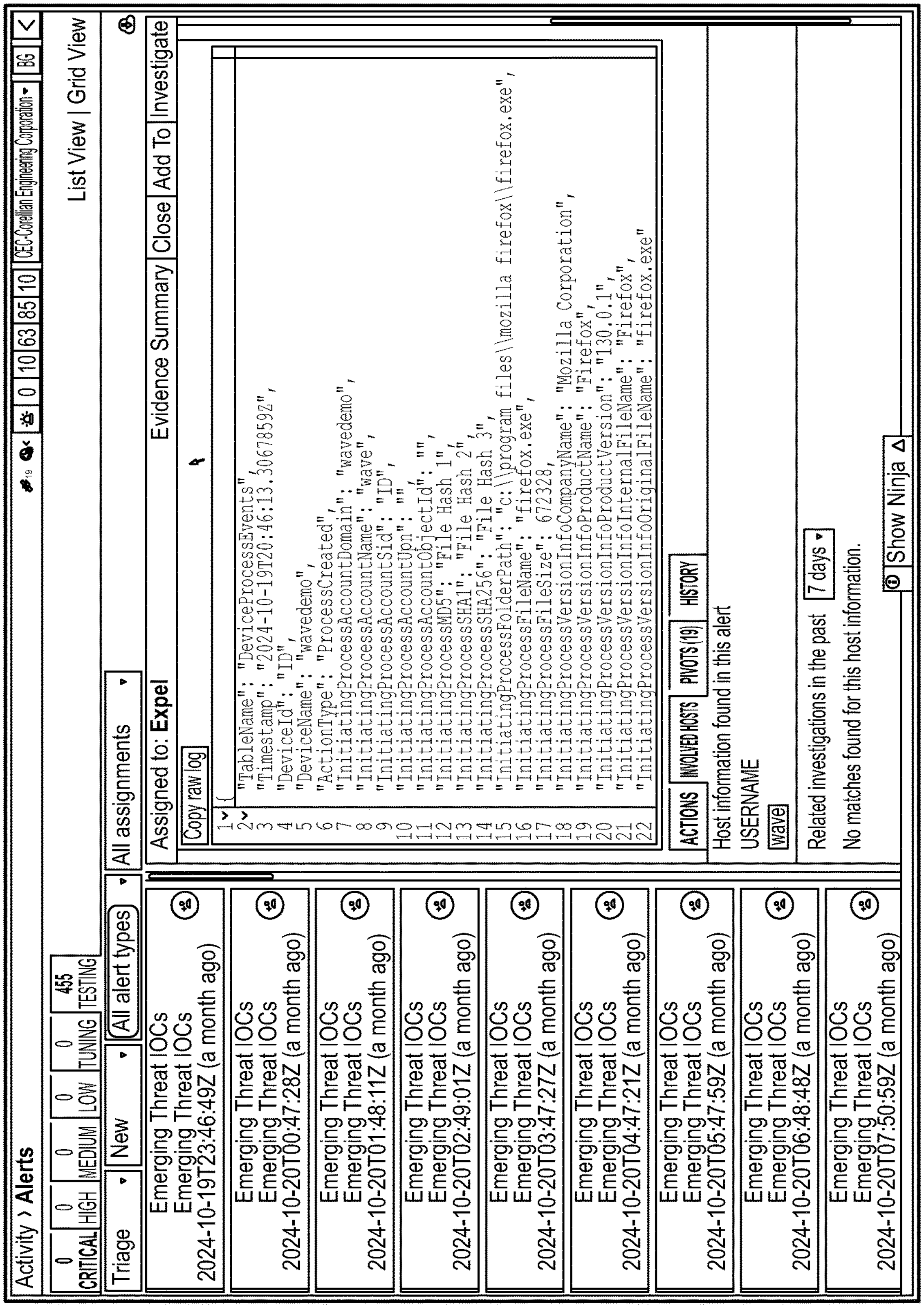

In some examples, the security platform may provide a security platform user interface that enables alert messages to be displayed. An example of such a user interface may be depicted in FIGS. 12A through 12C (e.g., user interface views 1200A, 1200B, and 1200C). The security platform user interface may include information associated with a triggered detection rule, such as an indication of one or more IOCs that triggered the detection rule. In some examples, the security platform user interface may include a respective user interface display element for each occurrence of a detection rule being triggered. Alternatively, the security platform user interface may include a single user interface display element representing each time a particular detection rule has been triggered. More information about a triggered detection rule (or an occurrence of a detection rule being triggered) may be displayed when user input is provided to the user interface display element.

3. Computer-Implemented Method and Computer Program Product

Embodiments of the system and/or method can include every combination and permutation of the various system components and the various method processes, wherein one or more instances of the method and/or processes described herein can be performed in real-time or near real-time, asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein. Furthermore, each method step, process step, or the like described herein may be performed in real-time or near real-time. It shall be noted that "real-time" or "near real-time" as generally used herein may refer to generating an output or performing an action within strict time constraints. For example, in one or more embodiments, real-time may be understood to be instantaneous, on the order of milliseconds, or on the order of minutes. Of course, depending on the particular temporal nature of the system in which an embodiment is implemented, other appropriate timescales may be considered acceptable for real-time or near real-time processing.

As a person skilled in the art will recognize from the previous detailed description and from the figures and claims, modifications and changes can be made to the preferred embodiments of the invention without departing from the scope of this invention defined in the following claims.

We claim:

1. A computer-implemented method comprising:

at a cybersecurity event detection and response service that is implemented by a network of distributed computers:

detecting, in real-time or near real-time, at least one indicator of compromise (IOC) included in a security artifact;

in response to detecting the at least one IOC, automatically generating, in real-time or near real-time, a threat hunt object that specifies (i) the at least one IOC, (ii) a temporal look-back parameter, and (iii) a plurality of distinct security devices eligible for IOC-based querying;

translating, using a large language model, the threat hunt object into a plurality of distinct threat hunt queries in response to providing the threat hunt object to the large language model, wherein:

each threat hunt query of the plurality of distinct threat hunt queries is written in a distinct query language required by a distinct security device of the plurality of distinct security devices, and each threat hunt query of the plurality of distinct threat hunt queries includes the at least one IOC and specifies a retrospective query window based on the temporal look-back parameter;

in response to translating the threat hunt object into the plurality of distinct threat hunt queries:

simultaneously executing, using one or more pollers, the plurality of distinct threat hunt queries across the plurality of distinct security devices;

obtaining historical security event data from each security device of the plurality of distinct security devices in response to executing the plurality of distinct threat hunt queries; and automatically constructing one or more IOC-based threat detection instructions using (a) the historical security event data obtained from each of the plurality of distinct security devices and (b) the at least one IOC;

assessing, in real-time or near real-time, new security events normalized by the cybersecurity event detection and response service against the one or more IOC-based threat detection instructions; and automatically generating, in real-time or near real-time, at least one IOC-based security alert based on detecting that a respective new security event of the new security events satisfies one of the one or more IOC-based threat detection instructions.

2. The computer-implemented method according to claim 1, further comprising:

before assessing the new security events normalized by the cybersecurity event detection and response service: initializing a counter for the at least one IOC;

while assessing the new security events normalized by the cybersecurity event detection and response service: tracking, using the counter, a total number of times that the at least one IOC is detected in the new security events; and after assessing the new security events normalized by the cybersecurity event detection and response service, performing at least one detection handling action based on the total number of times that the at least one IOC was detected in the new security events, wherein:

the at least one detection handling action includes terminating the one or more IOC-based threat detection instructions when the total number of times that the at least one IOC was detected in the new security events fails to satisfy a predetermined minimum IOC count threshold, and the at least one detection handling action includes bypassing the termination of the one or more IOC-based threat detection instructions when the total number of times that the at least one IOC was detected in the new security events satisfies the predetermined minimum IOC count threshold.

3. The computer-implemented method according to claim 1, further comprising:

before assessing the new security events normalized by the cybersecurity event detection and response service: initializing a counter for the at least one IOC, wherein the counter tracks a total number of times that the at least one IOC is detected in log data of all subscribers to the cybersecurity event detection and response service within a target time span;

at expiration of the target time span:

automatically assessing the total number of times that the at least one IOC was detected in the log data;

automatically extending, for a subsequent target time span, a duration that the one or more IOC-based threat detection instructions are active in the cybersecurity event detection and response service based on the assessment of the total number of times that the at least one IOC was detected in the log data; and resetting the counter to an initial value to track a subsequent total number of times that the at least one IOC is detected in all computing environments of the all subscribers to the cybersecurity event detection and response service during the subsequent target time span; and at expiration of the subsequent target time span:

automatically assessing the subsequent total number of times that the at least one IOC was detected during the subsequent target time span; and automatically ceasing use of the one or more IOC-based threat detection instructions based on the assessment of the subsequent total number of times that the at least one IOC was detected during the subsequent target time span.

4. The computer-implemented method according to claim 1, further comprising:

in response to constructing the one or more IOC-based threat detection instructions:

assessing, in real-time or near real-time, the historical security event data obtained from each of the plurality of distinct security devices against the one or more IOC-based threat detection instructions;

generating, in real-time or near real-time, a plurality of distinct retrospective IOC-based security alerts based on detecting that at least a subset of the historical security event data obtained from the plurality of distinct security devices satisfies the one or more IOC-based threat detection instructions; and in response to generating the plurality of distinct retrospective IOC-based security alerts, automatically executing, in real-time or near real-time, one or more automated threat mitigation actions to mitigate or resolve a security threat associated with the plurality of distinct retrospective IOC-based security alerts.

5. The computer-implemented method according to claim 1, wherein:

the historical security event data obtained from each security device of the plurality of distinct security devices includes:

a plurality of distinct sets of historical security events that correspond to a plurality of distinct subscribers to the cybersecurity event detection and response service, wherein each set of historical security events of the plurality of distinct sets of historical security events:

corresponds to a distinct subscriber of the plurality of distinct subscribers, and includes all historical security events of the distinct subscriber that (1) occurred within the retrospective query window and (2) includes the at least one IOC, and the computer-implemented method further includes:

in response to constructing the one or more IOC-based threat detection instructions:

assessing, in real-time or near real-time, the plurality of distinct sets of historical security events that correspond to the plurality of distinct subscribers against the one or more IOC-based threat detection instructions; and generating, in real-time or near real-time, a plurality of distinct retrospective IOC-based security alerts for each distinct subscriber of the plurality of distinct subscribers based on the assessment of the plurality of distinct sets of historical security events against the one or more IOC-based threat detection instructions.

6. The computer-implemented method according to claim 1, further comprising:

receiving, over a computer network, a third-party threat intelligence data feed that includes threat intelligence data comprising a plurality of distinct candidate IOCs, wherein:

the third-party threat intelligence data feed corresponds to the security artifact, and detecting the at least one IOC includes:

assessing the plurality of distinct candidate IOCs to identify at least one candidate IOC of the plurality of distinct candidate IOCs that was not previously recognized by the cybersecurity event detection and response service as a known IOC, and designating the at least one candidate IOC as the at least one IOC.

7. The computer-implemented method according to claim 6, wherein:

the plurality of distinct threat hunt queries, when executed across the plurality of distinct security devices, automatically performs a sweep of all computing environments of all subscribers to the cybersecurity event detection and response service to identify a plurality of historical security events that (1) occurred in the computing environments of the subscribers, (2) occurred within the retrospective query window, and (3) are associated with the at least one IOC, wherein each historical security event of the plurality of historical security events includes the at least one IOC, and the computer-implemented method further includes:

in response to identifying the plurality of historical security events, generating a plurality of distinct retrospective IOC-based security alerts based in part on the plurality of historical security events identified from executing the plurality of distinct threat hunt queries; and displaying the plurality of distinct retrospective IOC-based security alerts on a graphical user interface.

8. The computer-implemented method according to claim 1, wherein:

the security artifact corresponds to a security incident detected in a compromised computing environment of a target subscriber to the cybersecurity event detection and response service, the plurality of distinct threat hunt queries, when executed across the plurality of distinct security devices, automatically performs a retrospective cross-environment scanning operation across computing environments of a plurality of additional subscribers to identify a plurality of historical security events associated with the at least one IOC, wherein each historical security event of the plurality of historical security events:

occurred at one of the computing environments of the plurality of additional subscribers, occurred within the retrospective query window, and includes event metadata specifying the at least one IOC, and the computer-implementing method further includes:

automatically generating a plurality of distinct retrospective IOC-based security alerts based on the plurality of historical security events identified during the retrospective cross-environment scanning operation;

automatically routing the plurality of distinct retrospective IOC-based security alerts to a security alert queue; and executing, in response to routing the plurality of distinct retrospective IOC-based security alerts to the security alert queue, one or more threat mitigation actions to mitigate or resolve a security threat associated with the plurality of distinct retrospective IOC-based security alerts.

9. The computer-implemented method according to claim 8, wherein:

the plurality of additional subscribers are different from the target subscriber, and before execution of the retrospective cross-environment scanning operation, the plurality of historical security events identified during the retrospective cross-environment scanning operation were determined to be non-malicious by the cybersecurity event detection and response service.

10. The computer-implemented method according to claim 8, wherein:

the plurality of additional subscribers are different from the target subscriber, and before execution of the retrospective cross-environment scanning operation, the cybersecurity event detection and response service did not detect the security threat associated with the plurality of historical security events identified during the retrospective cross-environment scanning operation.

11. The computer-implemented method according to claim 1, further comprising:

automatically commencing, at a predetermined interval, a sequence of operations to reduce a time to detect and remediate future security threats associated with the at least one IOC, wherein at least one iteration of the sequence of operations includes:

automatically polling, using the one or more pollers, the plurality of distinct security devices to obtain new security event data;

in response to receiving the new security event data, assessing, in real-time or near real-time, a normalized representation of the new security event data against the one or more IOC-based threat detection instructions;

automatically generating one or more additional IOC-based security alerts based on the normalized representation of the new security event data satisfying the one or more IOC-based threat detection instructions; and executing, in real-time or near real-time, one or more threat mitigation actions to mitigate or resolve a security threat associated with each of the one or more additional IOC-based security alerts.

12. The computer-implemented method according to claim 1, wherein:

the at least one IOC included in the threat hunt object includes:

a first plurality of IOCs that correspond to a first class of IOCs, a second plurality of IOCs that correspond to a second class of IOCs, and a third plurality of IOCs that correspond to a third class of IOCs, the plurality of distinct security devices included in the threat hunt object includes:

a first identifier that corresponds to a first distinct endpoint detection and response service, a second identifier that corresponds to a second distinct endpoint detection and response service, and a third identifier that corresponds to a third distinct endpoint detection and response service, and translating the threat hunt object into the plurality of distinct threat hunt queries includes:

generating a first distinct threat hunt query that is written in the distinct query language required by the first distinct endpoint detection and response service, wherein the first distinct threat hunt query includes:

the first plurality of IOCs, the second plurality of IOCs, and the third plurality of IOCs, the retrospective query window, and an application programming interface (API) endpoint for the first distinct endpoint detection and response service, generating a second distinct threat hunt query that is written in the distinct query language required by the second distinct endpoint detection and response service, wherein the second distinct threat hunt query includes:

the first plurality of IOCs, the second plurality of IOCs, and the third plurality of IOCs, the retrospective query window, and an API endpoint for the second distinct endpoint detection and response service, and generating a third distinct threat hunt query that is written in the distinct query language required by the third distinct endpoint detection and response service, wherein the third distinct threat hunt query includes:

the first plurality of IOCs, the second plurality of IOCs, and the third plurality of IOCs, the retrospective query window, and an API endpoint for the third distinct endpoint detection and response service.

13. The computer-implemented method according to claim 12, wherein:

simultaneously executing the plurality of distinct threat hunt queries includes:

transmitting, using the one or more pollers, a first API request that includes the first distinct threat hunt query to the API endpoint that corresponds to the first distinct endpoint detection and response service, transmitting, using the one or more pollers, a second API request that includes the second distinct threat hunt query to the API endpoint that corresponds to the second distinct endpoint detection and response service, and transmitting, using the one or more pollers, a third API request that includes the third distinct threat hunt query to the API endpoint that corresponds to the third distinct endpoint detection and response service, and obtaining the historical security event data from each security device of the plurality of distinct security devices includes:

in response transmitting the first API request to the API endpoint of the first distinct endpoint detection and response service, receiving, from the first distinct endpoint detection and response service, a first plurality of historical security events that:

were detected in one or more computing environments of one or more subscribers monitored by the first distinct endpoint detection and response service, occurred within the retrospective query window, and are associated with at least one of the first plurality of IOCs, the second plurality of IOCs, and the third plurality of IOCs, in response transmitting the second API request to the API endpoint of the second distinct endpoint detection and response service, receiving, from the second distinct endpoint detection and response service, a second plurality of historical security events that:

were detected in the one or more computing environments of the one or more subscribers monitored by the second distinct endpoint detection and response service, occurred within the retrospective query window, and are associated with at least one of the first plurality of IOCs, the second plurality of IOCs, and the third plurality of IOCs, and in response transmitting the third API request to the API endpoint of the third distinct endpoint detection and response service, receiving, from the third distinct endpoint detection and response service, a third plurality of historical security events that:

were detected in the one or more computing environments of the one or more subscribers monitored by the third distinct endpoint detection and response service, occurred within the retrospective query window, and are associated with at least one of the first plurality of IOCs, the second plurality of IOCs, and the third plurality of IOCs, wherein the historical security event data includes the first plurality of historical security events, the second plurality of historical security events, and the third plurality of historical security events.

14. The computer-implemented method according to claim 1, further comprising:

in response to providing the threat hunt object to the large language model, generating, using the large language model, a single database query based on the threat hunt object, wherein:

the single database query is executable against a target database, the single database query includes the at least one IOC and the retrospective query window, and the target database stores log data obtained from each of a plurality of distinct security services;

in response to the large language model generating the single database query, executing the single database query against the target database;

in response to executing the single database query, retrieving, from the target database, a corpus of logs that satisfy the single database query, wherein:

a first subset of the corpus of logs includes a first plurality of logs generated by a first distinct security service of the plurality of distinct security services, a second subset of the corpus of logs includes a second plurality of logs generated by a second distinct security service of the plurality of distinct security services, and a third subset of the corpus of logs includes a third plurality of logs generated by a third distinct security service of the plurality of distinct security services; and generating a plurality of distinct retrospective IOC-based security alerts in response to assessing the corpus of logs retrieved from the target database against the one or more IOC-based threat detection instructions.

15. The computer-implementing method according to claim 1, wherein:

the at least one IOC includes a first plurality of IOCs that correspond to a first class of IOCs, a second plurality of IOCs that correspond to a second class of IOCs, and a third plurality of IOCs that correspond to a third class of IOCs, and while generating the plurality of distinct threat hunt queries using the large language model:
detecting, by the large language model, that including the first plurality of IOCs, the second plurality of IOCs, and the third plurality of IOCs in a single threat hunt query would cause the single threat hunt query to exceed a maximum query size of the distinct security device to which the single threat hunt query corresponds; and
in response to the large language model detecting that the single threat hunt query would exceed the maximum query size, generating multiple threat hunt queries for the distinct security device to which the single threat hunt query corresponds, wherein:
a first threat hunt query of the multiple threat hunt queries includes the first plurality of IOCs and excludes the second plurality of IOCs and the third plurality of IOCs,
a second threat hunt query of the multiple threat hunt queries includes the second plurality of IOCs and excludes the first plurality of IOCs and the third plurality of IOCs, and
a third threat hunt query of the multiple threat hunt queries includes the third plurality of IOCs and excludes the first plurality of IOCs and the second plurality of IOCs, wherein:
the plurality of distinct threat hunt queries includes the first threat hunt query, the second threat hunt query, and the third threat hunt query, and
the first threat hunt query, the second threat hunt query, and the third threat hunt query collectively represent a logical equivalent of the single threat hunt query.

16. The computer-implemented method according to claim 1, wherein:
generating a respective threat hunt query of the plurality of distinct threat hunt queries includes:
obtaining, using the large language model, a plurality query components that define a query syntax of the distinct query language required by the distinct security device to which the respective threat hunt query corresponds,
determining, using the large language model, an IOC class of the at least one IOC;
selecting, using the large language model, a respective field identifier from the plurality query components that corresponds to the IOC class; and
encoding, using the large language model, the respective threat hunt query by inserting the at least one IOC after the respective field identifier in accordance with the query syntax.

17. The computer-implemented method according to claim 1, further comprising:
in response to executing the plurality of distinct threat hunt queries, generating query findings data using the historical security event data obtained from each security device of the plurality of distinct security devices, wherein the query findings data includes:
a total number of historical security events identified by the plurality of distinct threat hunt queries,
a total number of retrospective IOC-based security alerts generated based on the historical security event data obtained from each security device of the plurality of distinct security devices, and
one or more query execution errors associated with at least one of the plurality of distinct threat hunt queries;
automatically generating training data for the large language model using the query findings data; and
training the large language model using the training data to improve a translation of a subsequent threat hunt object into a plurality of subsequent threat hunt queries.

18. The computer-implemented method according to claim 1, wherein:
the one of the one or more IOC-based threat detection instructions specifies:
generating a subject IOC-based security alert when a subject new security event includes at least one piece of event metadata equivalent to the at least one IOC, and
the one of the one or more IOC-based threat detection instructions generated the at least one IOC-based security alert for the respective new security event based on the one of the one or more IOC-based threat detection instructions detecting that a respective piece of event metadata included in the respective new security event is equivalent to the at least one IOC.

19. The computer-implemented method according to claim 1, wherein:
constructing a respective IOC-based threat detection instruction of the one or more IOC-based threat detection instructions includes:
providing the historical security event data obtained from each of the plurality of distinct security devices to the large language model;
assessing, using the large language model, the historical security event data obtained from each of the plurality of distinct security devices to detect a malicious behavior pattern associated with the at least one IOC;
encoding, using the large language model, the respective IOC-based threat detection instruction to specify a detection condition that is satisfied when a subject new security event includes event metadata that (1) matches the malicious behavior pattern and (2) includes the at least one IOC, and
the respective IOC-based threat detection generated the at least one IOC-based security alert for the respective new security event based on detecting that the respective new security event satisfies the detection condition of the respective IOC-based threat detection instruction.

20. The computer-implemented method according to claim 1, further comprising:
tracking, in a computer database, a distinct query execution state for each of the plurality of distinct threat hunt queries, wherein the distinct query execution state indicates whether a respective threat hunt query has not been executed, is partially executed, or has completed execution;
detecting one or more system restarts or one or more transient failures during execution of the plurality of distinct threat hunt queries; and
in response to detecting the one or more system restarts or the one or more transient failures:
identifying, using the computer database, a first subset of the plurality of distinct threat hunt queries that are partially completed, a second subset of the plurality of distinct threat hunt queries that have completed execution, and a third subset of the plurality of distinct threat hunt queries that have not been executed;

in response to identifying the first subset of the plurality of distinct threat hunt queries, re-executing each distinct threat hunt query included in the first subset;

in response to identifying the second subset of the plurality of distinct threat hunt queries, bypassing re-execution of each distinct threat hunt query included in the second subset; and in response to identifying the third subset of the plurality of distinct threat hunt queries, commencing asynchronous execution of each distinct threat hunt query included in the third subset.

* * * * *